(12) United States Patent
Imrie

(10) Patent No.: US 12,104,975 B2
(45) Date of Patent: Oct. 1, 2024

(54) PORTABLE OPTIC METROLOGY THERMAL CHAMBER MODULE AND METHOD THEREFOR

(71) Applicant: Optikos Corporation, Wakefield, MA (US)

(72) Inventor: David Imrie, Andover, MA (US)

(73) Assignee: Optikos Corporation, Wakefield, MA (US)

( * ) Notice: Subject to any disclaimer, the term of this patent is extended or adjusted under 35 U.S.C. 154(b) by 0 days.

(21) Appl. No.: 18/306,753

(22) Filed: Apr. 25, 2023

(65) Prior Publication Data

US 2023/0258527 A1 Aug. 17, 2023

Related U.S. Application Data

(62) Division of application No. 16/774,887, filed on Jan. 28, 2020, now Pat. No. 11,635,344.

(60) Provisional application No. 62/800,320, filed on Feb. 1, 2019.

(51) Int. Cl.
```
G01M 11/02      (2006.01)
G01B 11/06      (2006.01)
G01B 21/08      (2006.01)
G02F 1/01       (2006.01)
```
(52) U.S. Cl.
CPC ......... *G01M 11/0221* (2013.01); *G01B 11/06* (2013.01); *G01B 21/085* (2013.01); *G02F 1/0147* (2013.01)

(58) Field of Classification Search
CPC ... G01M 11/0221; G01M 11/02; G01B 11/06; G01B 21/085; G03B 43/00; G02F 1/0147
See application file for complete search history.

(56) References Cited

U.S. PATENT DOCUMENTS

| | | | |
|---|---|---|---|
| 4,738,532 A * | 4/1988 | Robertson | G01C 25/00 33/283 |
| 5,661,816 A * | 8/1997 | Fantone | G01M 11/0292 382/100 |
| 7,105,821 B1* | 9/2006 | Kennedy | G01J 5/061 250/339.07 |
| 7,254,290 B1 | 8/2007 | Somerstein et al. | |
| 9,217,687 B2* | 12/2015 | Orband | G01M 11/0207 |
| 2003/0011786 A1 | 1/2003 | Levy et al. | |
| 2004/0141676 A1 | 7/2004 | Bugaud et al. | |

(Continued)

*Primary Examiner* — Sang H Nguyen
(74) *Attorney, Agent, or Firm* — Perman & Green, LLP

(57) ABSTRACT

A portable optic metrology thermal chamber module including a housing defining a thermal chamber, with a thermally isolated environment arranged for holding an optic device under test, the housing having an optic stimulus entry aperture configured for entry of a stimulus beam, from a metrology system stimulus source through the entry aperture onto an entry pupil of the device to an image analyzer, and a module mount coupling to modularly mount the portable optic metrology thermal chamber module to a support of a metrology system of the metrology system stimulus source so as to removably couple the portable optic metrology thermal chamber module as a unit to the support in a predetermined position relative to the metrology system stimulus source, and the housing is sized and shaped so that the portable optic metrology thermal chamber module is portable as a unit for moving to and removing from the predetermined position.

14 Claims, 27 Drawing Sheets

(56) References Cited

U.S. PATENT DOCUMENTS

| | | | |
|---|---|---|---|
| 2011/0228811 A1* | 9/2011 | Fraden | G01J 5/08 374/121 |
| 2012/0092655 A1 | 4/2012 | Dozor | |
| 2012/0133957 A1 | 5/2012 | Widman | |
| 2014/0132774 A1* | 5/2014 | Schmidt | H04N 5/33 29/469 |

* cited by examiner

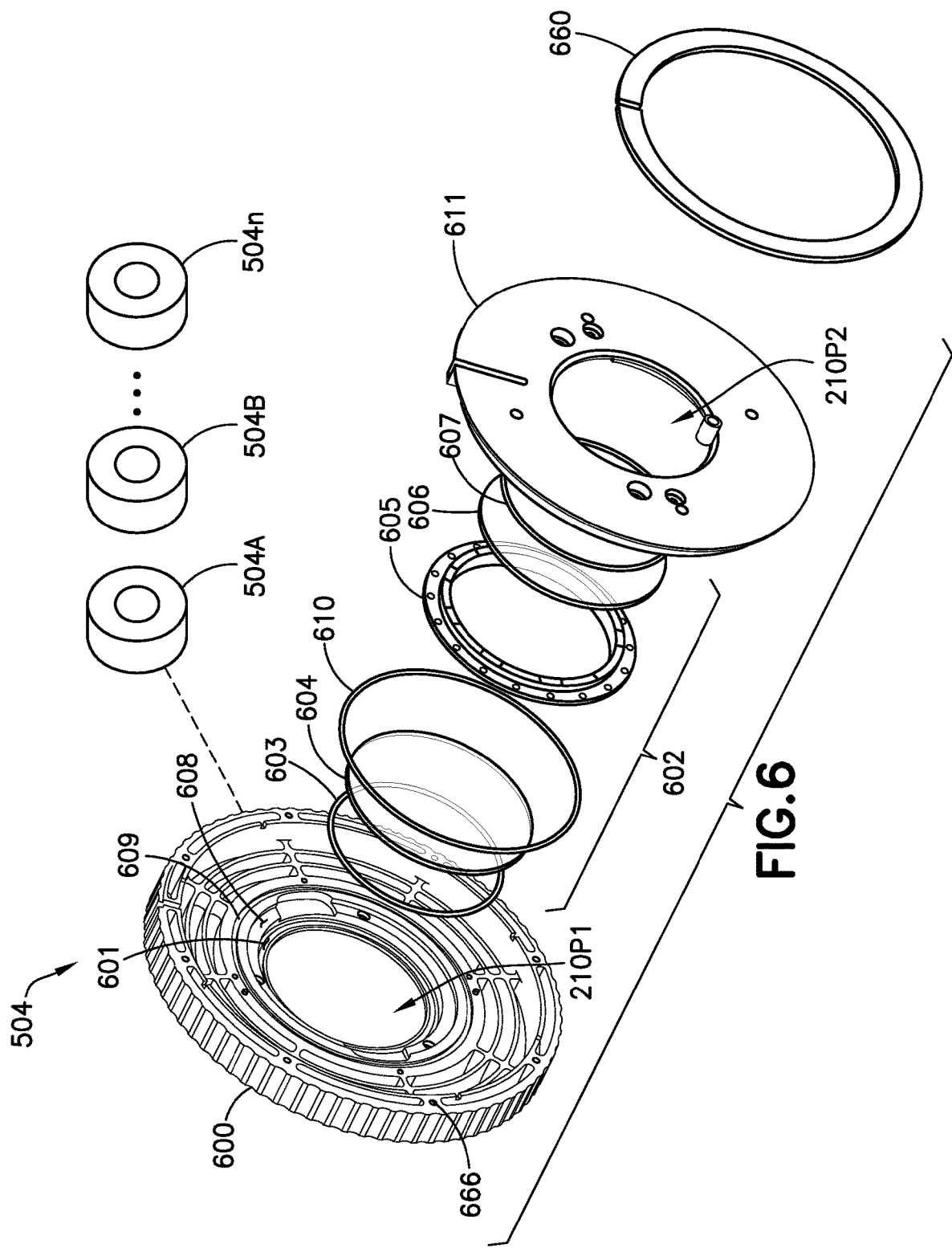

PORTABLE OPTIC METROLOGY THERMAL CHAMBER MODULE AND METHOD THEREFOR

CROSS-REFERENCE TO RELATED APPLICATIONS

This application is divisional of a non-provisional patent application Ser. No. 16/774,887, filed Jan. 28, 2020, (now U.S. Pat. No. 11,635,344), which is a non-provisional of, and claims the benefit of, U.S. Provisional Patent Application No. 62/800,320 filed on Feb. 1, 2019, the disclosures of which are incorporated herein by reference in their entireties.

BACKGROUND

1. Field

The exemplary embodiments generally relate to optical test equipment, more particularly, to thermally controlled optical test equipment.

2. Brief Description of Related Developments

Automotive instrumentation and laser systems (such as LIDAR) include optic devices such as lenses and cameras. These lenses and cameras operate at visible, short wave infrared, and long wave infrared wavelengths. The automotive instrumentation and laser ranging system must perform without degradation of performance in environments with substantial, wide temperature ranges corresponding to different geographical regions that span, e.g., from arctic regions to equatorial regions. Accordingly, performance of the automotive instrumentation and laser systems may be tested at temperatures ranging from as low as about −40° C. to as high as about 85° C. Further, optic devices, such as those described above, vary greatly in size from small cameras and lenses thereof (e.g., back-up or side-view cameras sized to be unobtrusive in appearance) to large LIDAR system optics.

Conventional metrology systems that seek to test optic performance at different thermal conditions generally employ a temperature controlled closed system, wherein the system configuration is fixed and suited for a specific device (so that the system is unsuited for testing other devices) or is what may be referred to as a "one size fits all" approach that (though it accommodates testing of various devices) compromises testing (or produces results that are a suboptimal characterization of optic performance of the different devices. Other conventional optic metrology employs open temperature controlled systems wherein a temperature control medium flow is directed (i.e., blown) against the device under test. The conventional optic metrology systems are ineffective in testing optical performance at different thermal conditions.

BRIEF DESCRIPTION OF THE DRAWINGS

The foregoing aspects and other features of the disclosed embodiment are explained in the following description, taken in connection with the accompanying drawings, wherein:

FIG. 6 is a schematic "exploded" illustration of a portion of the housing of the portable optic metrology thermal chamber module in accordance with aspects of the present disclosure;

DETAILED DESCRIPTION

Figure 1A:
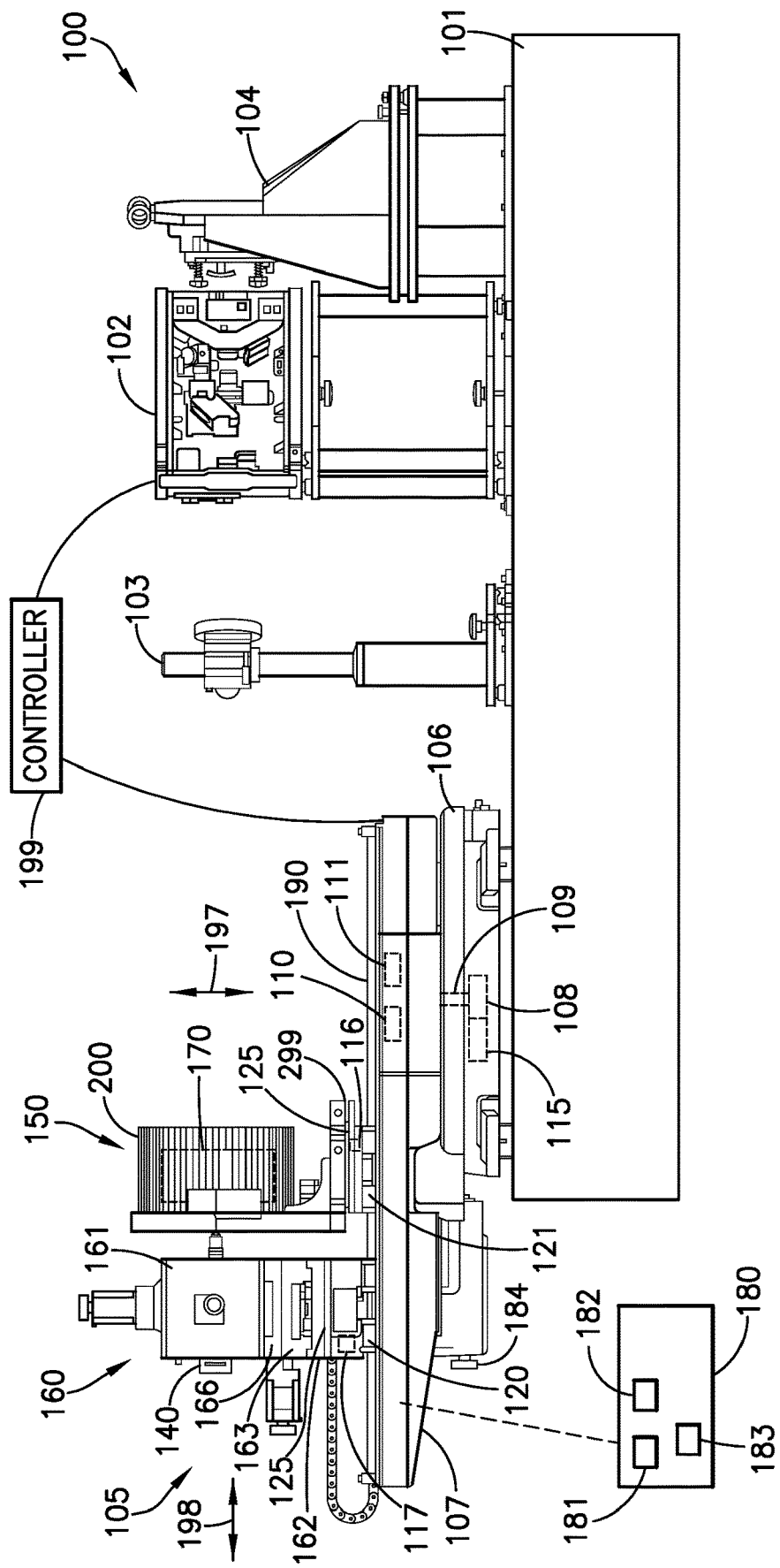
FIG. 1A is a schematic side view of an exemplary optic metrology system incorporating aspects of the present disclosure.

FIGS. 1A-1D illustrate an exemplary optic metrology system 100 in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

The optic metrology system 100 is configured to characterize optic performance of devices under test (such as a lens 1400 or camera 1500, see FIGS. 14 and 15) at different controlled thermal conditions for the device under test 170. For example, the optic metrology system 100 is configured to provide different controlled thermal condition for the device under test 170 ranging from about −40° C. (or less) to about 85° C. (or more). While the aforementioned temperature range is particularly suited to metrological testing of optics for automotive instrumentation, and though the description below may refer to examples of devices under test, that again conform with optical systems in the automotive field, such references are representative and used for convenience, and are not intended to delimit the inventive system to any particular use or specification of parameters. Thus, the optic metrology system 100 in other aspects may be set to provide thermal conditions for the devices under test of less than −40° C. and more than 85° C. if desired.

The configuration of the optic metrology system 100 is selectably variable (as will be further described herein) as the optic metrology system 100, and in particular, a closed portable optic metrology thermal chamber module 150 for (and that effects thermal control of) the device under test 170 is matched to a device under test 170 shape and size. The devices under test 170, in one aspect, vary widely in size, such as for example, lenses and cameras (that are operable in the visible, short wave infrared, near infrared, long wave infrared, mid-ware infrared, and ultraviolet wavelengths). It is noted that near infrared wavelengths (e.g., about 700 nm to about 1400 nm) are used extensively in automotive applications, such as for cameras inside vehicles that monitor the driver and occupants. The devices under test, for automotive instrumentation, may have a diameter of about 10 mm and a similar length (such as from entry pupil or aperture to exit pupil). At the opposite end of the size spectrum, the devices under test may be lenses for LIDAR systems with a diameter of about 150 mm and a length of about 200 mm. As will be described herein, the selectably configurable optic metrology system 100 provides the portable optic metrology thermal chamber module 150 that is matched to the corresponding size, length, and shape of the respective device under test 170.

With respect to lenses (such as lens 1400 in FIG. 14), the selectably configurable portable optic metrology thermal chamber module 150 enables the optic metrology system 100 to cover an angular field of view FOV (FIGS. 14 and 15) of the device under test 170 in both object and image space. For infinite conjugate devices under test, the optic metrology system 100 covers the angular field of view FOV in object space and the full field image. For finite conjugate testing articulation of the optic metrology system 100 covers the full object and image heights and sets the required object distances. For testing afocal devices under test the articulation of the optic metrology system 100 spans the angular field of view FOV of the device under test 170 in both object and image space. The optic metrology system 100 is able to fill the entrance pupil (see e.g., entrance pupil 1401 in FIG. 14) of the device under test 170 in object space and collect light from the entire exit pupil (see exit pupil 1402 in FIG. 14) without encumbrances from the closed portable optic metrology thermal chamber module 150 holding the device under test 170. For lenses the characterization of optic performance is measurement of one or more of the modulation transfer function, distortion, stray light artifacts, and the measurement of the flange focal length variation as a function of temperature for one or more of the different controlled temperatures of the device under test 170 as noted above.

With respect to cameras (such as the camera 1500 in FIG. 15), the optic metrology system 100 is configurable so as to have a number of selectable performance characteristics that include, but are not limited to, measuring one or more of the modulation transfer function at any field point on the camera sensor, through-focus modulation transfer function, depth of focus, blur, spot size, astigmatism, effective focal length, distortion, field curvature, chief (principle) ray angle, encircled and ensquared energy, axial color, transmission, stray light performance, signal transfer function, chromatic functions, and any other geometric imaging parameters, all for one or more of the different controlled temperatures of the device under test 170 as noted above.

Figure 1B:
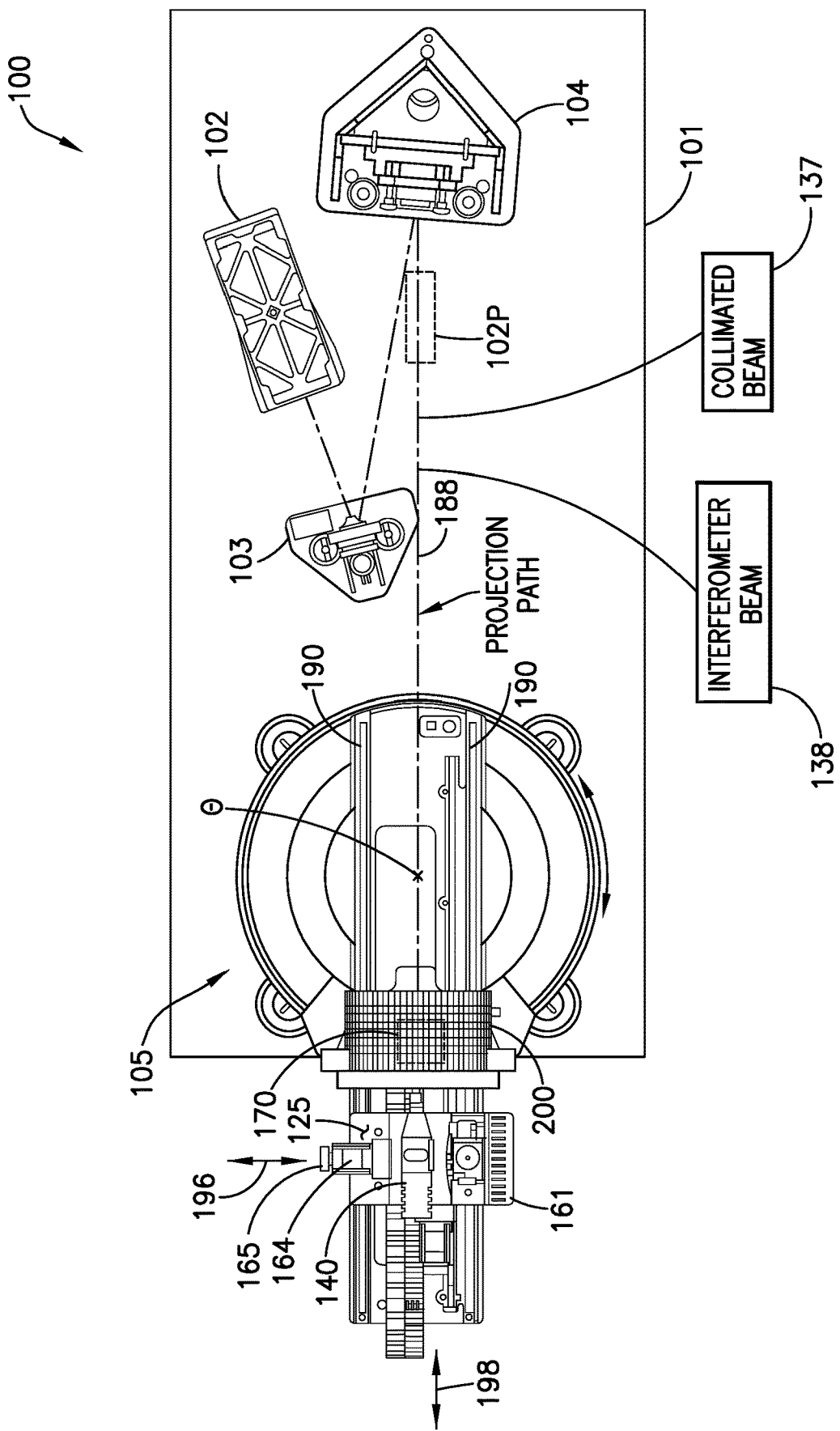
FIG. 1B is a schematic plan view of the exemplary optic metrology system of FIG. 1A.

Referring to FIGS. 1A-1D the optic metrology system 100 includes a test platform frame 101 to which various optical test devices are selectably mounted in any suitable spatial arrangement. In the aspect illustrated in FIGS. 1A-1D the optic metrology system 100 includes a metrology system stimulus source 102 (e.g., such as any suitable target/object generator), a mirror 103, a reflective collimator 104, and a device under test platform 105. The metrology system stimulus source 102 may be any suitable device that generates any suitable target/object (e.g., cross hairs, cross edges, slits, edges, pinholes, etc.) that is projected to the device under test 170. In one aspect, the metrology system stimulus source 102 may be (alone or in combination with the other beam direction devices 103, 104) be replaced with a projector 102P substantially similar to the projector described in U.S. patent application Ser. No. 16/257,272 titled "Configurable Camera Stimulation and Metrology Apparatus and Method Therefore" and filed on Jan. 25, 2019, the disclosure of which is incorporated herein by reference in its entirety. The metrology system stimulus source 102 may project the target/object directly or indirectly to the device under test 170. Where the target/object is projected directly (see the position of the projector 102P in FIG. 1B shown in dashed lines) to the device under test 170, the metrology system stimulus source 102 includes a collimator (such that the reflective collimator 104 may not be needed) as described in U.S. patent application Ser. No. 16/257,272 and/or an interferometer. Where the target/object is projected indirectly to the device under test 170, the metrology system stimulus source 102 may project the target onto the mirror 103 where a projection path (see FIG. 1B) of a stimulus beam 188 generated by the metrology system stimulus source 102 extends from the metrology system stimulus source 102 to the mirror 103, from the mirror 103 to the reflective collimator 104, and from the reflective collimator 104 to the device under test 170. In other aspects, any suitable number of mirrors may be used along the projection path, with or without a collimator, to project the target/object to the device under test 170.

The device under test platform 105 includes a base section 106 that couples the device under test platform 105 to the test platform frame 101. A rotor 107 (which may be substantially similar to the rotor described in U.S. patent application Ser. No. 16/257,272, previously incorporated herein by reference in its entirety) is rotatably coupled to the base section 106 so that the rotor 107 rotates about axis of rotation $\theta$. In one aspect, the device under test platform 105 may include a $\theta$-drive motor 108 (FIG. 1A) that drives rotation of the rotor 107 about the axis of rotation $\theta$ in any suitable manner, under one or more of manual control (e.g., through any suitable motor user interface) and under control of any suitable automated controller 199 (FIG. 1A). In other aspects, the $\theta$-drive motor may be omitted such that rotation of the rotor 107 about the $\theta$ axis is performed manually (where any suitable graduations and locking devices are provided for orienting and holding position of the rotor 107 relative to the stimulus beam 188). As an example, the $\theta$-drive motor 108 may be mounted to the base section 106 in any suitable manner for driving a drive shaft 109 (FIG. 1A) where the axis of rotation of the drive shaft 109 is coincident with the axis of rotation $\theta$. In other aspects, a casing of the $\theta$-drive motor 108 may be mounted to any suitable surface of the base section 106 where the casing of the $\theta$-drive motor 108 forms (or an output of the motor, such as when a harmonic drive) a seating surface for the rotor 107.

In one aspect, the $\theta$-drive motor may be a pinion drive 180 having a disk shaped gear 181 coupled to the rotor. The disk shaped gear 181 may be driven by a pinion gear 182 coupled to the output shaft of a motor/gearbox 183 that may be located underneath the rotor 107. A knob 184 may be coupled to the motor/gearbox 183 configured to provide manual rotation of the rotor 107 about axis of rotation $\theta$, such as with motor power released to facilitate back-driving the motor/gearbox 183.

In one aspect a slip ring power coupling may be provided on the drive shaft 109 for providing power to the rotor 107 and the accessory devices 160 and/or device under test 170 mounted thereto. The slip ring power coupling may also provide for substantially infinite rotation of the rotor 107 about the axis of rotation $\theta$. In one aspect, a slip ring may not be provided such as where the cables providing power, etc. to the rotor 107 (and any accessories mounted thereto) are coiled and/or uncoiled (depending on a direction of rotation of the rotor) within the base section 106 as the rotor 107 rotates.

In one aspect, the $\theta$-drive motor 108, 180 is a harmonic drive (which may be substantially similar to the rotor described in U.S. patent application Ser. No. 16/257,272, previously incorporated herein by reference in its entirety), where the output of the harmonic drive is coupled to the rotor 107 and has any suitable speed reduction. Inclusion of the harmonic drive in the device under test platform 105 provides the device under test platform 105 with unimpaired operation both in the horizontal orientation (e.g., with rotation of the rotor 107 about the $\theta$ axis in a horizontal plane) and vertical orientation (e.g., with rotation the rotor 107 about the $\theta$ axis in a vertical plane) of the optic metrology system 100. Any suitable locking device or brakes may be provided (under automated operation or manual operation) to lock the rotor 107 in a predetermined test orientation so as to prevent drifting movement of the rotor 107 during testing of the device under test 170.

In one aspect, a Y-axis motor 115 may also be provided in the base section 106 for moving the rotor 107 in Y direction 197. The Y-axis motor 115 may be coupled to the controller 199 for automated or manual movement of the rotor 107 along Y direction 197 using the Y-axis motor 115. In other aspects, any suitable manually operated lifting device (e.g., jack screw, etc.) may be provided for manual movement (without a driven motor) of the rotor 107 along Y direction 197. Movement of the rotor 107 in Y direction 197 may facilitate, at least in part, alignment of the accessory devices 160 and/or device under test 170 with the other optic metrology instrumentation (e.g., metrology system stimulus source 102, projector 102P, mirror 103, reflective collimator 104, etc.) mounted to the test platform frame 101.

The rotor 107 may include one or more shuttles or stages 120, 121 (each of which is movable as will be further described) configured to couple the accessory devices 160 and/or device under test 170 to the rotor 107. While the aspects of the present disclosure are described with respect to the portable optic metrology thermal chamber module 150 being mounted to/coupled to the rotor, the portable optic metrology thermal chamber module 150 may also be coupled to the configurable camera stimulation and metrology apparatus of U.S. patent application Ser. No. 16/257,272, previously incorporated herein by reference in its entirety in place of the device under test described therein.

The rotor 107 includes a prismatic joint 190 to which the one or more shuttles 120, 121 are movably mounted so that the one or more shuttles 120, 121 are movable along the rotor 107 in Z direction 198 (e.g., longitudinally along the rotor 107, where the Z direction 198 changes with rotation of the rotor 107 about the axis of rotation $\theta$). The prismatic joint 190 provides for controlled and repeatable traverse of the one or more shuttles 120, 121 in the Z direction 198. In one aspect, the one or more shuttles 120, 121 may be movable as a unit along the prismatic joint 190; while in other aspects the one or more shuttles 120, 121 are movable independent of one another along the prismatic joint 190 (noting the prismatic joint and/or the rotor 107 may include any suitable graduations for locating the one or more shuttles 120, 121 along the Z direction 198). Each of the one or more shuttles 120, 121 may include any suitable locking mechanism (that engages the prismatic joint 190 or the rotor 107) to lock the position of the respective shuttle 120, 121 in the Z direction 198 relative other devices mounted to the base section 106.

In one aspect, each of the one or more shuttles 120, 121 includes a seating surface 125 that includes controlled couplings (e.g., pins, grooves, slots, etc.) which forms a datum for controllably and repeatably locating the accessory devices 160 and/or device under test 170 to the respective shuttle 120, 121 so that, e.g., movement of the respective accessory devices 160 and/or device under test 170 is controlled in a known location with respect to each other and the other optic metrology instrumentation (e.g., metrology system stimulus source 102, projector 102P, mirror 103, reflective collimator 104, etc.) mounted to the test platform frame 101.

In one aspect, the movement of the one or more shuttles 120, 121 in the Z direction 198 along the prismatic joint 190 is manually operated. Where movement of the one or more shuttles 120, 121 is manually operated, the rotor 107 may be provided with any suitable measured graduations, hard stops, or other locating devices/aids for positioning the one or more shuttles 120, 121 in the Z direction 198 (and devices mounted thereto) relative to each other or any other optic metrology instrumentation. In other aspects, one or more drive motors 110, 111 (see FIG. 1A; e.g., any suitable linear actuators) may be provided and coupled, in any suitable manner) to a respective shuttle 120, 121 for automated movement of the respective shuttle 120, 121 along the prismatic joint 190 in the Z direction 198. The one or more drive motors 110, 111 is illustrated as one or more motor modules that is/are separate from the θ-drive motor 108 however, in other aspects the one or more motors 110, 111 and the θ-drive motor 108 may be an integral unit. In one aspect, the one or more drive motors 110, 111 may be coupled to the respective shuttle 120, 121 with a respective lead screw drive (or any other suitable screw drive such as a ball screw drive, belts and pulleys, etc.) for driving the respective shuttle 120, 121 along the prismatic joint 190 in the Z direction 198. Where the one or more shuttles 120, 121 are manually operated, a guide rod may be positioned on the rotor 107 where the screw of the screw drive is located for providing additional guidance/alignment for traverse of the one or more shuttles 120, 121 in the Z direction 198. Where the one or more motors are automatically driven (or driven by motors through any suitable manual user interface) the drive motors 110, 111 may be coupled to controller 199. In one aspect, the one or more shuttles 120, 121 may also include respective z-axis motors 116, 117 (FIG. 1A) for manual and/or automated movement in Y direction 197 such as with any suitable motors or manual jack screws (or other suitable manual lifting device) which may also facilitate, at least in part, alignment of the accessory devices 160 and/or device under test 170 with the other optic metrology instrumentation (e.g., metrology system stimulus source 102, projector 102P, mirror 103, reflective collimator 104, etc.) mounted to the test platform frame 101.

Any suitable encoder(s) may be provided so that a position of the one or more shuttles 120, 121 and/or a position of the datum formed by controlled couplings of the seating surface 125 is in a known and calibrated position relative to, for example, the axis of rotation θ of the rotor 107 and/or relative to a datum formed by the prismatic joint 190 (e.g., such as when the one or more shuttles 120, 121 include respective z-axis motors). The encoder may be provided along the axis of travel defines by the prismatic joint 190 (e.g., along direction 198). As may be realized, any suitable encoders may also be provided on the rotational axis of the θ-drive motor 108. The encoders (and/or measured graduations) may facilitate positioning of an image analyzer 140 relative to a focal plane 1450), and correspondingly to a mounting flange or surface 1404 (see FIG. 14) of the device under test 170.

Still referring to FIGS. 1A-1D, the accessory devices 160 may include an X-Z stage 161 configured to mount any suitable image analyzer 140 (such as for metrological testing of lenses) to the device under test platform 105. For example, the X-Z stage 161 includes a base 162 that couples the X-Z stage 161 to, for example, the seating surface 125 of shuttle 120 in a repeatable manner. An x-axis stage 163 may be movably coupled to the base 162 (such as along any suitable prismatic joint which may be substantially similar to prismatic joint 190 described above) for movement in an X direction 196. A z-axis stage 166 may be movably coupled to the x-axis stage 163 (such as along any suitable prismatic joint which may be substantially similar to prismatic joint 190 described above) for movement in the Z direction 198. A y-axis stage 168 may be movably coupled to the z-axis stage 166 (such as along any suitable prismatic joint which may be substantially similar to prismatic joint 190 described above) for movement in the Y direction 197. The Y-axis stage 168 may include an instrument mount 175 that is movable in the Y direction 197 by the y-axis stage 168, and to which the image analyzer 140 (or other suitable instrumentation) is coupled.

Each of the x-axis stage 163, the z-axis stage 166, and the y-axis stage 168 may include any suitable respective motor 164, 167, 169 for driving the respective x-axis stage 163, the z-axis stage 166, and the y-axis stage 168 along the respective X direction (or axis) 196, Z direction (or axis) 198, and Y direction (or axis) 197. The motors 164, 167, 169 may be operated through the controller 199 (manually and/or autonomously) or may be driven by manual operation of respective manual drive knobs 164M, 167M, 169M. The x-axis stage 163, the z-axis stage 166, and the y-axis stage 168 may provide fine positioning of the image analyzer 140 relative to the device under test 170 (and/or any suitable datum of the portable optic metrology thermal chamber module 150), where the imager is grossly positioned by the shuttle 120.

Figure 2:
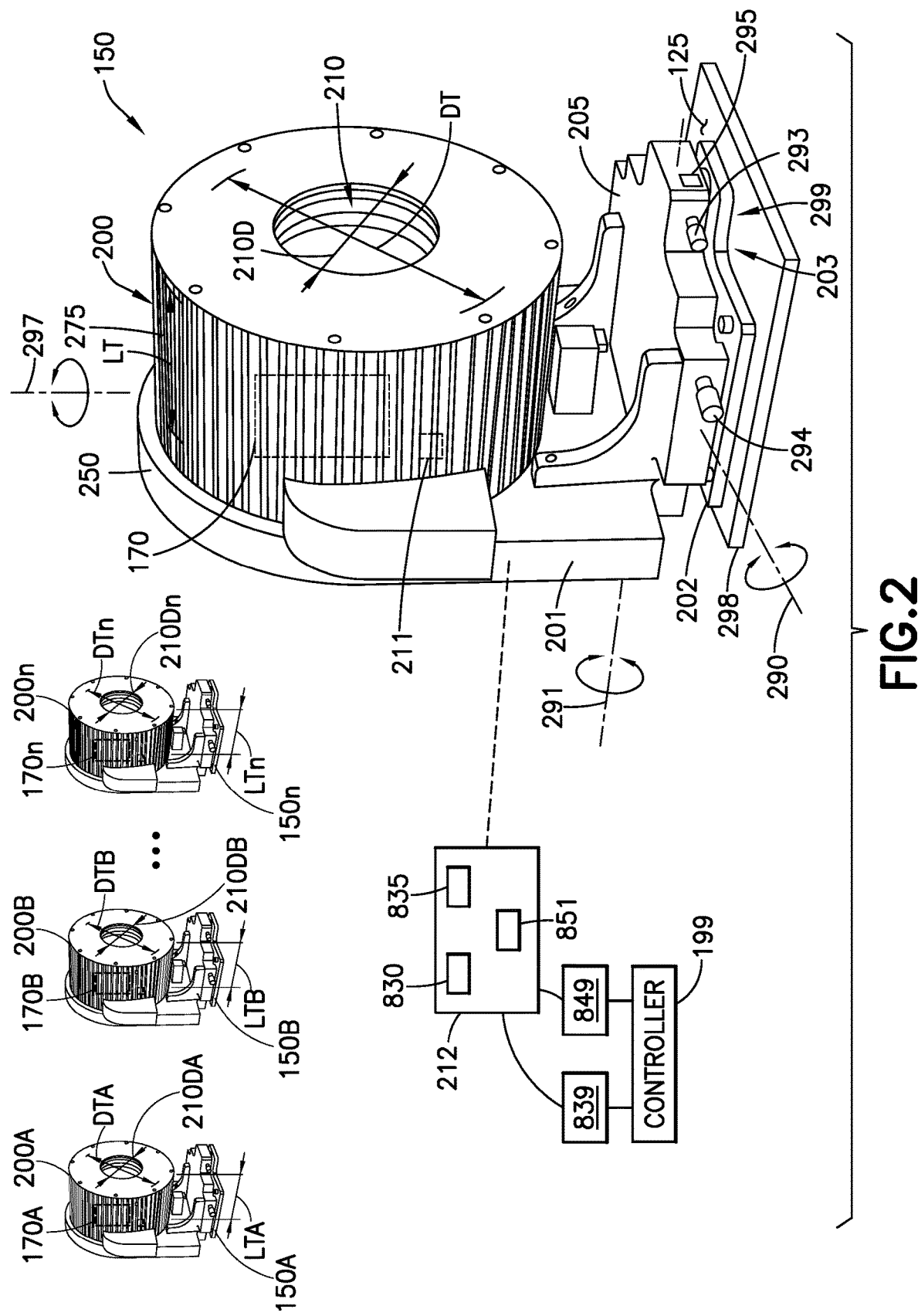
FIG. 2 is a schematic perspective illustration of a portable optic metrology thermal chamber module in accordance with aspects of the present disclosure.
Figure 3:
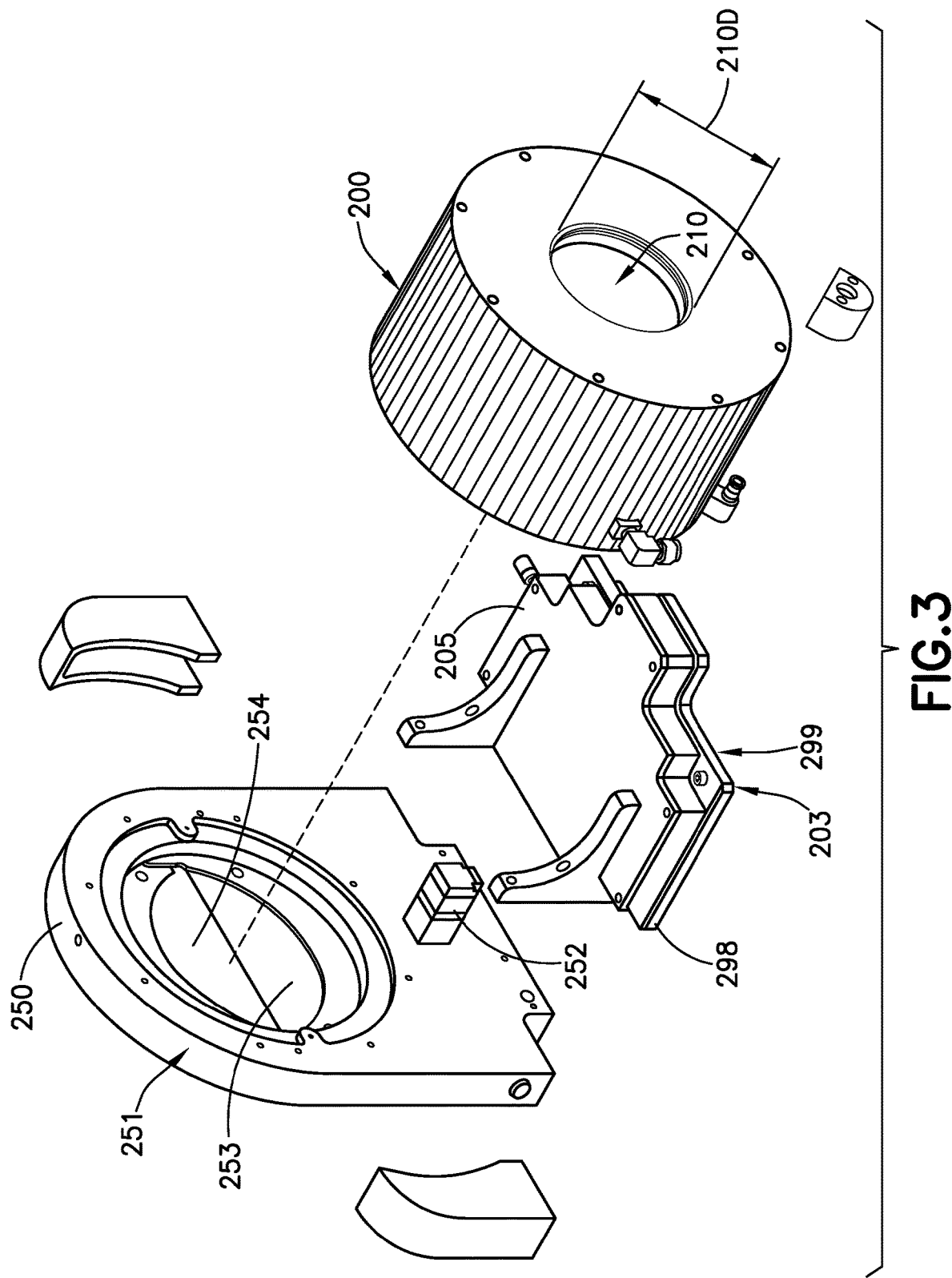
FIG. 3 is a schematic "exploded" illustration of the portable optic metrology thermal chamber module of FIG. 2 in accordance with aspects of the present disclosure.

Referring now to FIGS. 1A and 2, the portable optic metrology thermal chamber module 150 may be coupled to shuttle 121 between the image analyzer 140 (in the case of metrological testing of lenses 1400) and the metrology system stimulus source 102 so that the target/object path extends from the metrology system stimulus source 102 passes through the lens 1400 (FIG. 14) to the image analyzer 140. In the case of camera testing the image analyzer 140 may be omitted as the camera includes image analyzer 1540, (e.g. camera image sensor) where the portable optic metrology thermal chamber module 150 may be coupled to either shuttle 120, 121 so that target/object path extends from the metrology system stimulus source 102 to the image analyzer 1540 of the camera 1500 (FIG. 15). It is noted that the use of the directional expressions front and rear with respect to the portable optic metrology thermal chamber 150 are used for convenience only where the front refers to a side of the portable optic metrology thermal chamber 150 facing (i.e., that receives) the stimulus beam 188 generated by the metrology system stimulus source 102 and the rear refers to a side of the portable optic metrology thermal chamber 150 adjacent the image analyzer 140, 1540; however, it should be understood that in other aspects any spatial reference terms may be used.

The portable optic metrology thermal chamber module 150 includes a housing 200 and a module mount coupling 201 connected to the housing 200. The module mount coupling 201 defines a module mounting interface 299 of the portable optic metrology thermal chamber module 150 so as to modularly mount the portable optic metrology thermal chamber module 150 as an integral unit to a support 298 (e.g., such as one of the shuttles 120, 121) of the optic metrology system 100 of (e.g., having) the metrology system stimulus source 102. The module mounting interface 299 is configured so as to removably couple the portable optic metrology thermal chamber module 150 as a unit to one of the support 298 in a predetermined position relative to the metrology system stimulus source 102. The module mount coupling 201 includes a base 202 that includes a mounting surface 203 that interfaces with the seating surface 125 of the support 298 so as to interface with the controlled couplings of the seating surface 125 for locating the portable optic metrology thermal chamber module 150 in the predetermined position. An adjustable platform 205 is movably coupled to the base 202 for at least two-degree of freedom movement. For example, the platform 205 may be rotatable about a pitch axis 290, rotatable about a yaw axis 297, and/or rotatable about a roll axis 291 to, at least in part, facilitate alignment of the device under test 170 (FIGS. 1 and 2) with the projection path of a stimulus beam 188 (FIG. 1B) from the stimulus source 102 (FIGS. 1A-1D). In one aspect, the module mount coupling 201 includes any suitable pitch drive mechanism 293 (e.g., motors and/or jack screws substantially similar to those described above) for rotating of the platform 205 about the pitch axis 290. The module mount coupling 201 may also include any suitable roll drive mechanism 294 (e.g., motors and/or jack screws substantially similar to those described above) for rotating of the platform 205 about the roll axis 291. The module mount coupling 201 may also include any suitable yaw drive mechanism 295 (e.g., motors, rotary transmission, etc.) for rotating of the platform 205 about the yaw axis 297.

Figure 1C:
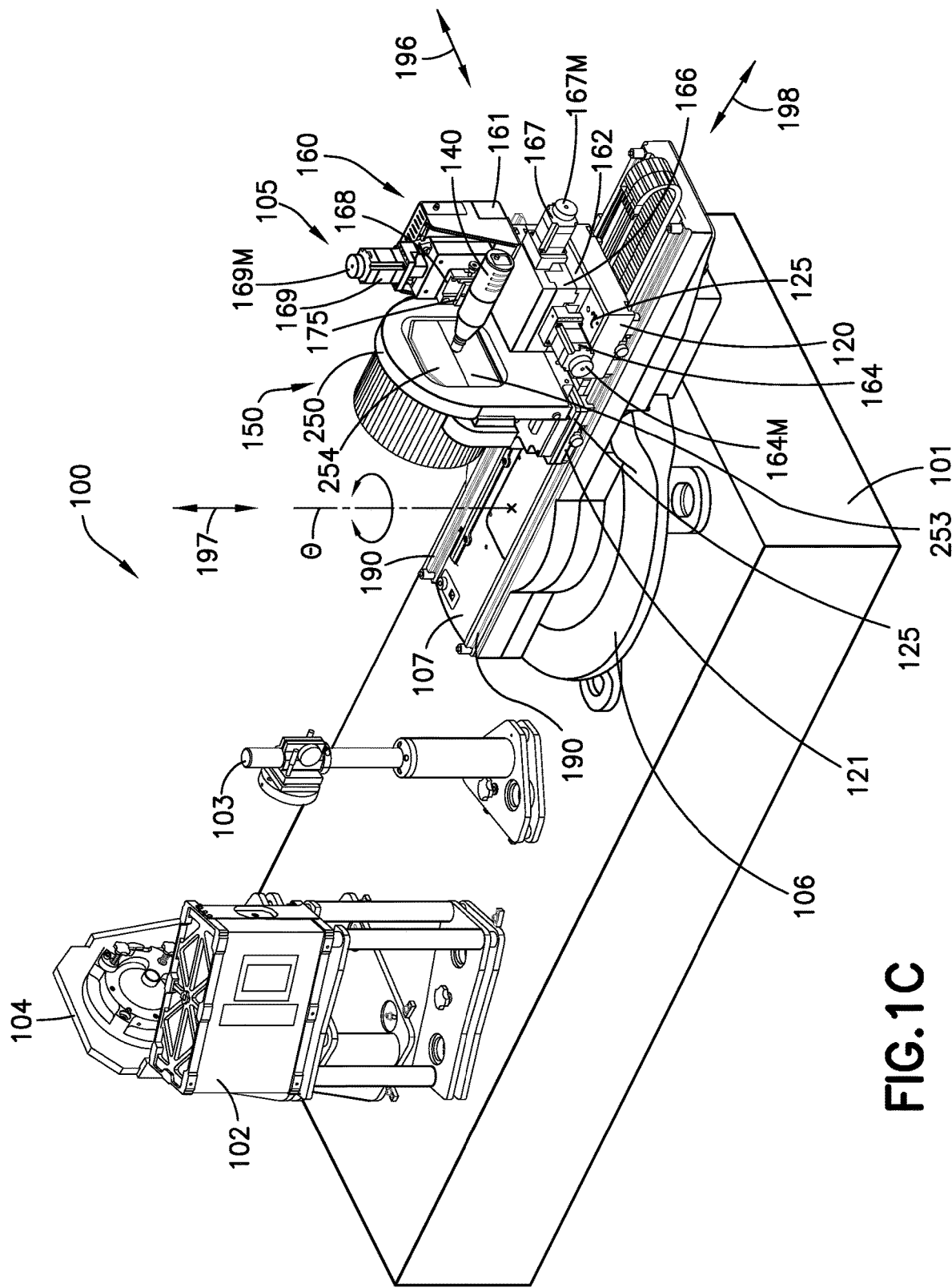
FIG. 1C is a rear perspective view of the optic metrology system of FIG. 1A.
Figure 1D:
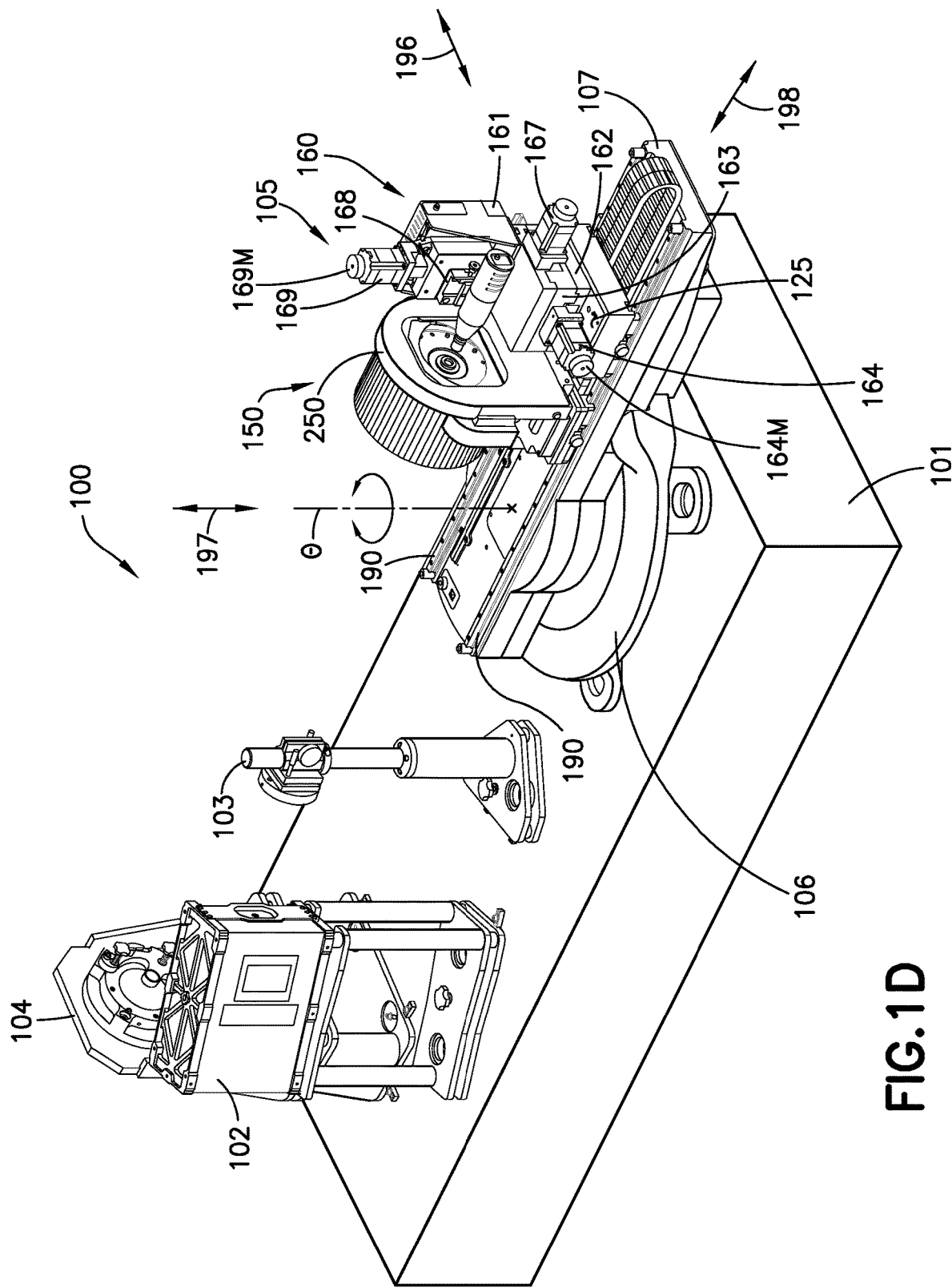
FIG. 1D is a rear perspective view of the optic metrology system of FIG. 1A with shutters of a portable optic metrology thermal chamber module removed for exemplary purposes.
Figure 4:
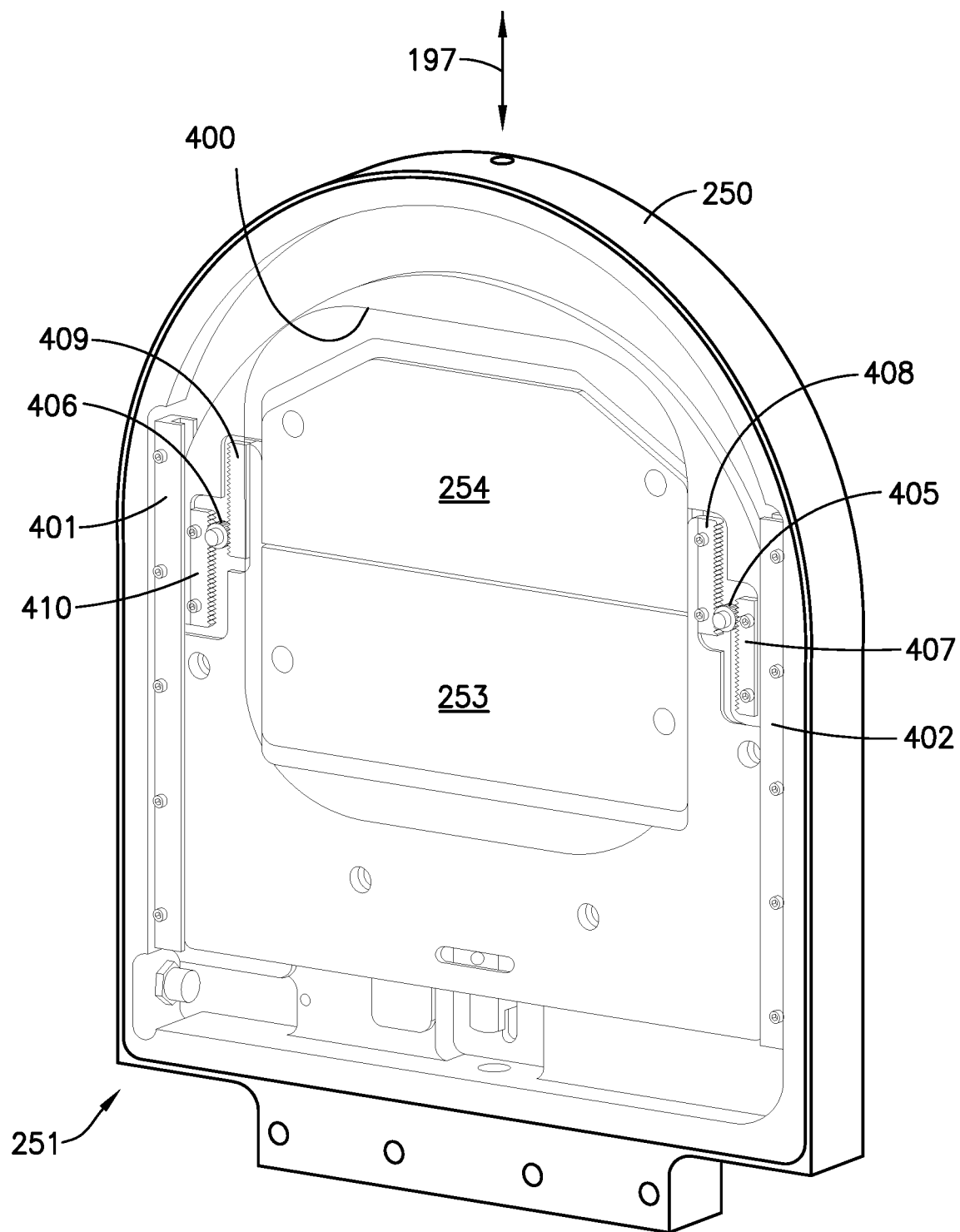
FIG. 4 is a schematic perspective illustration of a shutter assembly (with the rear casing illustrated as being transparent for exemplary purposes) of the portable optic metrology thermal chamber module in accordance with aspects of the present disclosure.

Referring to FIGS. 1C, 1D, 2, 3, and 4, a housing plate 250 is coupled to the platform 205 in any suitable manner and is configured to couple the housing 200 to the platform 205. In one aspect, the housing plate 250 comprises a shutter assembly 251 that includes a shutter drive 252 and shutter plates 253, 254. Referring particularly to FIGS. 1C, 1D, and 4 (which illustrates the shutter assembly 251 as shown with a cover 400 of the housing plate 250 as being "see through" for exemplary purposes only), the housing plate 250 includes rails 401, 402 that are configured in any suitable manner to linearly guide movement of the shutters 253, 254 in, for example Y direction 197 (e.g., the Z direction). In other aspects, the shutters 253, 254 and rails 401, 402 may be configured for movement of the shutters 253, 254 in the X direction 196 or any other suitable direction.

The shutter drive 252 is coupled to drive gears 405, 406 in any suitable manner (e.g., such as through pulleys, belts, bands, or any other suitable transmission). The drive gears 405, 406 may drive gear racks 407-410 that are coupled to a respective shutter 253, 254 (for example, gear racks 407, 410 may be coupled to shutter 253 while gear racks 408, 409 are coupled to shutter 254) for opening (the shutters are shown in the open position in FIG. 1D) and closing (the shutters are shown in the open position in FIG. 1C) the shutters 253, 254 to allow the stimulus beam 188 (FIG. 1B) passing from the device under test 170 (such as the lens 1400—FIG. 14) to stimulate image analyzer 140. While a plate type shutter system is illustrated in FIGS. 1C, 1D, 3, and 4 in other aspects the shutter system may be an iris type shutter system or any other suitable type of shutter system for selectively allowing passage of the stimulus beam 188 to the image analyzer 140. The shutter drive 252 may be coupled to the controller 199 for automated or manual operation of the shutter system. The controller 199 may be configured to provide or allow for the setting of a shutter speed (or exposure time) and/or an opening dimension of the shutter (e.g., an opening distance between the shutter plates 253, 254 may be controlled to minimize heat flow into and out of the housing 200) if desired; in other aspects, the shutter speed may be any suitable predetermined shutter speed.

Referring to FIGS. 2 and 13-15, the housing 200 defines the thermal chamber 1300, with a thermally isolated environment 1301 therein. The thermally isolated environment is isolated from ambient atmosphere 1302 as described herein. The thermal chamber 1300 is arranged for holding an optic device under test 170 (FIG. 1A), such as the lens 1400 or camera 1500 (FIGS. 14 and 15), within the isolated environment 1301. The housing 200 has an optic stimulus entry aperture 210 configured and disposed with respect to the optic device under test 170 (as will be described herein) within the thermal chamber 1300, for entry of the stimulus beam 188 (FIG. 1B), from the metrology system stimulus source 102 outside the thermal chamber 1300, through the optic stimulus entry aperture 210 onto an entry pupil 1401, 1501 (FIGS. 14 and 15) of the optic device under test 170 to an image analyzer 140 (FIGS. 1A-1D), 1540 (FIG. 15). In one aspect, the stimulus beam 188 generated by the metrology system stimulus source 102 onto the entry pupil 1401, 1501 is a collimated beam 137 (FIG. 1B). In other aspects, the stimulus beam 188 generated by the metrology system stimulus source 102 onto the entry pupil 1401, 1501 is an interferometer beam 138 (FIG. 1B). In one aspect, the collimated beam 137 may be employed for testing the device under test 170 for a stimulus source 102 appearing, relative to the device under test, to be infinitely far away; however, the testing of the device under test 170 may also be employed for sources that are to be at a finite distance from the device under test 170, where the stimulus source 102 is placed at the required physical distance from the device under test (in which case no collimator is used), or by placing a non-collimating optic between the stimulus source 102 and the device under test and optically making it appear that the object is at a finite distance. In these cases the impinging stimulus beam 188 is converging or diverging, in the diverging case the object is real.

The housing 200 may also include an optic stimulus exit aperture 1310 through which the stimulus beam 188 passes from an exit pupil 1402 of the (in the case of a lens 1400) of the optic device under test 170 to the image analyzer 140. The optic stimulus exit aperture may be blocked or closed through a coupling of the device under test 170 with the housing 200. In the case of a camera 1500 the optic stimulus exit aperture 1310 may not be provided or may be covered by the camera 1500. Mounting of the optic device under test 170 to the housing 200 will be described below.

The housing 200 is sized and shaped so that the portable optic metrology thermal chamber module 150, along with the module mount coupling 201, is portable as a unit (i.e., portable as a unit without disassembly of the portable optic metrology thermal chamber module 150) for moving the portable optic metrology thermal chamber module 150 to and removing the portable optic metrology thermal chamber module 150 from the predetermined position of the optic metrology system 100. In one aspect, the housing 200 defines a predetermined optic metrology characteristic of the portable optic metrology thermal chamber module 150 that corresponds to the device under test 170 held in the thermal chamber 1300. For example, the predetermined optic metrology characteristic of the portable optic metrology thermal chamber module 150 may be a thermal chamber length LT, a thermal chamber diameter DT, an optic stimulus entry aperture diameter 210D, and/or any other suitable characteristic that corresponds to the device under test 170 that may effect a change in shape or size of the portable optic metrology thermal chamber module 150. It is noted that while a thermal chamber diameter DT is referred to herein, the thermal chamber 1300 may have any other suitable shape (e.g., rectangular, octagonal, etc.) which along with the thermal chamber length LT forms an interior volume of the thermal chamber 1300.

In one aspect, the portable optic metrology thermal chamber module 150 is selectably interchangeable from a number of other different portable optic metrology thermal chamber modules 150A-150n (FIG. 2). Each of the other different portable optic metrology thermal chamber modules 150A-150n have a different predetermined optic metrology characteristic (e.g., thermal chamber 1300 diameter DTA-DTn, thermal chamber length LTA-LTn, optic stimulus entry aperture diameter 210DA-210Dn, etc.) that specifically corresponds to at least one other different device under test 170A-170n (FIG. 2) so as to differentiate the portable optic metrology thermal chamber module 150 from each of the other selectably interchangeable portable optic metrology thermal chamber modules 150A-150n. In one aspect, the predetermined optic metrology characteristic of the devices under test 170, 170A-170n is a length L of the device under test 170, 170A-170n, a diameter D of the device under test 170, 170A-170n, a type (e.g., lens or camera) of the device under test 170, 170A-170n, an angular field of view FOV (FIGS. 14 and 15) of the device under test 170, an entry pupil 1401, 1501 (FIGS. 14 and 15) diameter, a focal length of the device under test, a focal plane of the device under test, and/or any other suitable physical/optical characteristics of the device under test 170, 170A-170n. The portable optic metrology thermal chamber module 150 is mounted to the optic metrology system 100 for testing the device under test 170 within the portable optic metrology thermal chamber module 150. As described above, the portable optic metrology thermal chamber module 150 is (or may be) interchanged (as a module unit) with one of the other different interchangeable portable optic metrology thermal chamber modules 150A-150n that may be interchangeably mounted (each as a unit) to the optic metrology system 100 in place of the portable optic metrology thermal chamber module 150 for testing the at least one other different device under test 170A-170n with the optic metrology system 100.

Still referring to FIGS. 2 and 13-15, the housing 200, 200A-n of the portable optic metrology thermal chamber module 150 and each of the other interchangeable portable optic metrology thermal chamber modules 150A-150n respectively is sized (e.g., length and or diameter) so the thermal chamber 1300 of the portable optic metrology thermal chamber module 150 and of each other interchangeable portable optic metrology thermal chamber module 150A-150n matches a different device under test 170, 170A-170n size (as described above). In one aspect, the housing 200 is configured so that the thermal chamber 1300 defined thereby has a variably selectable size (e.g., length LT, LT1-LTn) such as for example, matched to a size of the device under test 170, 170A-170n. For example, the housing 200 may include housing sections 500 (see FIG. 5) that may be added or removed to change the length LT, LTA-LTn of the thermal chamber 1300. Here, by changing at least the length LT, LTA-LTn of the thermal chamber 1300, the housing 200, 200A-200n is configurable/reconfigurable from a first configuration defining the predetermined optic metrology characteristic of the portable optic metrology thermal chamber module 150, to a second configuration that forms at least one of the other different portable optic metrology thermal chamber modules 150A-150n with the different predetermined optic characteristic corresponding thereto.

Figure 5:
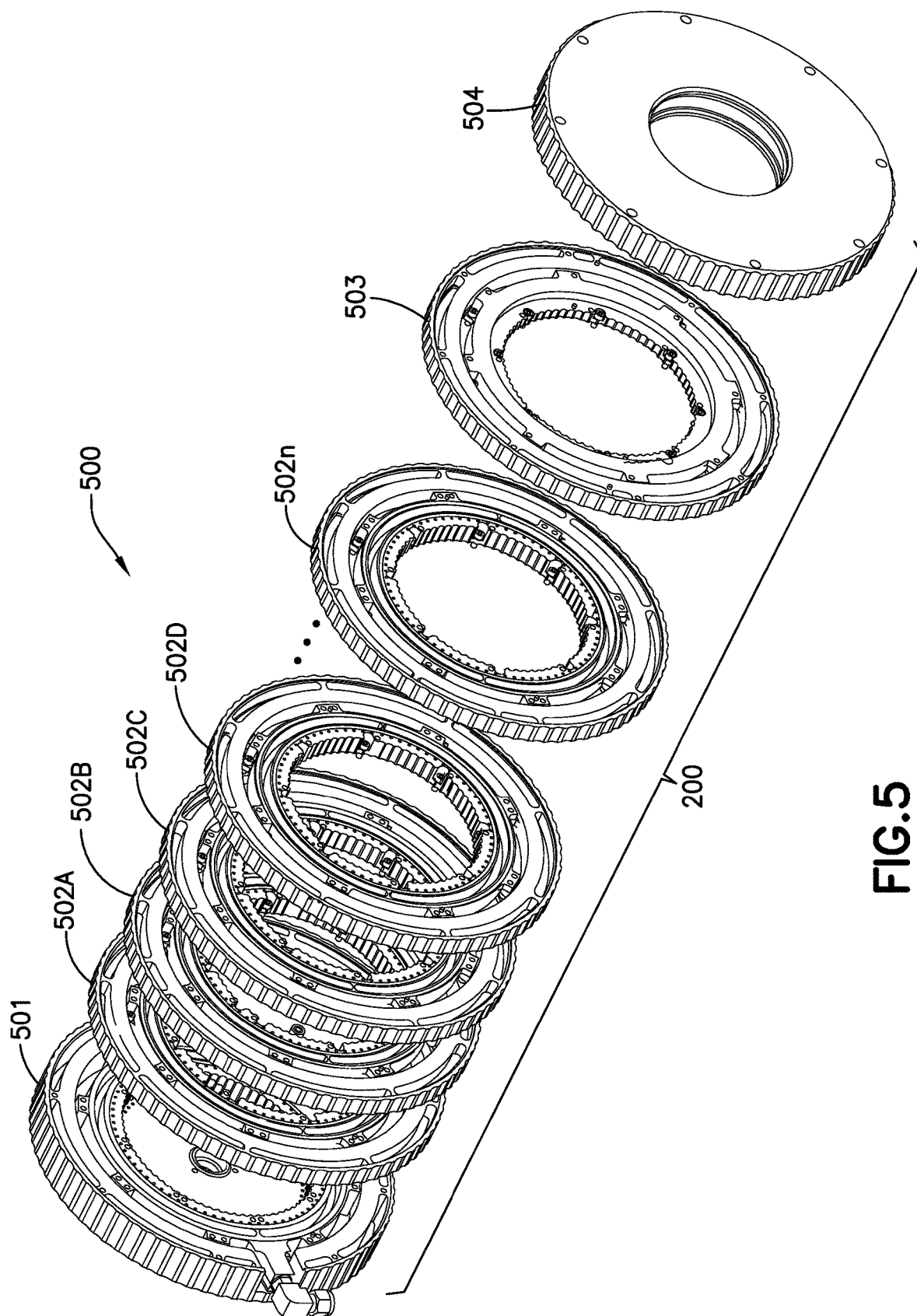
FIG. 5 is a schematic "exploded" illustration of a housing of the portable optic metrology thermal chamber module in accordance with aspects of the present disclosure.
Figure 13:
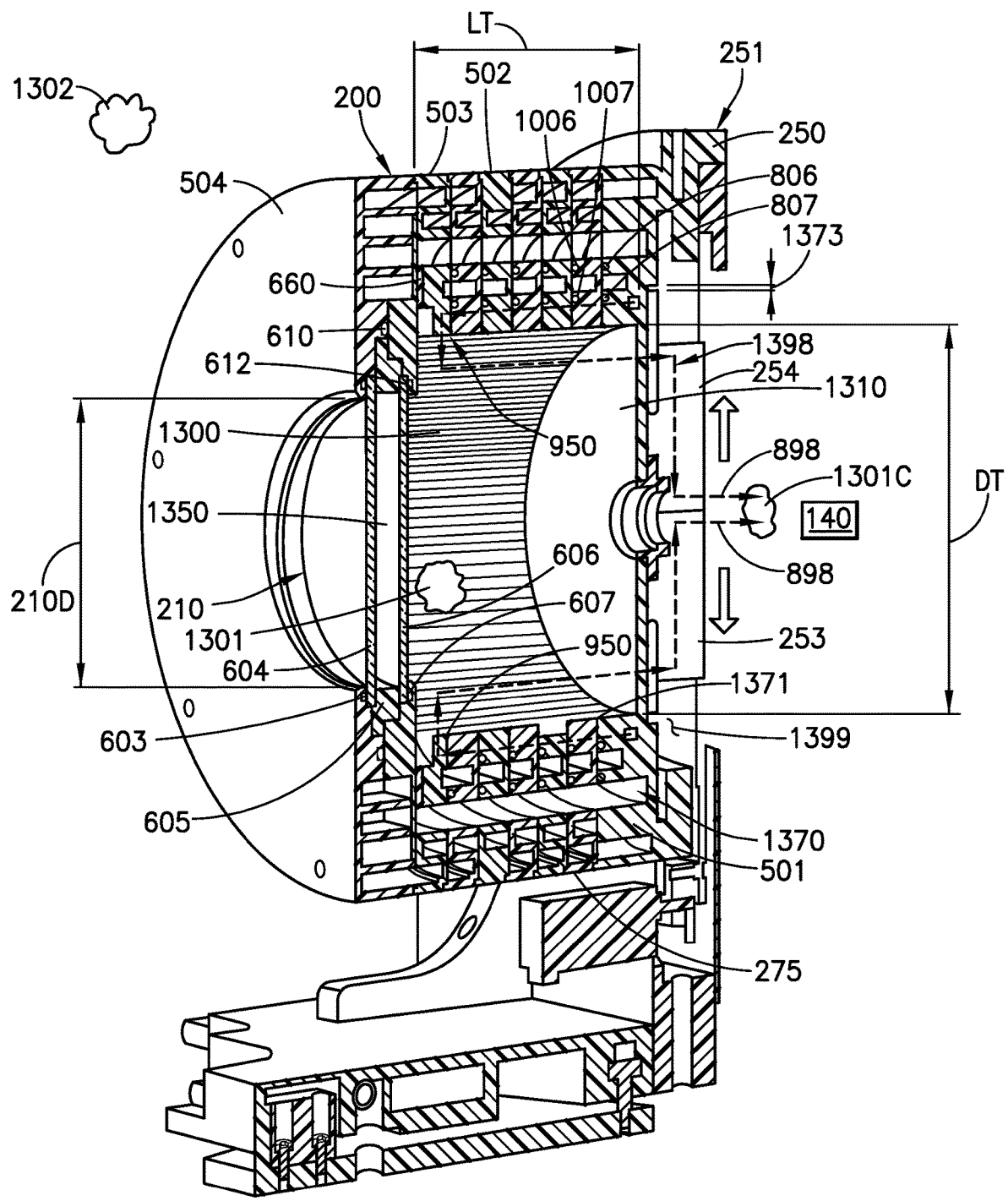
FIG. 13 is a cross-sectional perspective illustration of the portable optic metrology thermal chamber module of FIG. 2 illustrating circulating thermal control fluid flow through a thermal chamber in accordance with aspects of the present disclosure.

Referring to FIGS. 2, 5 and 13, the housing 200 includes housing sections 500 that are coupled together to form the thermal chamber 1300. For example, the housing sections 500, in accordance with one aspect therein are sectional modules (so that each thermal chamber module is itself an assembly of sectional module units as will be described) that include, for example, a heat exchanger base plate section 501, one or more heat exchanger mid-section 502A-502n, a heat exchanger end cap section 503, and a heat exchanger window assembly section 504. The housing 200 comprises an exterior insulating case 275 and a heat exchanger 1370 (FIG. 13) disposed at least in part within the insulating case 275. The heat exchanger 1370 defines at least a peripheral wall 1371 of the thermal chamber 1300 holding the thermally isolated environment 1301. The exterior insulating case 275, the heat exchanger 1370, and the thermal chamber 1300 may be formed by the housing sections 500 as will be described herein.

Referring to FIGS. 5, 6, and 13, the heat exchanger window assembly section 504 includes an insulating front cover 600, an insulating rear cover 611, and a glazing assembly 602 disposed between (so as to be sandwiched between to compress the seals thereof) disposed between the insulating front cover 600 and the insulating rear cover 611. The insulating front cover 600 and the insulating rear cover 611 may be formed of any suitable insulating material (e.g., G-10 insulation or any suitable densely packed or laminated insulative material) that may be rigid or compliant but in any event is able to be coupled with fasteners (either through threaded holes formed in the insulative material or the use of rigid bushings, washers, fastener inserts molded into the insulating material, etc.) to other portions of the housing 200. The insulating front cover 600 includes a portion 210P1 of the optic stimulus entry aperture 210 and a recessed seating surface 601 for a glazing assembly. The insulating rear cover 611 includes a portion 210P2 of the optic stimulus entry aperture 210 and a recessed seating surface 612 (FIG. 13) for the glazing assembly 602.

The glazing assembly is, for example, a double paned window that includes a first window glazing 604 and a second window glazing 606 (in other aspects there may be more or less than two window glazings), the glazing material may be any suitable optically transparent material with optic transmission properties commensurate with stimulus beam characteristics. A first resilient seal member 603 (which may be an O-ring or other suitable seal) is disposed against the recessed seating surface 601 so as to surround the portion 210P1 of the optic stimulus entry aperture 210 and so as to be located between the recessed seating surface and the first glazing 604. A spacer member 605 is disposed between the first glazing 604 and the second glazing 606 so as to provide a substantially non-conductive insulative space 1350 (see FIG. 13) between the first glazing 604 and the second glazing 606 that may be filled with any suitable gas (including inert gases such as argon). A second resilient seal member 607 (which may be an O-ring or other suitable seal) is disposed against the recessed seating surface 612 (FIG.

13) so as to surround the portion 210P2 of the optic stimulus entry aperture 210 and so as to be disposed between the second glazing 606 and the insulating rear cover 611.

A third resilient seal member 610 (which may be an O-ring or other suitable seal) is disposed within recess 609 of the insulating front cover 600 so as to be disposed between the insulating front cover 600 and the insulating rear cover 611. As may be realized from FIG. 13, the first resilient seal member 603, the second resilient seal member 607, and the third resilient seal member 610 are arranged to seal the substantially non-conductive insulative space 1350 so that the substantially non-conductive insulative space 1350 is isolated from the ambient atmosphere 1302. A sealing ring 660 is provided on the rear insulating cover 600 opposite the glazing assembly 602 so as to seal the heat exchanger window assembly section 504 against the heat exchanger end cap section 503 as illustrated in FIG. 13.

The insulating front cover 600 and the glazing assembly 602 may form, at least in part, the exterior insulating case 275. The exterior insulating case 275 may have any suitable surface texture to facilitate gripping of the housing 200; while in other aspects, the exterior insulating cover 275 may not be textured. The insulating rear cover 611 and the glazing assembly 602 may form, at least in part, a front end wall of the thermal chamber 1300. For a given chamber diameter DT (FIG. 2), the heat exchanger window assembly section 504 may be selected from a number of different the heat exchanger window assembly sections 504A-504n each having a different optic stimulus entry aperture diameter 210DA-210Dn, where the selection of the heat exchanger window assembly section 504 may depend on one or more of a field of view FOV (FIGS. 14 and 15), a diameter D of the device under test, and length L of the device under test 170 as will be described herein.

Figure 8A:
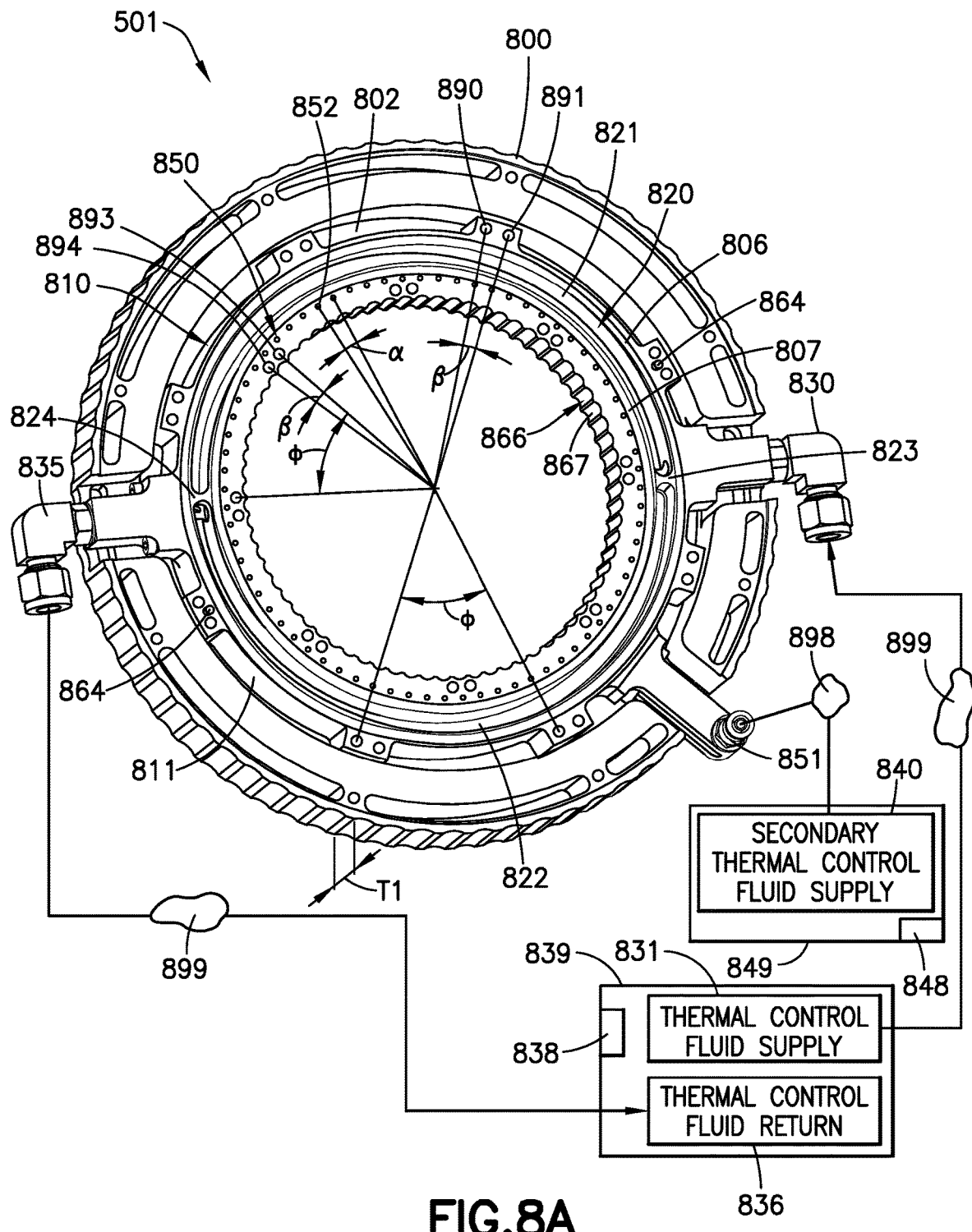
FIG. 8A is a schematic front perspective illustration of a heat exchanger base plate of the heat exchanger of FIG. 7A in accordance with aspects of the present disclosure.
Figure 8B:
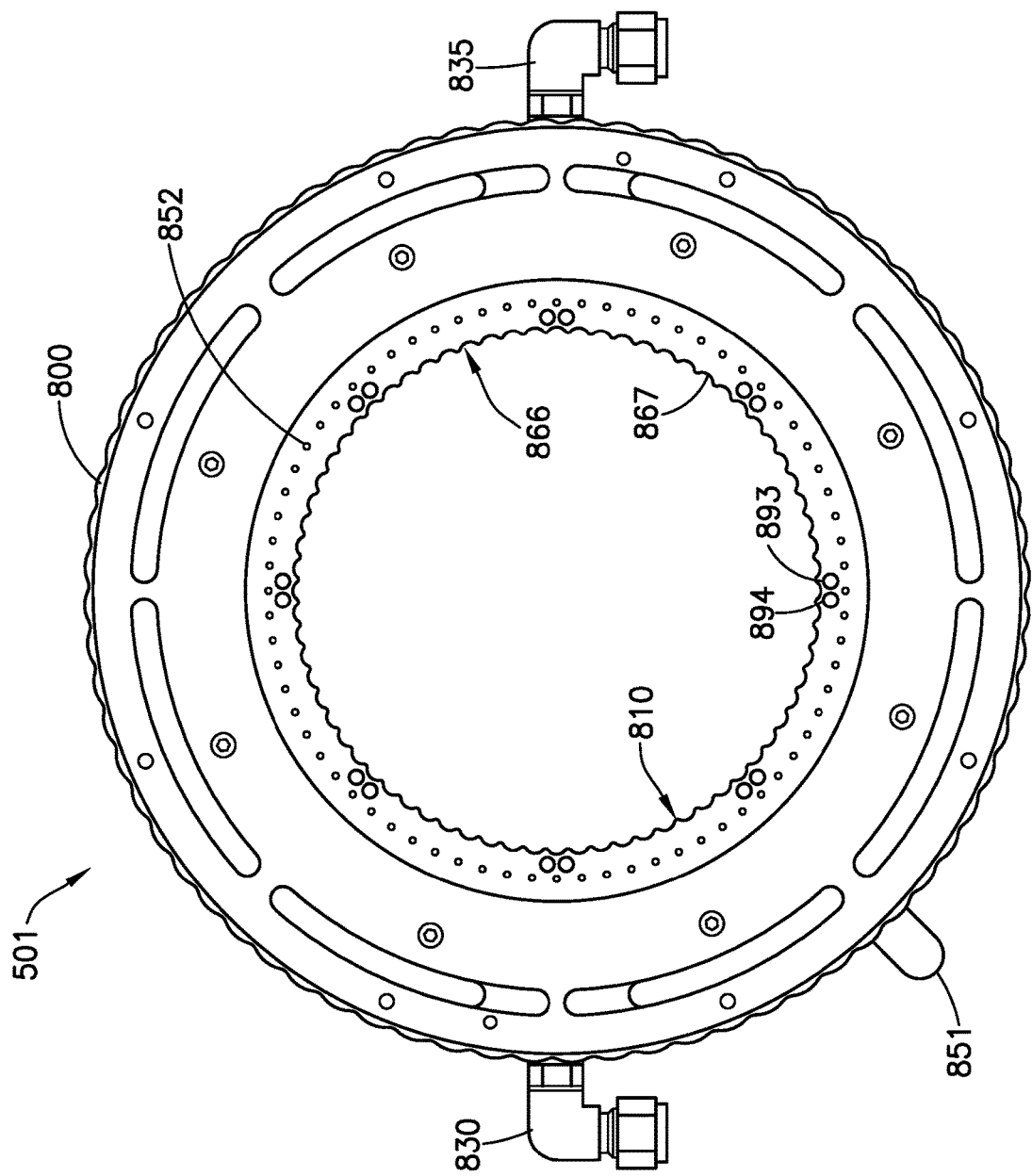
FIG. 8B is a schematic rear illustration of the heat exchanger base plate of FIG. 8A in accordance with aspects of the present disclosure.

Referring to FIGS. 5, 8A, 8B and 13, the heat exchanger base plate section 501 is illustrated and includes an insulating portion 800 that includes a recess 802 in which a base plate exchange member 810 is disposed. The heat exchanger base plate section 501 may have any suitable thickness T1 that contributes to the length LT of the thermal chamber 1300. The insulating portion 800 may form, at least in part, the exterior insulating case 275 of the housing 200. The insulating portion 800 surrounds a peripheral edge 811 of the base plate heat exchange member 810 where the base plate heat exchange member is coupled to the insulating portion 800, within the recess 802, in any suitable manner (e.g., such as with removable fasteners). The base plate heat exchange member 810 forms, at least in part, the heat exchanger 1370 and includes a bifurcated heat exchange fluid channel 820 that includes an flow channel 821 and an flow channel 822 that are separated from one another by walls 823, 824. Any suitable sealing members 806, 807 may be disposed radially inward and radially outward of the bifurcated heat exchange fluid channel 820 so as to seal the flow channel 821 and the flow channel 822 of the bifurcated heat exchange fluid channel 820 against an adjacent sealing surface (see sealing surfaces 998, 999 in FIG. 9B and surface 1099 in FIG. 10B) of an adjacent housing section as will be described herein.

Figure 12A:
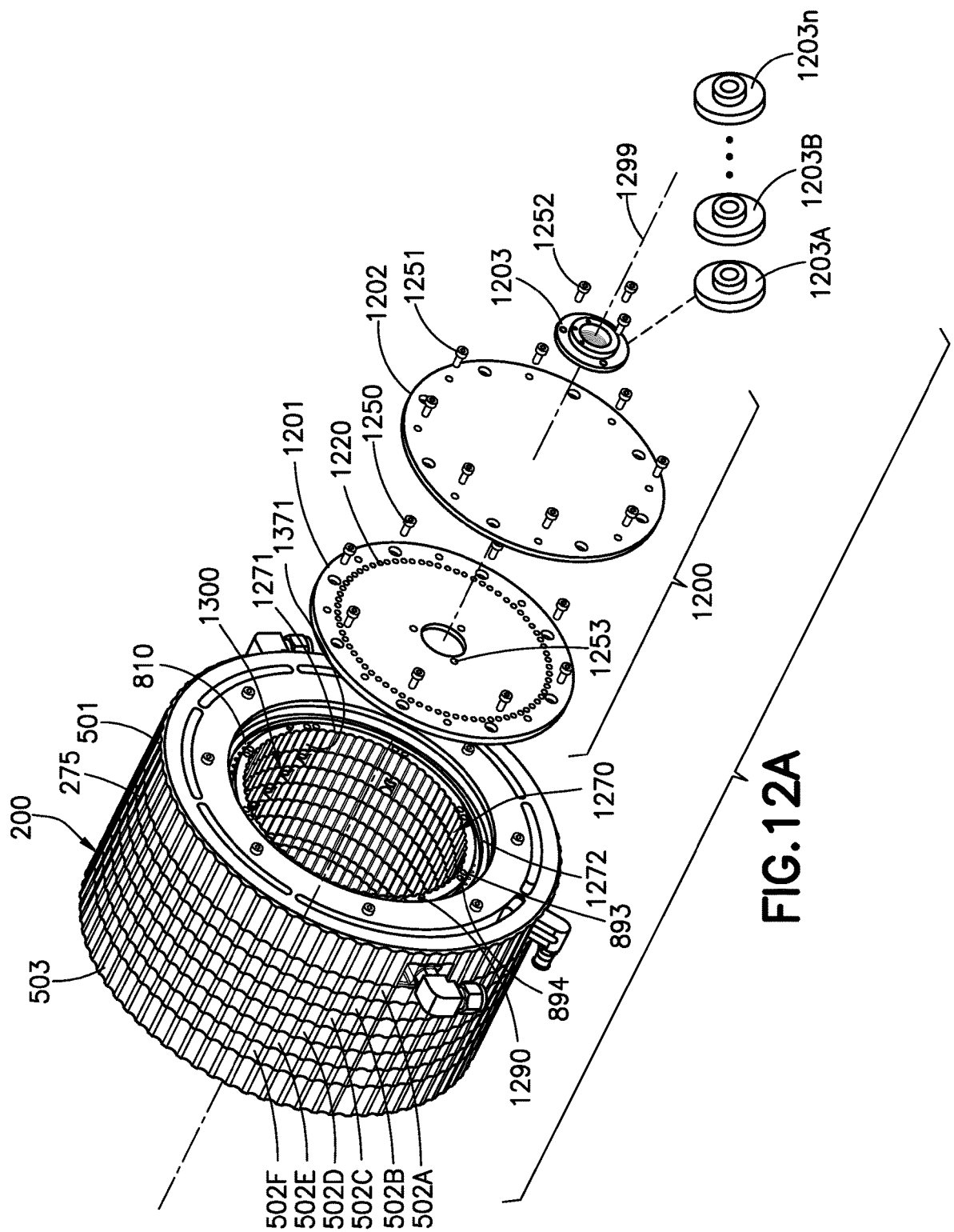
FIG. 12A is a schematic perspective illustration of the housing of FIG. 5 with an exploded illustration of an exemplary optic device under test mount in accordance with aspects of the present disclosure.
Figure 12B:
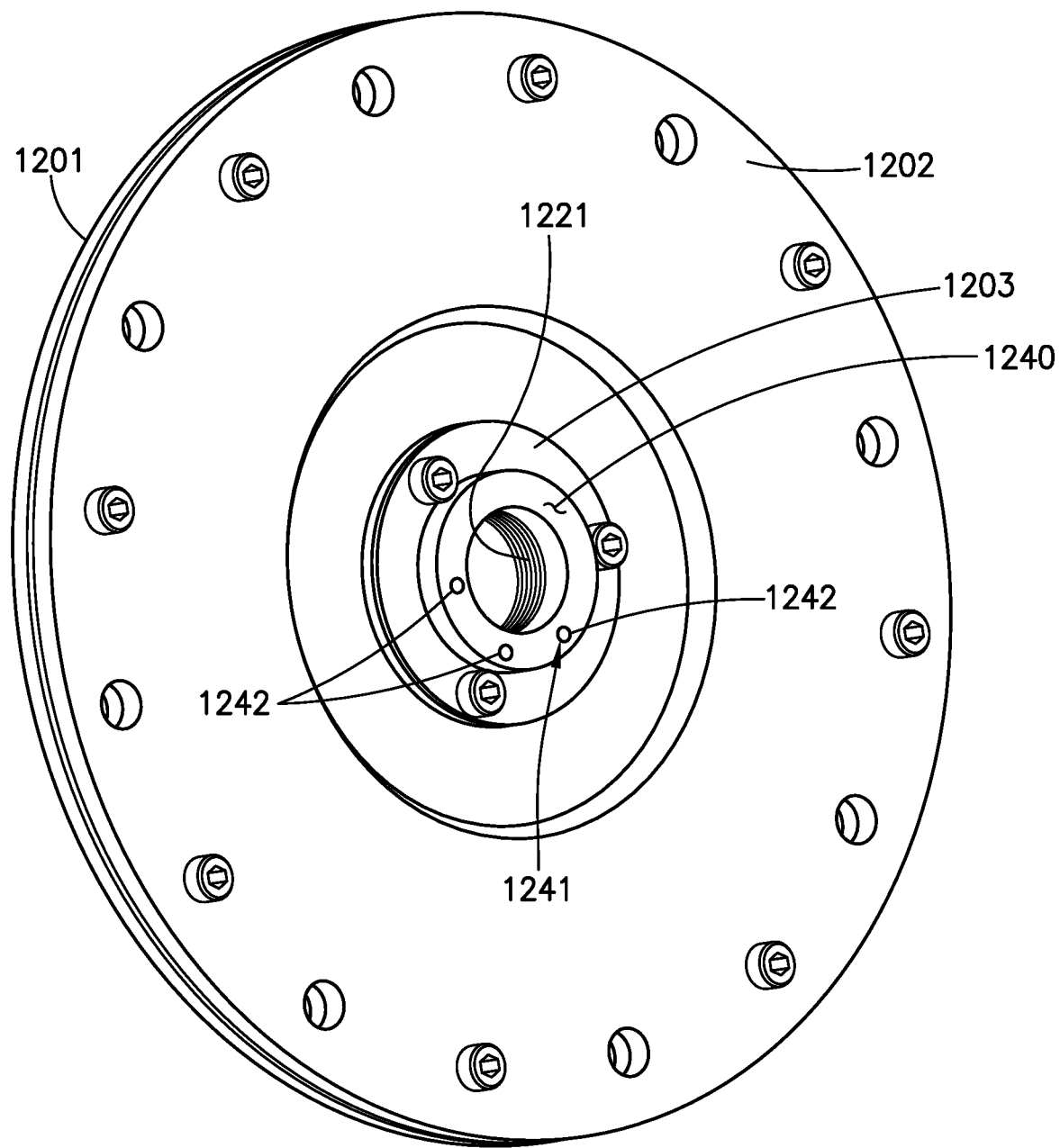
FIG. 12B is a schematic rear perspective illustration of the optic device under test mount of FIG. 12A in accordance with aspects of the present disclosure.
Figure 12C:
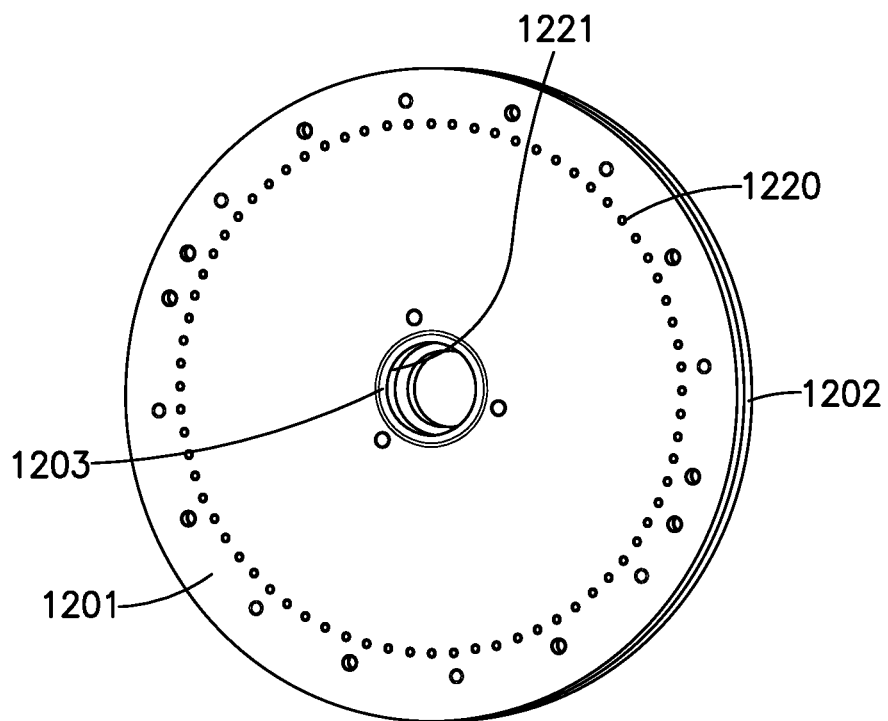
FIG. 12C is a schematic front perspective illustration of the optic device under test mount of FIG. 12A in accordance with aspects of the present disclosure.
Figure 12D:
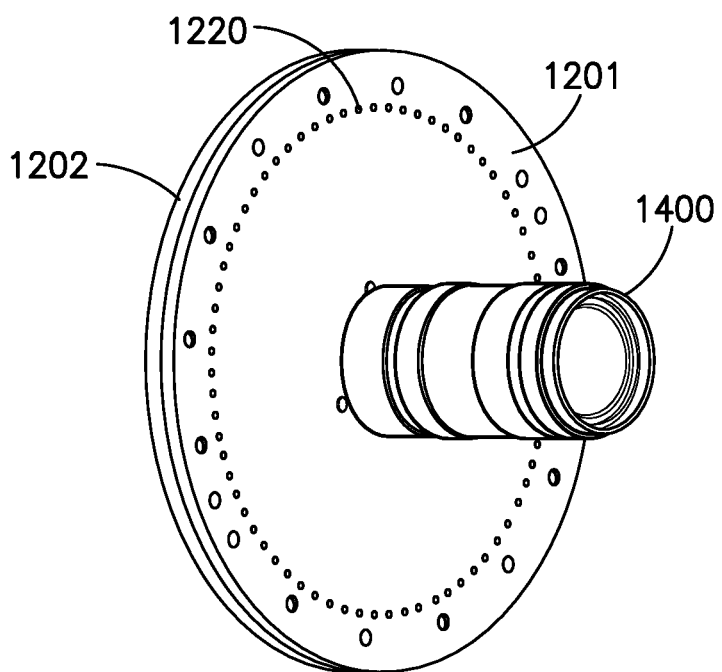
FIG. 12D is a schematic front perspective illustration of the optic device under test mount of FIG. 12A with an optic device under test coupled thereto in accordance with aspects of the present disclosure.

The walls 823, 824 are disposed on substantially opposite sides (e.g., about 180° apart from one another) of the base plate heat exchange member 810 so that an inlet thermal control fluid flows around substantially half of the base plate heat exchange member 810 and an outlet thermal control fluid flows around substantially the other half of the base plate heat exchange member 810. The flow channel 821 is in fluid communication with an inlet coupling 830 that is communicably coupled to a thermal control fluid supply 831 of a fluid circulator 839 so as to supply thermal control fluid from the fluid circulator 839 to the flow channel 821. The flow channel 822 is in fluid communication with an outlet coupling 835 that is communicably coupled to a thermal control fluid return 836 of the fluid circulator 839 so as to return thermal control fluid from the flow channel 822 to the fluid circulator 839. In other aspects, coupling 835 may be the inlet and coupling 830 may be the outlet. The fluid circulator 839 may include any suitable heater and/or cooler to raise or decrease a temperature of the thermal control fluid depending on a predetermined temperature of the device under test 170 that is to be set by the thermal chamber 1300. The predetermined temperature (or mass flow rate of the thermal control fluid) may be set manually using any suitable user interface 838 of the fluid circulator 839 or through automation as will be described herein, where the fluid circulator 839 is coupled to the controller 199 and one or more thermal sensors 1466 (FIGS. 14 and 15) disposed within (e.g. on the device under test) or on the thermal chamber 1300. In one aspect, the one or more thermal sensors 1466 may be platinum resistance thermometer(s) or any other suitable thermal sensor coupled (in any suitable manner) to the thermal chamber, the device under test 170, and/or any suitable device under test coupling features 1221 (see FIGS. 12B and 12C) configured to couple with a mounting flange 1404, 1504 (see FIGS. 14, 15) of the device under test 170 to, e.g., couple the device under test to the mounting plate 1201.

In one aspect, the heat exchanger base plate section 501 (as well as the one or more heat exchanger mid-section 502A-502n and the heat exchanger end cap section 503) are configured to form a heat exchanger 1370. The heat exchanger 1370 may be a circulating fluid heat exchanger. In one aspect, the heat exchanger 1370 is a dual circulating fluid heat exchanger with a primary circulating thermal control fluid 899, (e.g. thermal control liquid such as silicone heat transfer fluid) and a secondary circulating thermal control fluid 898 (e.g. dry air, or inert gas such as nitrogen) thermally interfacing with the primary circulating thermal control fluid 899 and the isolated environment of the thermal chamber 1300 so as to provide a thermal feed from the primary circulating thermal control fluid 899 into the isolated environment so as to set a temperature of the device under test 170 in the thermal chamber 1300 as will be described in greater detail below. The heat exchanger base plate section 501 includes a circumferential array of secondary thermal control fluid passages 850 that are communicably coupled to a secondary control fluid inlet coupling 851. In some aspects, the secondary control fluid inlet coupling 851 is communicably coupled to a secondary thermal control fluid supply 840 of a fluid circulator 849 (pressurized gas source) so as to supply the secondary circulating thermal control fluid 898 to the array of secondary thermal control fluid passages 850. The fluid circulator 849 may include any suitable heater and/or cooler to precondition the secondary thermal control fluid 898 prior to feed into the heat exchanger, depending on a predetermined temperature of the device under test 170 that is to be set by the thermal chamber 1300. The predetermined precondition fluid property (or mass flow rate of the thermal control fluid) may be set manually using any suitable user interface 848 of the fluid circulator 849 or through automation as will be described herein, where the fluid circulator 849 is coupled to the controller 199 and one or more thermal sensors 1466 (FIGS. 14 and 15) disposed within or on the thermal chamber 1300. In one aspect, the secondary control fluid inlet coupling 851, the inlet coupling 830, and the outlet coupling 835 may form a common fluid manifold 212 (FIG. 2) that is commonly configured for the different housings 200, 200A-200n (and the respective different portable optic metrology thermal chamber module 150, 150A-150n). The common fluid manifold 212 may provide coupling and uncoupling of the portable optic metrology thermal chamber modules 150, 150A-150n in a plug-and-play manner as the portable optic metrology thermal chamber modules 150, 150A-150 are interchanged on device under test platform 105 of the metrology system 100.

Each fluid passage 852 in the array of secondary thermal control fluid passages 850 may be radially spaced from an adjacent fluid passage 852 by any suitable angle α. The array of secondary thermal control fluid passages 850 may be arranged on the heat exchanger base plate section 501 so that the walls 823, 824 are disposed so as to be aligned between adjacent fluid passages 852 to facilitate formation of the primary and a secondary fluid flow paths that extend between the heat exchanger base plate section 501 and the heat exchanger end cap section 503 as will be described herein. The walls 823, 824 and the array of the secondary thermal control fluid passages 850 may also have a predetermined angular relationship with coupling bosses 892 having coupling features 890, 891 that radially clock adjacently coupled sections of the housing 200 to each other to rotationally/angularly offset the walls 823, 824 from housing section to adjacent housing section forming the primary and a secondary fluid flow paths as will be described herein. In one aspect one of the coupling features 890, 891 may be threaded holes configured to threadably engage a screw/bolt. One of the coupling features 890, 891 may facilitate coupling of the insulating portion 800 to the base plate exchange member 810; while another of the coupling features 890, 891 may facilitate coupling of the heat exchanger base plate section 501 to other sections of the housing 200.

To substantially evenly compress the sealing members 806, 807 one or more coupling features 893, 894, may be disposed on the base plate heat exchange member 810 radially inward of the sealing members 806, 807 while the coupling features 890, 891 are disposed radially outward of the sealing members 806, 807. The one or more coupling features 893, 894 may be threaded holes that are rotationally/angularly staggered from the coupling features 890, 891 by an angle that is about half of angle Φ or by any other suitable angle that effects substantially uniform compression of the sealing members 806, 807. The one or more coupling features 893, 894 may receive a screw/bolt 933 (FIG. 9A), 1033 (FIG. 10A) passing through a coupling feature 994 (FIG. 9B), 1094 (FIG. 10B) from another housing section to facilitate coupling the heat exchanger base plate section 501 to the other housing section and substantially even compression of the sealing members 806, 807.

In one aspect, the coupling bosses are rotationally/angularly spaced from one another by an angle Φ which may be an integer multiple of angle α between adjacent fluid passages 852 so that at least one of the coupling features 890, 891 is radially aligned with a fluid passage 852. The coupling features 890, 891 may be radially spaced from each other by angle β as shown in FIG. 8A where the angle β is an integer multiple of the angle α. In one aspect, the angle β may be substantially the same as angle α so that the coupling features 890, 891 are aligned with corresponding fluid passages 852 (i.e., so that when a first one of the adjacent housing sections (see housing sections 501-503 in FIG. 7A) is coupled to a second one of the adjacent housing sections, the second housing section is rotated relative to the first housing section by an amount substantially equal to the angle α so that the fluid passages of the first and second adjacent housing sections are aligned and the walls 823, 824 (or walls 1023, 1024—see FIG. 10A) of the first housing section are staggered (see FIG. 11A) from the walls 1023, 1024 (or walls 823, 824) of the second adjacent housing section by an amount substantially equal to angle α).

The inner peripheral edge 866 of the heat exchanger base plate section 501 may, at least in part, form the peripheral wall 1371 of the thermal chamber 1300. The inner peripheral edge 866 may be contoured in any suitable manner to, for example, increase the surface area of the inner peripheral edge 866 and define fluid channels directing flow of the secondary thermal control fluid along the interior wall of the thermal chamber aligned with exhaust ports 1220 at the back of the chamber (see FIGS. 12A-B, 13). Increasing the surface area of the inner peripheral edge may increase one or more of a thermal transfer from the primary circulating thermal control fluid 899 into the thermal chamber 1300 and an effective emissivity of the surface (e.g., improving the radiant heat transfer to the device under test). In other aspects, the inner peripheral edge 866 may not be contoured. In the example, shown in FIGS. 8A and 8B, the contour provides a scalloped or channeled surface; however, in other aspects any suitable geometries (such as fractal-like geometries) may be formed on the inner peripheral edge. Each scallop 867 (or other suitable geometry) may also have a predetermined angular relationship (e.g., in one aspect the scallops may be radially aligned with corresponding fluid passages 852 and radially spaced from each other by the angle α as shown in FIG. 8A, while in other aspects the scallops may have any suitable radial spacing) so as to provide fluid flow channels on an inner peripheral wall of the thermal chamber (as shown in FIG. 13) that extend from the between the heat exchanger base plate section 501 and the heat exchanger end cap section 503.

Any suitable alignment pins 864 (or other suitable alignment features) may be provided on the coupling bosses 892 or at any other suitable location of the housing sections for rotationally aligning the sections of the housing relative to one another (e.g., where the alignment pins 864 fit into corresponding recess of an adjacent housing section).

Referring to FIGS. 5, 9A, 9B and 13, the heat exchanger end cap section 503 is illustrated and includes an insulating portion 900 and an end cap exchange member 910. The heat exchanger end cap section 503 may have any suitable thickness T2 that contributes to the length LT of the thermal chamber 1300. The insulating portion, at least in part, forms the insulating cover 275 and may be substantially similar to insulating portion 800; however, the insulating portion 900 includes mounting tabs 901 that interface with coupling bosses 992 of the end cap exchange member 910 for coupling the insulating portion 900 to the end cap exchange member 910. For example, any suitable screws/bolts may extend through apertures of the mounting tabs 901 to threadably engage coupling features 997 of the coupling bosses 992 (or vice versa) to couple the insulating portion 900 to the end cap exchange member 910.

Figure 9A:
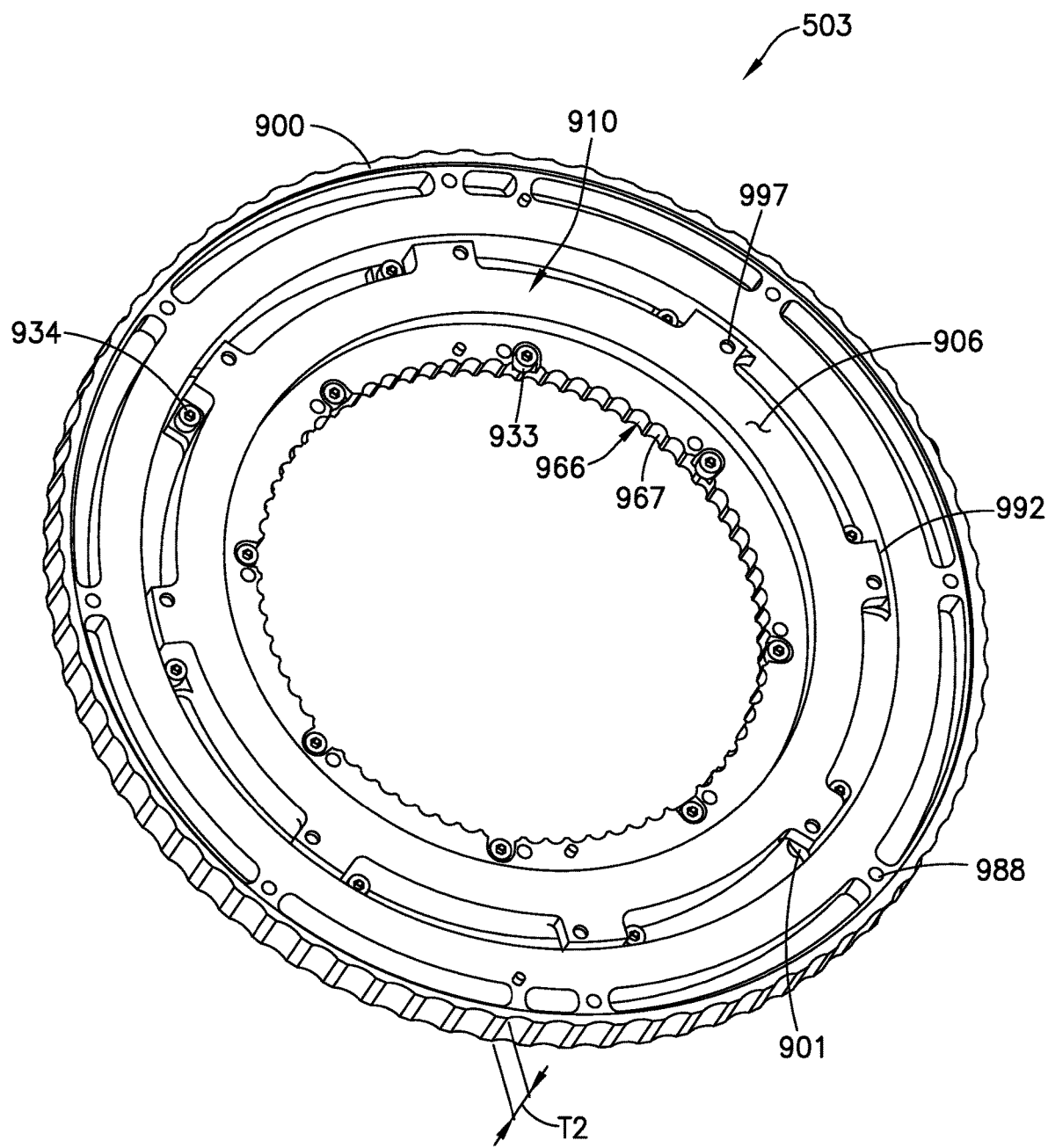
FIG. 9A is a schematic front perspective illustration of a heat exchanger end cap of the heat exchanger of FIG. 7A in accordance with aspects of the present disclosure.
Figure 9B:
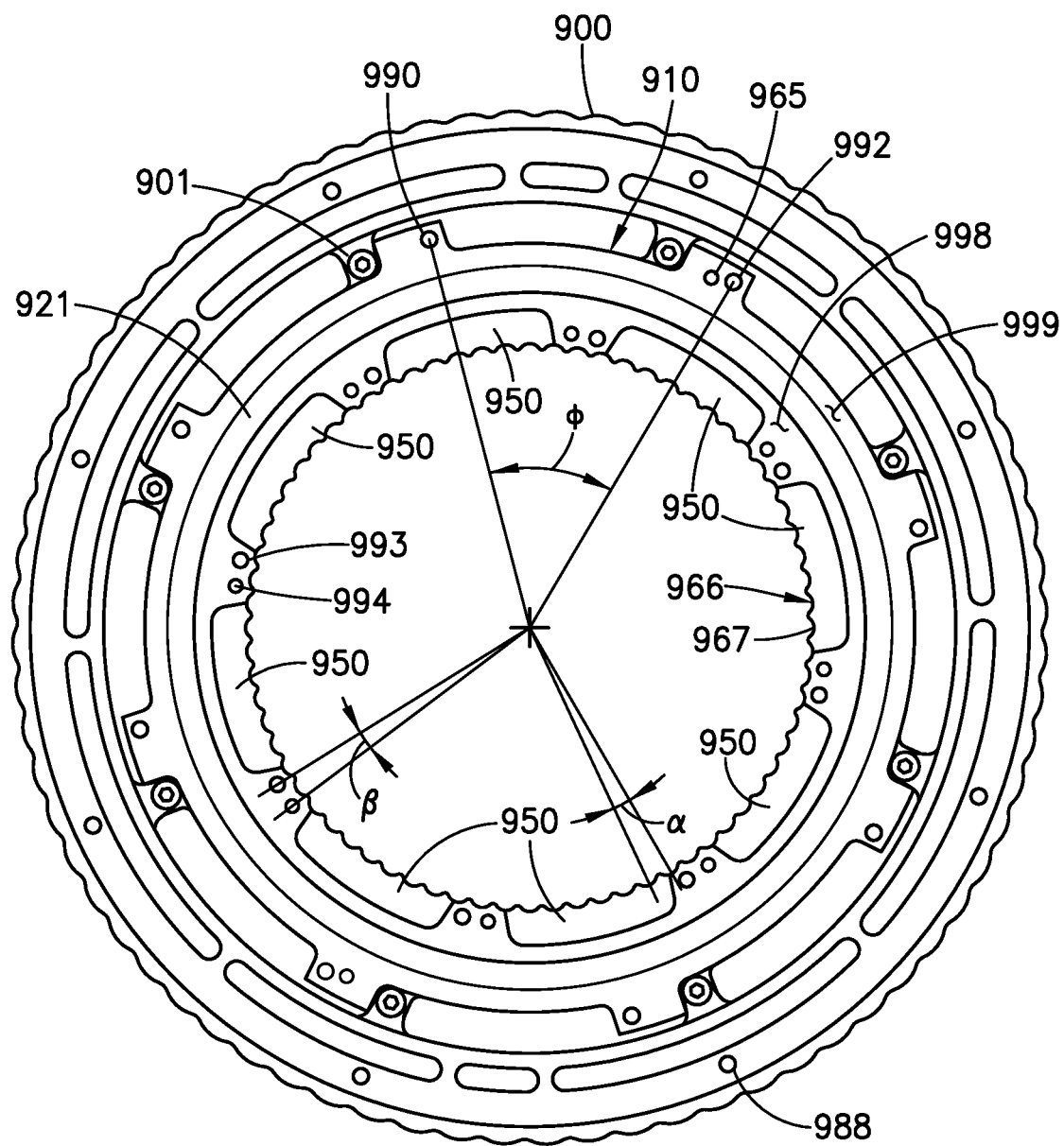
FIG. 9B is a schematic rear illustration of the heat exchanger end cap of FIG. 9A in accordance with aspects of the present disclosure.

The end cap exchange member 910 forms, at least in part, heat exchanger 1370. The front of the end cap exchange member 910 (as shown in FIG. 9A) includes a seating surface 906 that couples with the sealing ring 660 of the heat exchanger window assembly section 504 to, at least in part, seal a front of the thermal chamber 1300 (FIG. 13). The heat exchanger window assembly section 504 includes coupling features 666 (e.g., such as through holes) that freely receive screws/bolts that extend into coupling features 988 (e.g., threaded holes that threadably engage the screws/bolts) of the insulating portion 900 to couple the heat exchanger window assembly section 504 and the heat exchanger end cap section 503. Coupling of the heat exchanger window assembly section 504 and the heat exchanger end cap section 503 compresses the sealing ring 660 to form a seal between the heat exchanger window assembly section 504 and the end cap exchange member 910.

The rear of the end cap exchange member 910 includes an annular flow channel 921 that forms thermal control fluid passage that couples the inlet thermal control fluid flow and the outlet thermal control fluid flow through the housing 200 as will be described in greater detail below. The rear of the end cap exchange member 910 includes seating surfaces 999, 998 that couple with sealing members 806, 807 of the heat exchanger base plate section 501 or similar sealing members 1006, 1007 of a heat exchanger mid-section 502 (as will be described below—see FIG. 10A). Seating surface 999 is disposed radially outward of the annular flow channel 921 while seating surface 998 is disposed radially inward of the annular flow channel 921 so as to seal annular flow channel 921 when the heat exchanger end cap section 503 is coupled to the heat exchanger base plate section 501 or a heat exchanger mid-section 502.

The end cap exchange member 910 includes coupling features substantially similar to those of the base plate exchange member 810 for coupling the heat exchanger end cap section 503 to the heat exchanger base plate section 501 or a heat exchanger mid-section 502. For example, coupling feature 990 may be a through hole configure to freely receive a screw/bolt 934 that extends into a corresponding coupling feature (e.g., coupling feature 891) of the heat exchanger base plate section 501 or (e.g., similar coupling feature 1090) of a heat exchanger mid-section 502, where the coupling feature 891, 1090 may be a threaded hole. The coupling features 990 may be rotationally/angularly spaced from one another by the angle θ for alignment with the corresponding coupling feature 891, 1090.

In a manner similar to that described above with respect to the heat exchanger base plate section 501, to substantially evenly compress the sealing members 806, 807 (or sealing members 1006, 1007—see FIG. 10A) one or more coupling features 993, 994, may be disposed on the end cap exchange member 910 radially inward of the annular flow channel 921 (and sealing members 806, 807 or sealing members 1006, 1007 of an adjacent housing section) while the coupling features 990 are disposed radially outward of the annular flow channel 921 (and sealing members 806, 807 or sealing members 1006, 1007 of an adjacent housing section). The coupling features 993, 994 may be rotationally/angularly staggered from the coupling features 990 by an angle that is about half of angle Φ or by any other suitable angle that effects substantially uniform compression of the sealing members 806, 807 or sealing members 1006, 1007. In one aspect, the coupling feature 994 is a through hole that provides free passage of the screw/bolt 933 there-through for, at least in part, coupling the heat exchanger end cap section 503 to the heat exchanger base plate section 501 or the heat exchanger mid-section 502.

The inner peripheral edge 966 of the heat exchanger end cap section 503 may, at least in part, form the peripheral wall 1371 of the thermal chamber 1300. The inner peripheral edge 966 of the heat exchanger end cap section 503 may be contoured in any suitable manner to, for example, increase the surface area of the inner peripheral edge 966. Increasing the surface area of the inner peripheral edge may increase one or more of thermal transfer from the primary circulating thermal control fluid 899 into the thermal chamber 1300 and an effective emissivity of the surface (e.g., improving the radiant heat transfer to the device under test). In other aspects, the inner peripheral edge 966 may not be contoured. In the example, shown in FIGS. 9A and 9B, the contour provides a scalloped surface; however, in other aspects any suitable geometries (such as fractal-like geometries) may be formed on the inner peripheral edge. Each scallop 967 (or other suitable geometry) may also have a predetermined angular relationship (e.g., in one aspect the scallops may be radially aligned with one or more of the coupling features 990 and radially spaced from each other by the angle α as shown in FIG. 9A, while in other aspects the scallops may have any suitable radial spacing) so as to be aligned with scallops of the other housing sections to provide fluid flow channels on an inner peripheral wall of the thermal chamber (as shown in FIG. 13) that extend from the between the heat exchanger base plate section 501 and the heat exchanger end cap section 503.

Any suitable alignment pin apertures 965 (or other suitable alignment features) may be provided on one or more of the coupling bosses 992 or at any other suitable location of the housing sections for rotationally aligning the sections of the housing relative to one another (e.g., where the alignment pins 864 fit into respective alignment pin apertures 965).

The rear of end cap exchange member 910 includes thermal control fluid deflector grooves 950 rotationally/angularly disposed adjacent the inner peripheral edge 966. The thermal control fluid deflector grooves 950 receive thermal control fluid from the fluid passage 852 in the array of secondary thermal control fluid passages 850 and, at least in part, facilitate formation of the secondary fluid flow paths that extend between the heat exchanger base plate section 501 and the heat exchanger end cap section 503 as will be described herein.

Referring to FIGS. 5, 10A, 10B and 13, the heat exchanger mid-section 502 is illustrated. One or more of the heat exchanger mid-sections 502 may be disposed between the heat exchanger end cap section 503 and the heat exchanger base plate section 501, where inserting or removing the heat exchanger mid-sections 502 correspondingly increases or decreases the length LT of the housing 200 (and thermal chamber 1300 therein).

The heat exchanger mid-section 502 includes an insulating portion 1000 and a mid-exchange member 1010. The heat exchanger mid-section 502 may have any suitable thickness T3 that contributes to the length LT of the thermal chamber 1300. The insulating portion 1000 may, at least in part, form the exterior insulating case 275 of the housing 200; and the mid-exchange member 1010 may, at least in part, form the heat exchanger 1370. The insulating portion 1000 may be substantially similar to the insulating portion 900 of the heat exchanger end cap section 503. For example, the insulating portion 1000 includes mounting tabs 901 that interface with coupling bosses 1092 of the mid-exchange member 1010 for coupling the insulating portion 1000 to the mid-exchange member 1010. For example, any suitable screws/bolts may extend through apertures of the mounting tabs 901 to threadably engage coupling features 1097 of the coupling bosses 1092 (or vice versa) to couple the insulating portion 1000 to the mid-exchange member 910.

The mid-exchange member 1010 forms, at least in part, the heat exchanger 1370 and includes a bifurcated heat exchange fluid channel 1020 that includes an flow channel 1021 and an flow channel 1022 that are separated from one another by walls 1023, 1024 (similar to bifurcated heat exchange fluid channel 820). Any suitable sealing members 1006, 1007 may be disposed radially inward and radially outward of the bifurcated heat exchange fluid channel 1020 so as to seal the flow channel 1021 and the flow channel 1022 of the bifurcated heat exchange fluid channel 1020 against an adjacent sealing surface (see sealing surfaces 998, 999 in FIG. 9B and surface 1099 in FIG. 10B) of an adjacent housing section as will be described herein.

The walls 1023, 1024 are disposed on substantially opposite sides (e.g., about 180° apart from one another) of the mid-exchange member 1010 so that an inlet thermal control fluid enters the flow channel 1021 through opening 1027 (e.g., from an adjacent housing section) and flows around substantially half of the mid-exchange member 1010; and an outlet thermal control fluid flows enters flow channel 1022 through opening 1028 (e.g., from an adjacent housing section) and flows around substantially the other half of the mid-exchange member 1010. As noted above, the flow channel 1021 is in fluid communication with an adjacent housing section through the inlet opening 1027 that is communicably coupled to, for example, flow channel 821 of the heat exchanger base plate section 501 or the annular flow channel 921 of the heat exchanger end cap section 503. As also noted above, the flow channel 1022 is in fluid communication with an adjacent housing section through the outlet opening 1028 that is communicably coupled to, for example, flow channel 822 of the heat exchanger base plate section 501 or the annular flow channel 921 of the heat exchanger end cap section 503.

In one aspect, such as where the heat exchanger 1370 is the dual circulating fluid heat exchanger (as illustrated in FIG. 13), the heat exchanger mid-section 502 includes a circumferential array of secondary thermal control fluid passages 1050 (substantially similar to circumferential array of secondary thermal control fluid passages 850) that are communicably coupled to the secondary control fluid inlet coupling 851 (such as through the secondary thermal control fluid passages 850). Each fluid passage 1052 (which may be substantially similar to fluid passage 852) in the array of secondary thermal control fluid passages 1050 may be rotationally/angularly spaced from an adjacent fluid passage 1052 by any suitable angle α. The array of secondary thermal control fluid passages 1050 may be arranged on the heat exchanger mid-section 502 so that the walls 1023, 1024 are disposed so as to be aligned between adjacent fluid passages 1052 to facilitate formation of the primary and secondary fluid flow paths that extend between the heat exchanger base plate section 501 and the heat exchanger end cap section 503 as will be described herein.

The walls 1023, 1024 and the array of the secondary thermal control fluid passages 1050 may also have a predetermined rotational/angular relationship with coupling bosses 1092 having coupling features 1090, 1091 that rotationally/angularly clock adjacently coupled sections of the housing 200 to each other forming the primary and a secondary fluid flow paths as will be described herein. In one aspect one of the coupling features 1090, 1091 may be threaded holes configured to threadably engage a screw/bolt of an adjacent housing section for coupling the housing sections to each other. For example, coupling features 1090 may be a threaded hole configured to threadably receive a screw/bolt 1034 from another adjacent heat exchanger mid-section 502 or the screw/bolt 934 of the heat exchanger end cap section 503. Coupling features 1091 may be through holes that provide for free passage of the screw/bolt 1034 for engagement with, e.g., coupling features 891 of the heat exchanger base plate section 501 or coupling features 1090 of another adjacent heat exchanger mid-section 502.

To substantially evenly compress the sealing members 1006, 1007 one or more coupling features 1093, 1094, may be disposed on the mid-exchange member 1010 radially inward of the sealing members 1006, 1007 while the coupling features 1090, 1091 are disposed radially outward of the sealing members 1006, 1007. The one or more coupling features 1093, 1094 may be threaded holes that are radially staggered from the coupling features 1090, 1091 by an angle that is about half of angle Φ or by any other suitable angle that effects substantially uniform compression of the sealing members 806, 807. For example, coupling features 1093 may receive a screw/bolt 933 (FIG. 9A), 1033 (FIG. 10A) passing through a coupling feature 994 (FIG. 9B), 1094 (FIG. 10B) from another housing section to facilitate coupling the heat exchanger mid-section 502 to the other housing section and substantially even compression of the sealing members 1006, 1007.

Figure 10A:
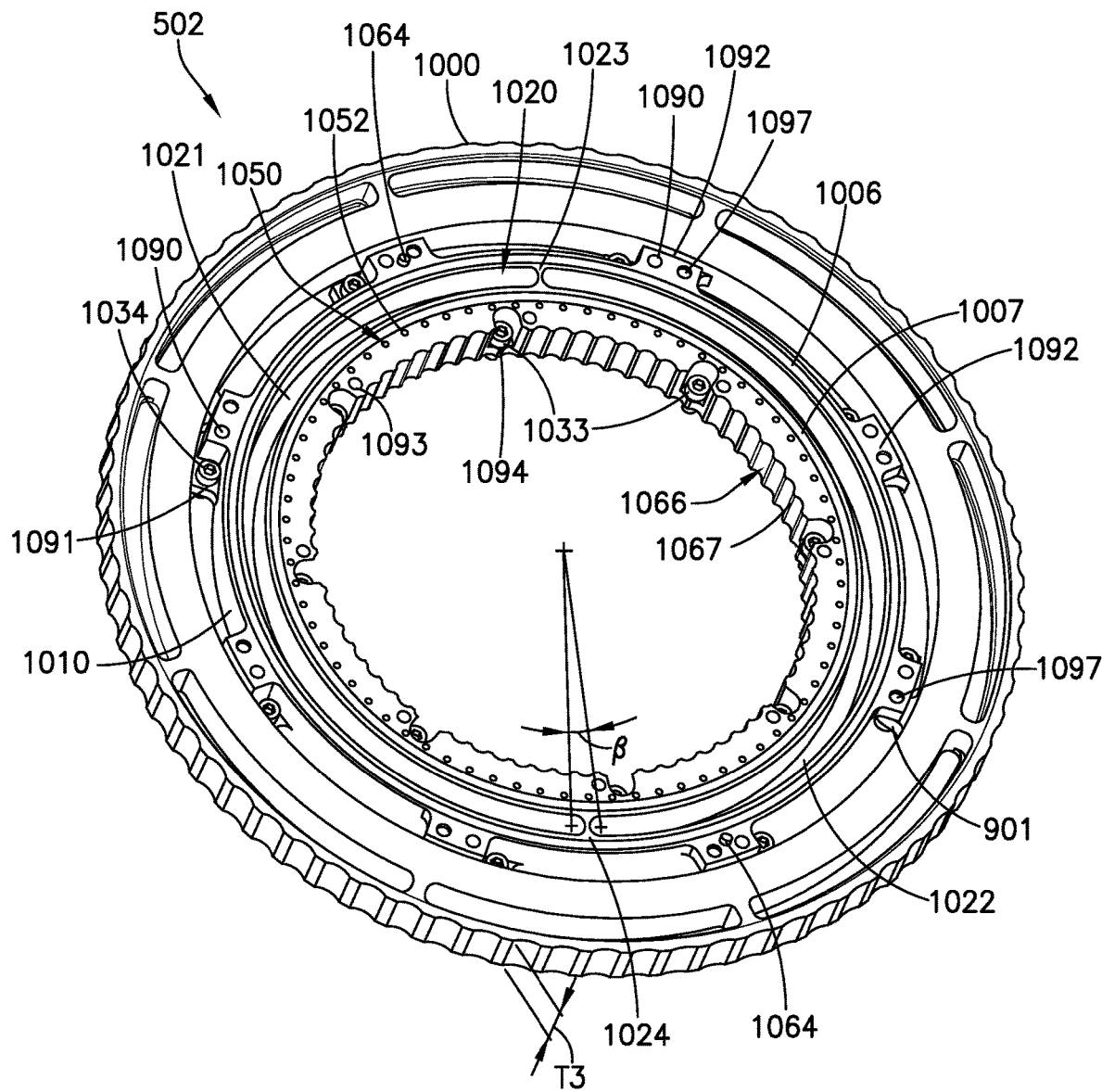
FIG. 10A is a schematic front perspective illustration of a heat exchanger mid-section element of the heat exchanger of FIG. 7A in accordance with aspects of the present disclosure.
Figure 10B:
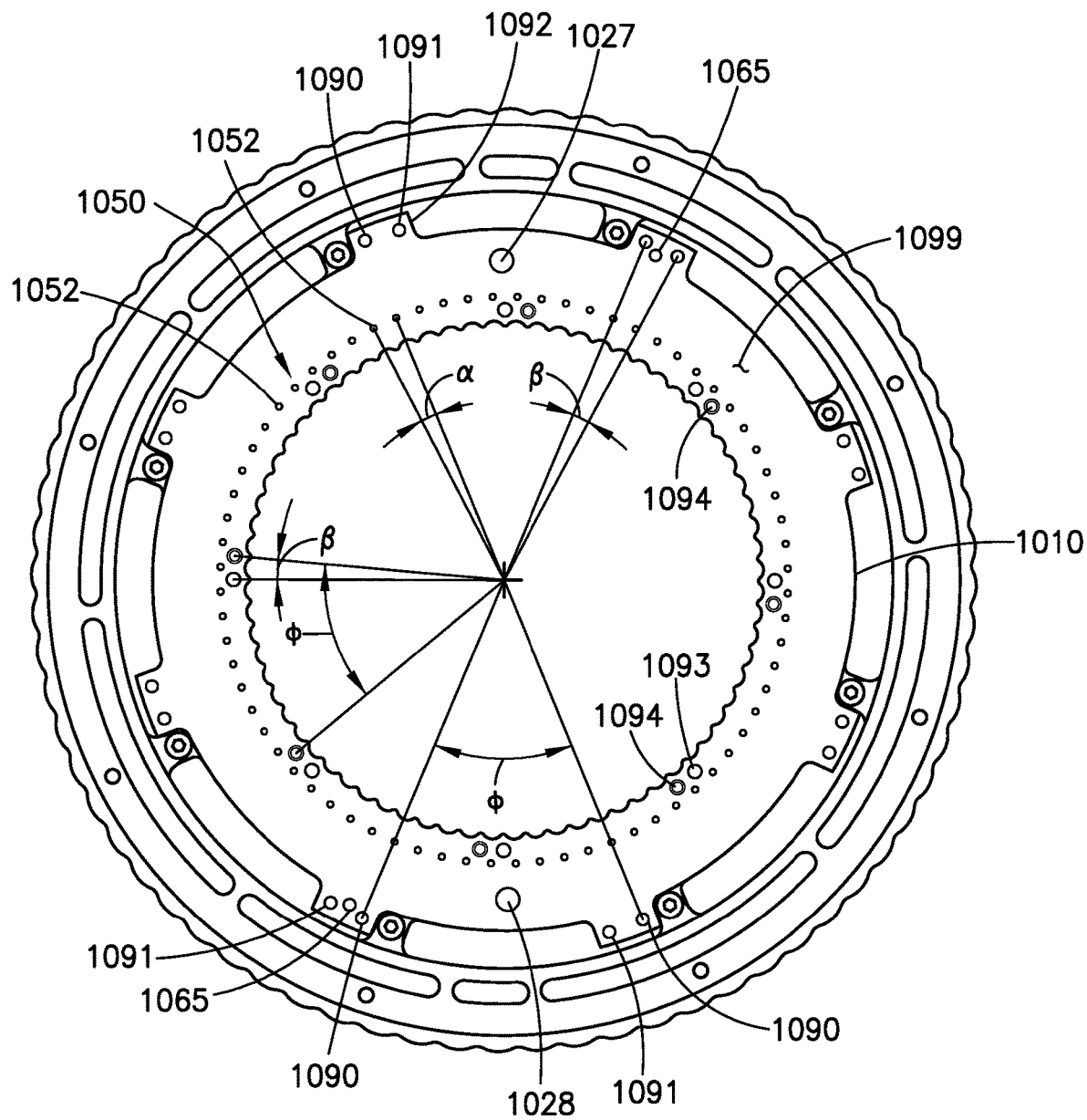
FIG. 10B is a schematic front perspective illustration of the heat exchanger mid-section element of FIG. 10A in accordance with aspects of the present disclosure.

In one aspect, the coupling bosses 1092 are radially/angularly spaced from one another by an angle Φ which may be an integer multiple of angle α between adjacent fluid passages 1052 so that at least one of the coupling features 1090, 1091 is radially aligned with a fluid passage 1052. The coupling features 1090, 1091 may be radially/angularly spaced from each other by angle β as shown in FIG. 10B where the angle β is an integer multiple of the angle α. In one aspect, as illustrated in FIG. 10A, the angle between centers 1021E, 1022E of the arcs (e.g., which may correspond to the centers of the openings 1027, 1028 or the same or adjacent housing sections) at adjacent the ends of the flow channels 1021, 1022 is substantially the angle β so that the clocking (e.g., rotational alignment) between segments, as described herein, provides for the opening 1027, 1028 at the end of one channel feeding the next channel in an adjacent housing section. In one aspect, the angle β may be substantially the same as angle α so that the coupling features 1090, 1091 are aligned with corresponding fluid passages 1052 (i.e., so that when a first one of the adjacent housing sections (see housing sections 501-503 in FIG. 7A) is coupled to a second one of the adjacent housing sections, the second housing section is rotated relative to the first housing section by an amount substantially equal to the angle α so that the fluid passages of the first and second adjacent housing sections are aligned and the walls 823, 824 (or walls 1023, 1024) of the first housing section are angularly staggered from the walls 1023, 1024 (or walls 823, 824) of the second adjacent housing section by an amount substantially equal to angle α).

The inner peripheral edge 1066 of the heat exchanger mid-section 501 may, at least in part, form the peripheral wall 1371 of the thermal chamber 1300. The inner peripheral edge 1066 may be contoured in any suitable manner (similar to that described previously with respect to peripheral edge 866) to, for example, increase the surface area of the inner peripheral edge 1066 and direct fluid flow. Increasing the surface area of the inner peripheral edge may increase thermal transfer from the primary circulating thermal control fluid 899 into the thermal chamber 1300. In other aspects, the inner peripheral edge 1066 may not be contoured. In the example, shown in FIGS. 10A and 10B, the contour provides a scalloped surface. Each scallop 1067 may also have a predetermined angular relationship (e.g., in one aspect the scallops may be radially aligned with corresponding fluid passages 1052 and radially spaced from each other by the angle α as shown in FIG. 10B, while in other aspects the scallops may have any suitable radial spacing) so as to provide fluid flow channels on an inner peripheral wall of the thermal chamber (as shown in FIG. 13) that extend from the between the heat exchanger base plate section 501 and the heat exchanger end cap section 503.

Any suitable alignment pins 1064 (or other suitable alignment features) may be provided on the coupling bosses 1092 or at any other suitable location of the housing sections for rotationally aligning the sections of the housing relative to one another (e.g., where the alignment pins 1064 fit into corresponding recesses/alignment pin apertures 965 (FIG. 9B), 1065 (see FIG. 10B) of an adjacent housing section).

Figure 7A:
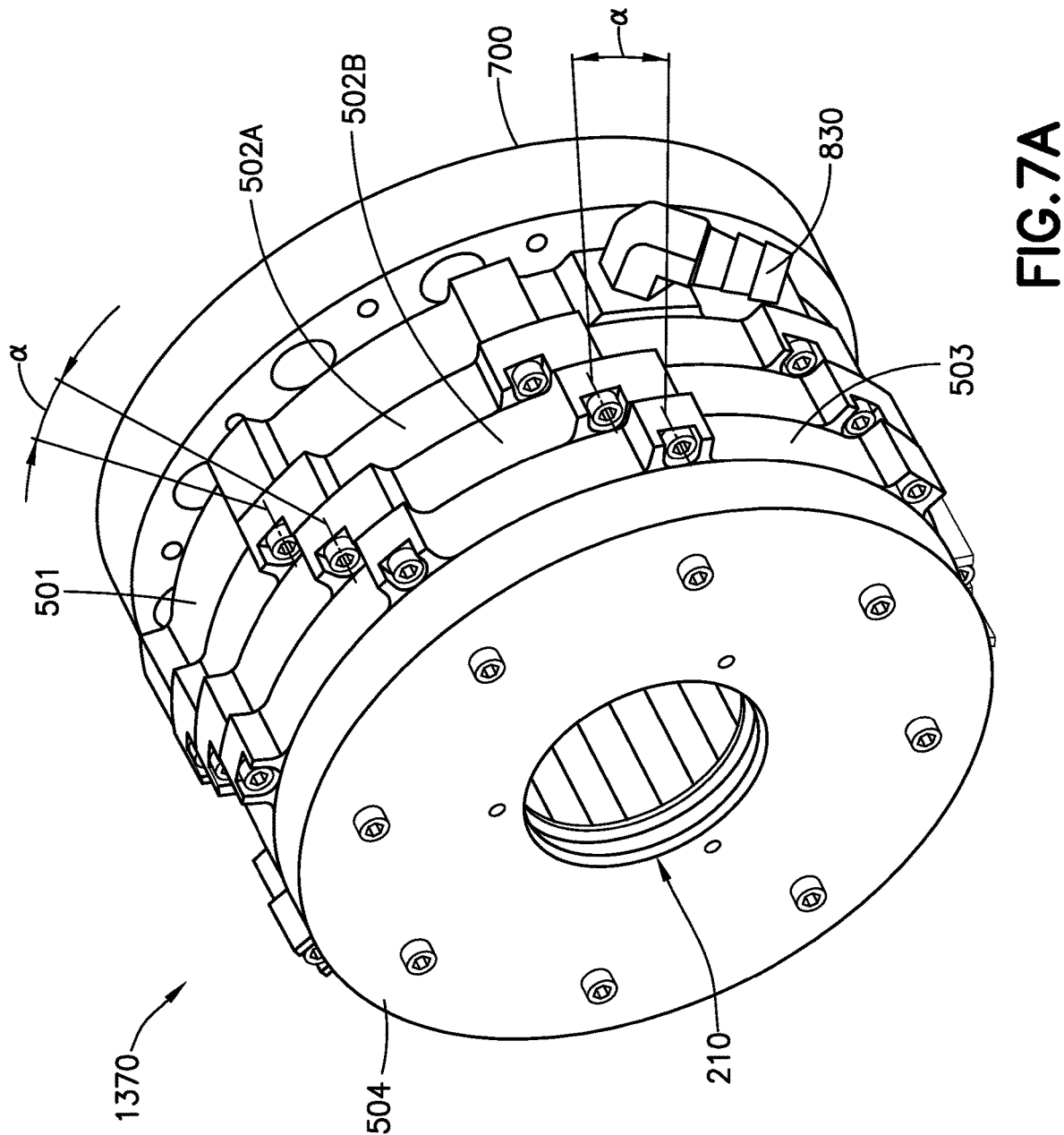
FIG. 7A is a schematic front perspective illustration of a heat exchanger of the portable optic metrology thermal chamber module in accordance with aspects of the present disclosure.
Figure 7B:
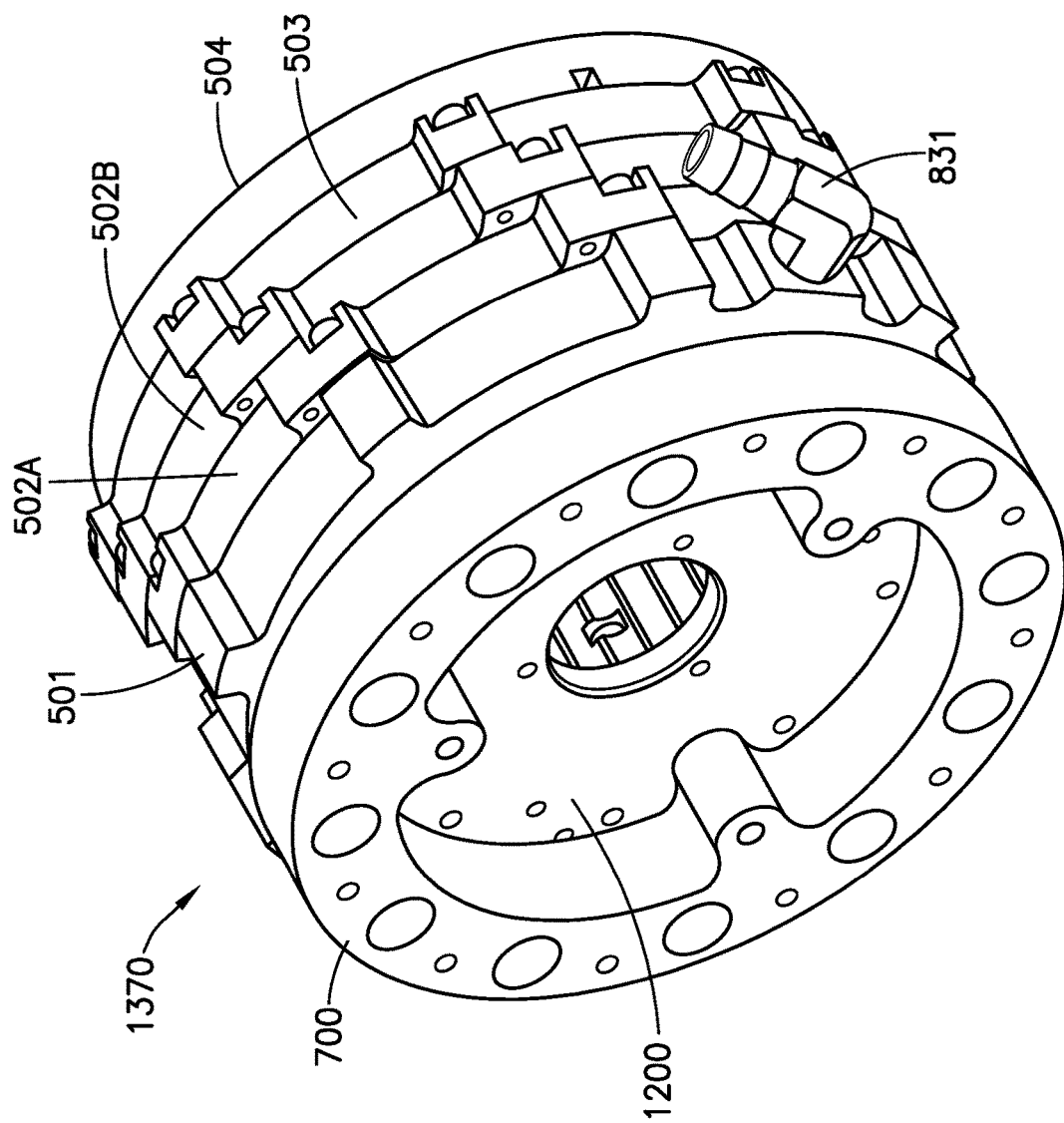
FIG. 7B is a schematic rear perspective illustration of the heat exchanger of FIG. 7A in accordance with aspects of the present disclosure.
Figure 11A:
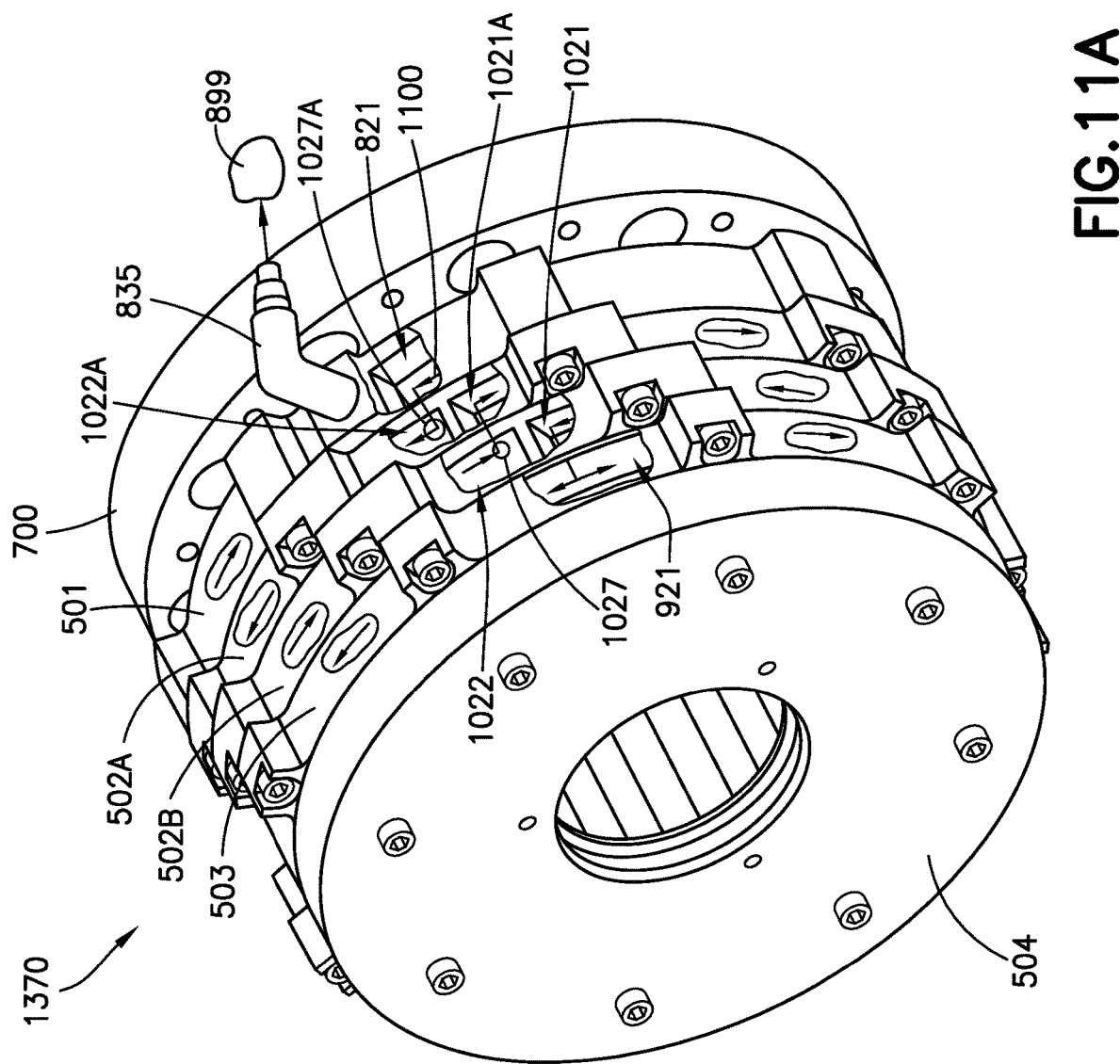
FIG. 11A is a partial perspective cut-away illustration of the heat exchanger of FIG. 7A illustrating circulating thermal control fluid flow through the heat exchanger in accordance with aspects of the present disclosure.
Figure 11B:
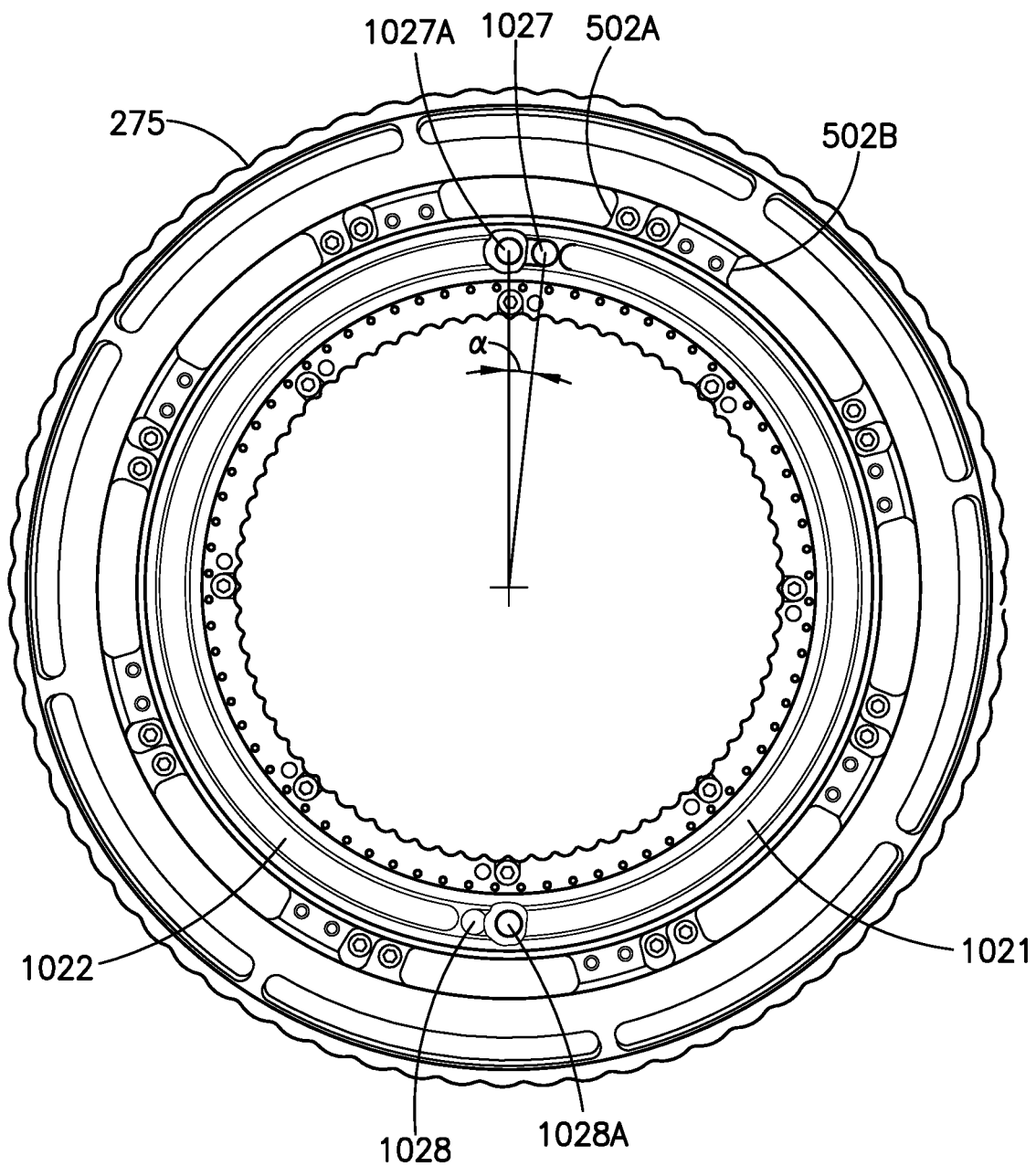
FIG. 11B is a partial cut-away front illustration of the heat exchanger of FIG. 7A illustrating an angular offset between two heat exchanger mid-section elements in accordance with aspects of the present disclosure.

Referring to FIGS. 7A, 7B, and 11B, exemplary perspective illustrations of an exemplary heat exchanger 1370 without the insulating case 275 and an elevation view (FIG. 11B) of portion of the heat exchanger 1370 are provided. In FIGS. 7A and 7B the insulating case is not shown to illustrate the angular stagger between the housing sections to facilitate thermal control fluid flow through the heat exchanger 1370. In the example illustrated in FIGS. 7A and 7B the heat exchanger 1370 includes the heat exchanger base plate section 501, heat exchanger window assembly section 504, the heat exchanger end cap section 503, and two heat exchanger mid-sections 502A, 502B. A spacer member 700 is illustrated as being coupled to the heat exchanger base plate section 501. The spacer 799 may increase a distance between, for example, a lens 1400 (see FIG. 14) within the thermal chamber and the image analyzer 140 (FIG. 1) for any suitable reasons including repositioning a focal plane of the lens 1400 relative to the image analyzer 140. The spacer 700 may also provide an increased volume 1399 (FIG. 13) between the shutters 253, 254 and the rear of the housing 200. A device under test mount 1200 is also illustrated coupled to the heat exchanger base plate section 501 as will be described below. As can be seen in FIGS. 7A and 7B, the heat exchanger base plate section 501, the heat exchanger end cap section 503, and the two heat exchanger mid-sections 502A, 502B are coupled to each other, in the manner described above, so that each section is rotated by the angle α relative to adjacent sections.

Figure 11C:
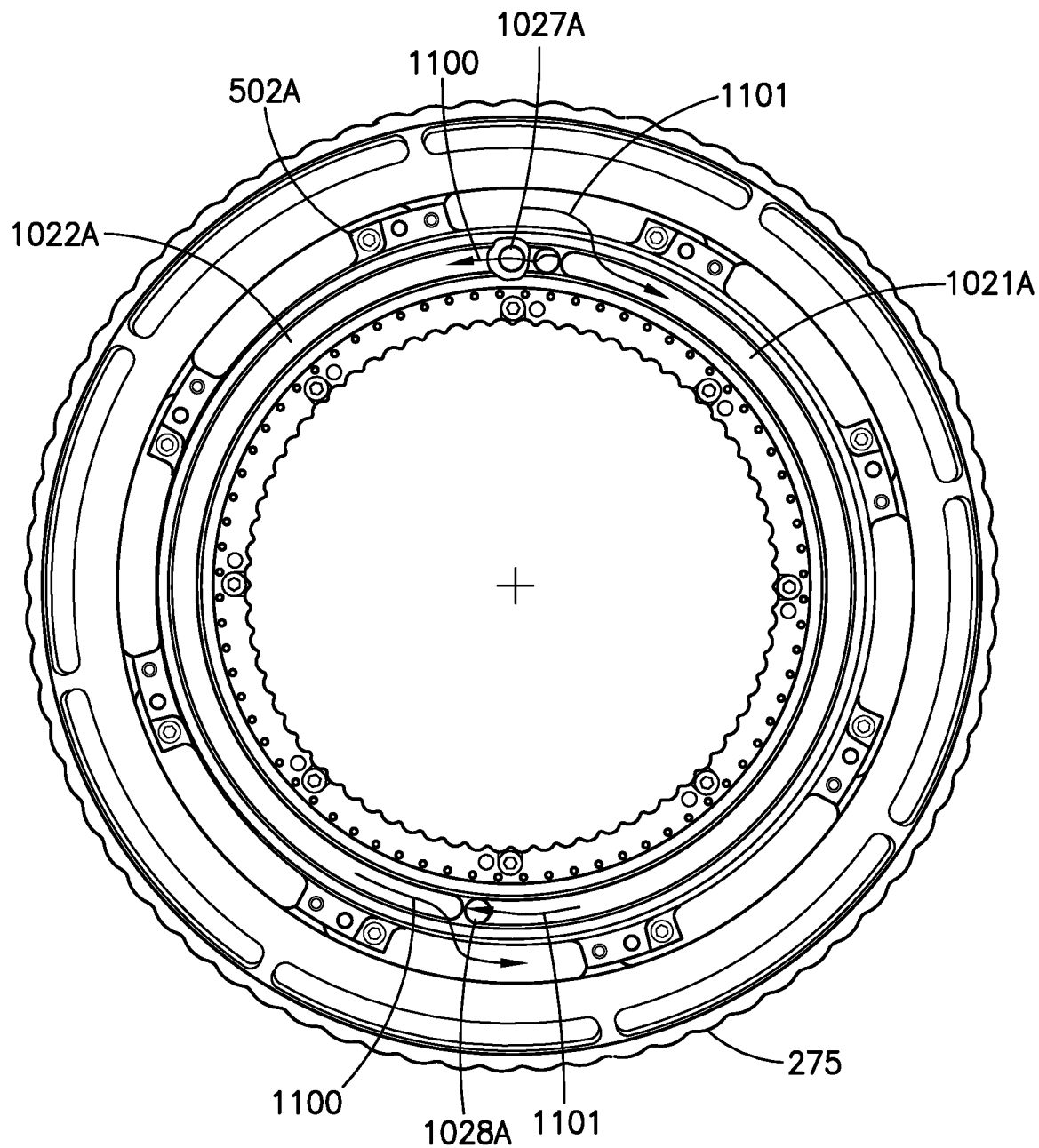
FIG. 11C is a partial cut-away front illustration of the heat exchanger of FIG. 7A illustrating circulating thermal control fluid flow through the heat exchanger in accordance with aspects of the present disclosure.

Referring also to FIGS. 11A and 11C the inlet thermal control fluid flow 1100 and outlet thermal control fluid flow 1101 of the primary circulating thermal control fluid 899 through the heat exchanger 1370 is illustrated. As can be seen in FIGS. 11A and 11C the primary circulating thermal control fluid 899 enters the inlet coupling 830 (FIG. 8A) and flows through the flow channel 821 of the heat exchanger base plate section 501. From the flow channel 821, the primary circulating thermal control fluid 899 passes through opening 1027A into heat exchanger mid-section 502A. The primary circulating thermal control fluid 899 flows through flow channel 1022A of heat exchanger mid-section 502A until the inlet thermal control fluid flow reaches the wall 1023 and passes through opening 1028A (see FIGS. 11A-11C) and into flow channel 1021 of heat exchanger mid-section 502B. As illustrated in FIG. 13, the primary circulating thermal control fluid 899 in flow channel 1021 of heat exchanger mid-section 502B enters and circulates with the primary circulating thermal control fluid 899 within the annular flow channel 921 of end cap exchange member 910 of the heat exchanger end cap section 503. The primary circulating thermal control fluid 899 within the annular flow channel 921 of end cap exchange member 910 also circulates with the primary circulating thermal control fluid 899 in flow channel 1022 of heat exchanger mid-section 502B. As may be realized, the infeed primary circulating thermal control fluid flow 1100 circulates (in the example shown in counter clockwise flow around the whole periphery of the thermal chamber wall between inlet 830 and cap 503 (e.g. alternating between channels 1027A, 1028 of adjacent sections 502A, 502B).

The mixing (of the primary circulating thermal control fluid 899 in flow channels 1021, 1022, 921 effect a reversing of the primary circulating thermal control fluid flow so as to form the outlet thermal control fluid flow 1101 (here similar but opposite, e.g. clockwise, to infeed flow 1100). For example, the mixed primary circulating thermal control fluid 899 within the annular flow channel 921 and flow channel 1022 exits flow channel 921 through opening 1027 so that the primary circulating thermal control fluid 899 flows into flow channel 1021A of heat exchanger mid-section 502A. The primary circulating thermal control fluid 899 exits the flow channel 1021A through opening 1028A and enters flow channel 822 of the base plate heat exchange member 810 of the heat exchanger base plate section 501. The primary circulating thermal control fluid flows from the flow channel 822 out of the heat exchanger 1370 through the outlet coupling 835. As can be seen in FIGS. 11A and 11C, the inlet and outlet thermal control fluid flows 1100, 1101 flow through alternating sides of the heat exchanger mid-sections 502A, 502B (e.g., in an out and back double helix circulating geometry) to effect a substantially evenly distributed heat transfer between the heat exchanger 1370 and the thermally isolated environment 1301 of the thermal chamber 1300. The out and back double helix circulating geometry may minimize thermal gradients along the length LT of the thermal chamber 1300 due to, for example, heat transfer from the circulating thermal control fluid flowing along the thermal chamber 1300. In other aspects, the fluid flow path formed by the flow channels 1021, 1022, 921 may have any suitable configuration for transferring thermal control fluid between longitudinal (e.g. along the Z axis) ends of the thermal chamber 1300. In one aspect, there may be more than two flow channels that each have a circumferential length that is less than 180° (e.g., more than two flow channels in at least one of the fluid flow directions (e.g., inlet or return directions)). In other aspects, the geometry of the flow channels may be such that there are multiple interstitial helical flow paths between the longitudinal ends of the thermal chamber, such as where two of the interstitial helical flow paths provide flow in a common direction.

Referring to FIGS. 12A-12D and 13, the portion of the thermal chamber 1300 (e.g., formed by the heat exchanger base plate section 501, the one or more heat exchanger mid-section 502A-502n, and heat exchanger end cap section 503) is sealed at the front end by the heat exchanger window assembly section 504. The portion of the thermal chamber 1300 formed by the heat exchanger base plate section 501, the one or more heat exchanger mid-section 502A-502n, and heat exchanger end cap section 503 may also be sealed at the rear side by the device under test mount 1200. For example, the heat exchanger base plate section 501 forms a ring with a central aperture 1270. The aperture 1270 has at its peripheral edge, a first recessed surface 1271 on which coupling features 893, 894 are disposed. The aperture 1270 also includes at its peripheral edge a second recessed surface 1272 that longitudinally spaced (e.g., along longitudinal axis 1299) any suitable distance from the first recessed surface 1271 so as to form stepped surfaces. In other aspects, there may be only one recessed surface.

The device under test mount 1200 includes a mounting plate 1201 (which may also be referred to as back plate), a device under test interface 1203, and an insulating plate 1202. The mounting plate 1201 is sized (e.g., diametrically and in thickness) to fit within the aperture 1270 and sealingly couple with the first recessed surface 1271. For example, any suitable seals may be disposed between the mounting plate 1201 and the recessed surface 1271, which seals are compressed through engagement (e.g., tightening) of screws/bolts 1250 that extend through the mounting plate 1201 to threadably engage corresponding ones of the coupling features 893, 894. The mounting plate 1201 forms an inner wall of the thermal chamber 1300 as illustrated in FIG. 13. Any suitable alignment pins 1290 may be provided to rotationally align the device under test mount 1200 to the heat exchanger base plate section 501 as well as the rest of the housing 200.

The insulating plate 1202 may be constructed of any suitable insulating material (such as that described above for insulating portion 800, insulating front cover 600, and insulating portion 900. The insulating plate 1202 may be sized (diametrically and in thickness) to fit within the aperture 1270 and couple with the second recessed surface 1272 so that a minimized radial circumferential gap 1373 (FIG. 13) exists between an outer peripheral edge insulating plate 1202 and an inner peripheral edge of the insulating portion 800 (so as to maintain substantially continuous insulation of the thermal chamber 1300 between the insulating plate 1202 and the insulating portion 800). The insulating plate is coupled to the mounting plate 1201 in any suitable manner, such as with any suitable fasteners, such as screws/bolts 1251, that extend through the insulating plate 1202 to threadably engage corresponding coupling features (e.g., threaded holes) disposed on the coupling plate 1201.

In one aspect, such as where the heat exchanger 1370 is the dual circulating fluid heat exchanger, both the insulating plate 1202 and the mounting plate 1201 may include exit apertures 1220 (FIGS. 12C and 12D) that provide for exhausting the secondary circulating thermal control fluid 898 from the thermal chamber 1300. As can be seen in FIG. 13, the secondary circulating thermal control fluid 898 may be exhausted to ambient atmosphere 1302 through the exit apertures 1220 and flow from the closed portable optic metrology thermal chamber module 150 through any suitable gaps provided in the shutter assembly 251 (e.g., such as between the closed shutters 253, 254, internal labyrinth passageways of the shutter assembly 251, etc.).

The device under test interface 1203 is coupled to the mounting plate 1201 in any suitable manner. For example, any suitable closures or isolators may be provided between the device under test interface 1203 and the mounting plate, which closes or isolates are compressed through engagement (e.g., tightening) of screws/bolts 1252 that extend through the device under test interface 1203 to threadably engage corresponding coupling features 1253 of the mounting plate 1201. The device under test interface includes any suitable device under test coupling features 1221 configured to couple with a mounting flange 1404, 1504 (see FIGS. 14, 15) of the device under test 170 to, e.g., couple the device under test to the mounting plate 1201. For example, the device under test coupling features 1221 are configured to couple with any suitable device under test mounting flange 1404, 1504 (see FIGS. 14 and 15). In the example, illustrated in FIGS. 12A-12D the device under test coupling features 1221 are illustrated as threaded with seating flange 1221 that receives corresponding threads and seats against mounting flange 1404 of the lens 1400; however, in other aspects any suitable coupling may be provided. For example, the device under test interface 1203 may be selected from a number of device under test interfaces 1203A-1203n each having a different coupling characteristic corresponding to different devices under test (e.g., different types/sizes of lenses, different types/sizes of cameras, etc.). For example, referring also to FIGS. 14 and 15, in one aspect, the device under test 170 is the lens 1400 having a focal plane 1450 exterior or interior to the thermal chamber 1300 or housing 200, and the image analyzer 140 registers an image outside or inside the thermal chamber 1300 or housing 200, generated by the lens within the thermal chamber 1300, so as to characterize optic performance of the lens 1400 at a predetermined temperature of the lens 1400 set by the thermal chamber 1300, where the lens 1400 is stimulated by the stimulus beam 188. Here, the seating flange 1221 is substantially thermally invariant relative to a reference datum, such as the registration face of the interface 1203. In another aspect, the device under test 170 is a camera 1500 and the image analyzer 1540 is a camera image sensor 1550 of the camera 1500 inside the thermal chamber 1300, that registers an image generated by the camera 1500, stimulated within the thermal chamber 1300, onto a predetermined sensor field 1551 of the camera image sensor 1550 so as to characterize optic performance of the camera 1500 at a predetermined temperature of the camera 1500 set by the thermal chamber 1300.

Referring to FIGS. 1A, 1B, 12A and 12B, the housing 200 has a registration face 1240 with indicia 1241 having optically registrable features 1242 determinative of position of the registration face 1240. The indicia 1241 may be any suitable optically registrable features including, but not limited to, back-illuminated or front illuminated fiducials (e.g., light emitting diodes or other sources of illumination embedded in the registration face 1240 or projected onto the registration face 1240 by external light sources such as light pipes), pinhole targets (e.g., a few microns in diameter or larger), and/or chrome on glass edge reticles. The indicia 1241, when analyzed by, for example, image analyzer 140, are deterministic of the axial (e.g., Z direction) location of the registration face 1240. For example, the image analyzer 140 and/or controller 199 coupled to the image analyzer 140 may include any suitable programming (e.g., such as with a modulation transfer function optimizing algorithm) that determines a distance between the image analyzer 140 and the registration face 1240 (and the device under test 170) based on the optically registrable features 1242. The optically registrable features 1242 are registrable with, for example, the image analyzer 140 (FIG. 1A) so as to determine positioning of the image analyzer 140 relative to the device under test 170 within the thermal chamber 1300, and effect characterization of optic performance of the device under test 170 at different predetermined temperatures of the device under test 170 set with the thermal chamber 1300. The registration face 1240 is located at a predetermined substantially thermally invariant location with respect to the device under test 170 (e.g. the mounting flange 1404 seated against seat 1221 of interface 1203) within the thermal chamber 1300 for a range of predetermined temperatures of the device under test 170 set with the thermal chamber 1300. For example, the interface may be formed as an integral (one piece member) from a thermally invariant material such as Invar (64FeNi) or ceramic, the registration face 1240 is disposed on one side and the seat 1221 for the mounting flange 1404 at a predetermined location from the registration face.

In one aspect, the indicia 1241 may have different patterns corresponding to one or more of different devices under test 170 and/or the different closed portable optic metrology thermal chamber module 150, 150A-150n where the image analyzer 140 detects the pattern and sends sensor signals to, for example, controller 199 (FIG. 1) so that the controller 199 may operate (e.g., in a plug-and-play manner) a predetermined test or series of tests corresponding to the selected device under, in the matched thermal chamber module 150, test 170 through automated actuation of one or more of the stimulus source 102 and the device under test platform 105 (and the motors thereof to, e.g., rotate the portable optic metrology thermal chamber module 150 about axis of rotation θ, move the portable optic metrology thermal chamber module 150 and/or the accessory devices 160 along the direction 198, and/or operate the X-Z stage 161 to position the image analyzer 140). It is noted that the image analyzer 140 may be utilized to read the indicia 1241 when testing the camera 1500 (FIG. 15), e.g., to facilitate automated testing of the camera 1500 in a manner similar to that described above, even though the image analyzer 140 may not be used for the characterization of optic performance of the camera 1500 (noting that the camera 1500 includes its own image analyzer 1540 sealed within the thermal chamber 1300).

In one aspect, the detection of the indicia 1241 provides for identification of a size (e.g., internal volume) of the housing 200, as well as the type of device under test (e.g., lens or camera) within the housing. The controller 199 may employ the size information of the housing 200 to control the mass flow rate of one or more of the primary circulating thermal control fluid 899 and the secondary circulating thermal control fluid 898 so that a predetermined temperature is maintained within the thermal chamber 1300. The controller 199 may also adjust the mass flow rates, heaters, and/or coolers of the cooling system formed, at least in part, by the fluid circulators 839, 849 based also on temperature data obtained from any suitable thermal sensors 1466 (FIGS. 14 and 15) disposed within or on the thermal chamber 1300 and disposed to sense the temperature of the device under test 170. For example, the thermal sensors 1466 may be any suitable optical temperature sensor, thermocouple, resistive sensor, etc. In one aspect, any suitable radio frequency identification (RFID) tag 211 (FIG. 2) may be disposed on the housing 200 or at any suitable location of the portable optic metrology thermal chamber 150. The RFID tag may include information that identifies the housing and/or device under test (such as described above with respect to the indicia 1241. The controller 199 (see FIG. 2) may include any suitable reader that interfaces with the RFID tag 211 for identifying characteristics of the housing 200 and/or device under test. The controller 199 is configured (e.g., in a manner substantially similar to that described in U.S. patent application Ser. No. 16/257,272, previously incorporated herein by reference in its entirety) to operate the metrology system 100 and the fluid circulators 839, 849 in a plug-and-play configuration based on the information obtained from the RFID tag(s) 211 and/or indicia 1241.

Figure 14:
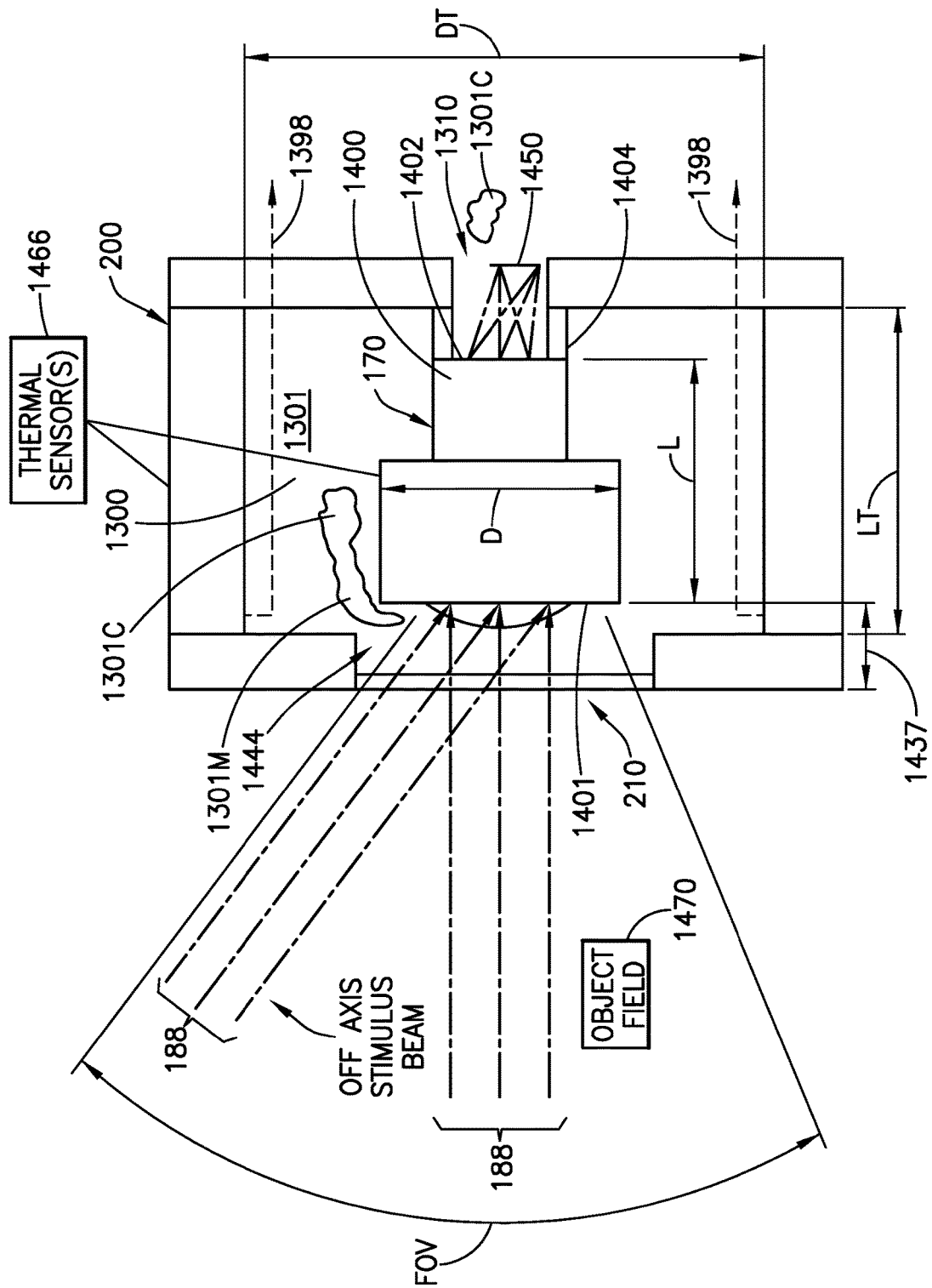
FIG. 14 is a schematic cross-sectional illustration of a thermal chamber of the portable optic metrology thermal chamber module of FIG. 2 in accordance with aspects of the present disclosure.
Figure 15:
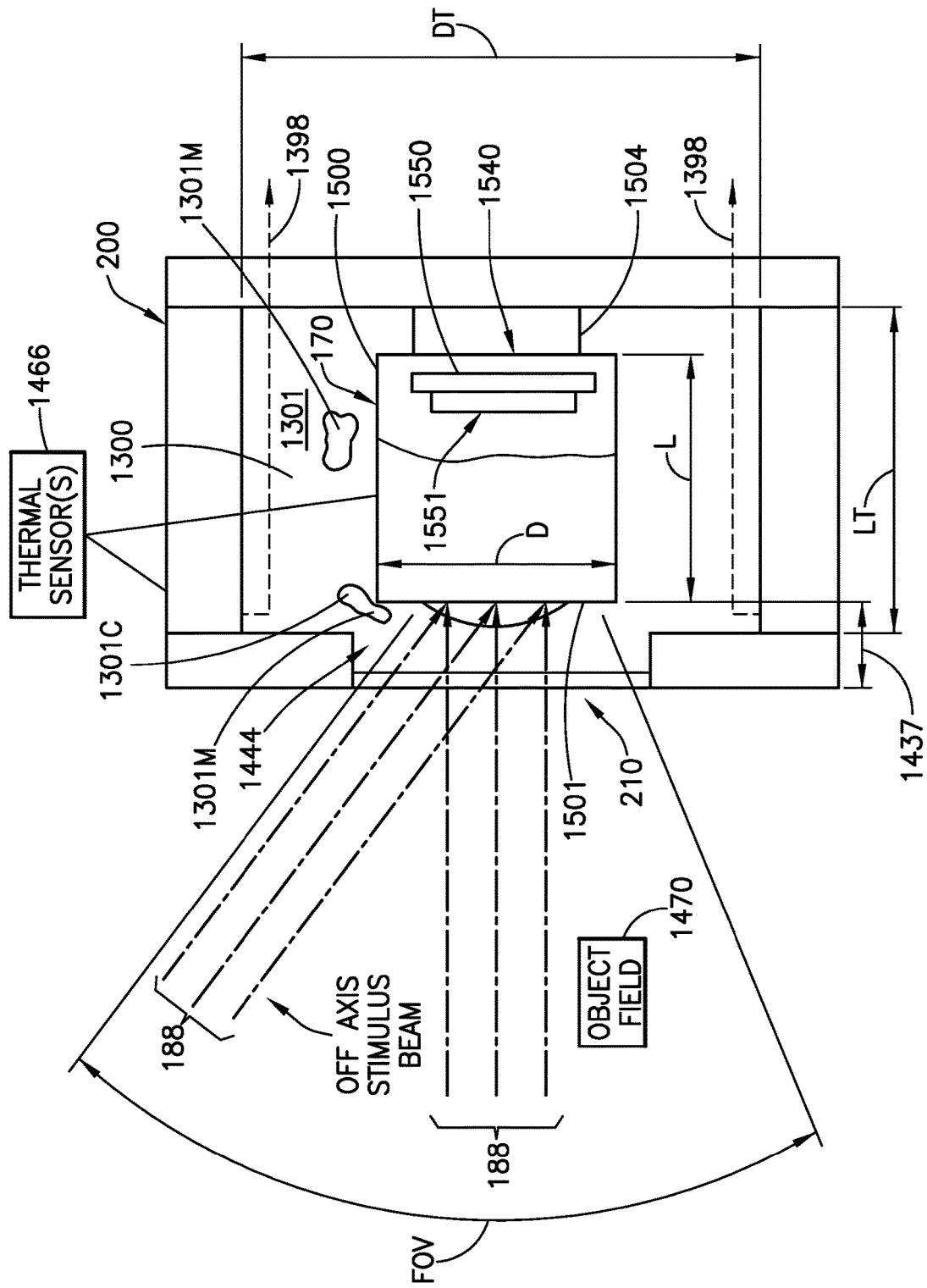
FIG. 15 is a schematic cross-sectional illustration of a thermal chamber of the portable optic metrology thermal chamber module of FIG. 2 in accordance with aspects of the present disclosure.
Figure 16:
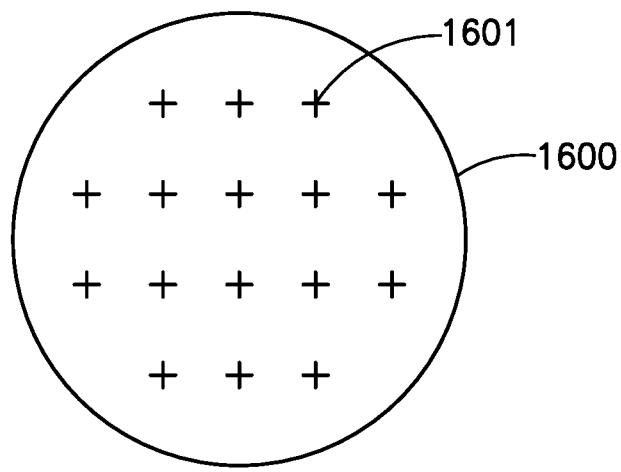
FIG. 16 is a an exemplary schematic illustration of an optic field of a device under test and corresponding optic field points.

Referring to FIGS. 13, 14, 15, and 16, the device under test 170 has a predetermined angular field of view FOV. A configuration of the optic stimulus entry aperture 210 of the housing 200 is arranged so that the device under test 170 within the thermal chamber 1300 has an object field 1470 exterior of the thermal chamber 1300, viewed through the optic stimulus entry aperture 210 and unconstrained by the optic stimulus entry aperture 210, as defined by the predetermined angular field of view FOV of the device under test 170. For example, the length LT of the thermal chamber 1300 and the diameter 210D (FIG. 13) of the optic stimulus entry aperture 210 are configured (e.g., through the selection and assembly of the different housing sections 500) such that a distance 1437 between the entry pupil 1401, 1501 of the device under test 170 and the optic stimulus entry aperture 210 glazing assembly 602 is minimized while providing the field of view FOV that is unobstructed by the optic stimulus entry aperture 210 (e.g., so that any off axis stimulus beam, see FIGS. 14 and 15, is not vignetted or blocked). For example, the rotor 107 may be rotated about axis of rotation θ so as to change the angle of incidence of the stimulus beam 188 with respect to the device under test 170. As can be seen in FIGS. 14 and 15, the rotor 107 (FIGS. 1A and 1B) may rotate the portable optic metrology thermal chamber module 150, and the device under test 170 therein, so that the stimulus beam 188 enters the entry pupil 1401, 1501 of the device under test at various off-axis angles throughout the angular field of view FOV of the device under test.

The optic stimulus entry aperture 210 is configured so that the stimulus beam 188, directed from locations throughout the object field 1470 outside the thermal chamber 1300 through the optic stimulus entry aperture 210 onto the entry pupil 1401, 1501, stimulates corresponding field points 1601 of the device under test 170 throughout a predetermined optic field 1600 (illustrated in FIG. 16 as being circular for exemplary purposes and it should be understood that the optic field may have any suitable shape) of the device under test 170 so as to be characterized by the image analyzer 140, 1540. In one aspect, the device under test 170 is the lens 1400 having the focal plane 1450 exterior or interior to the thermal chamber 1300 or housing 200, and the image analyzer 140 registers stimulation of the corresponding field points 1601 on the focal plane 1450, so as to characterize optic performance of the lens 1400 at a predetermined temperature of the lens 1400 set by the thermal chamber 1300. Where the focal plane is interior to the thermal chamber 1300 or housing 200 the image analyzer 140 may extend partially into the optic stimulus exit aperture 1310 when the shutter is opened, e.g., by operating the X-Z stage 161 to register the field points on the focal plane within the thermal chamber 1300 or housing 200. In another aspect, the device under test 170 is the camera 1500 and the predetermined optic field 1600 is defined by the predetermined sensor field 1551 of the camera image sensor 1550 of the camera 1500 inside the thermal chamber 1300, that registers stimulation of the corresponding field points 1601 on the predetermined sensor field 1551 so as to characterize optic performance of the camera 1500 at a predetermined temperature of the camera 1500 set by the thermal chamber 1300.

Referring to FIGS. 8A, 11A, 11C, 12C, and 13-15, exemplary thermal control of the device under test 170 will be described. The primary circulating thermal control fluid 899 flows, under manual or automated control, through the heat exchanger 1370 from the inlet coupling 830 to the outlet coupling 835 in the manner described above. The secondary circulating thermal control fluid 898 also flows through the heat exchanger from the secondary control fluid inlet coupling 851 to the ambient atmosphere 1302 as also described above. With respect to the secondary circulating thermal control fluid 898, the secondary circulating thermal control fluid 898 feeds through the peripheral wall 1371, such as through the thermal control fluid deflector grooves 950 of the end cap exchange member 910, into the isolated environment 1301 of the thermal chamber 1300 and flows along the peripheral wall 1371 (as illustrated in FIG. 13) to exhaust out of the rear of the thermal chamber 1300 as described above, such as through the exit apertures 1220 (FIGS. 12C and 12D) of the device under test mount 1200 (as described above).

The peripheral wall 1371 is configured so that the peripheral wall 1371 directs secondary circulating thermal control fluid flow 1398 (FIGS. 13-15), within the thermal chamber 1300 from a peripheral wall feed (e.g., the thermal control fluid deflector grooves 950) to exhaust from the thermal chamber 1300, against the peripheral wall 1371 away from the device under test 170 within the thermal chamber 1300 so that a thermal chamber region 1444 in front of the entry pupil 1401, 1501 of the device under test 170 is substantially free of secondary circulating thermal control fluid flow 1398 impingement and entrained flows of isolated environment media 1301M (FIGS. 14 and 15) surrounding and interfacing against the device under test 170. The secondary circulating thermal control fluid flow 1398 may provide a positive pressure within the thermal chamber 1300 that at least in part seals the thermal chamber 1300. The isolated environment media 1301M may be any suitable media including but not limited to, inert gases and dry air. The secondary circulating thermal control fluid flow 1398 within the thermal chamber 1300 is disposed so that a thermal interface, of the secondary circulating thermal control fluid flow 1398 against the device under test 170 within the isolated environment 1301, effects thermal control that sets the temperature of the device under test 170 to a predetermined optic performance characterization temperature substantially via conduction. For example, the isolated environment media 1301M is substantially stationary and substantially surrounds the device under test 170. The secondary circulating thermal control fluid flow 1398 interfaces with the isolated environment media 1301M along the peripheral wall 1371 so that heat transfer from the secondary circulating thermal control fluid flow 1398 to the device under test 170 is a conductive heat transfer through the substantially stationary isolated environment media 1301M (e.g., substantially without movement of the isolated environment media 1301M).

While the heat transfer to the device under test is through the isolated environment media 1301M; primary thermal control of the isolated environment 1301 of the thermal chamber 1300 is effected via substantially convective heat transfer from a thermal control fluid flow (such as the secondary circulating thermal control fluid flow 1398) through thermal chamber environment media 1301M so that a flowing thermal control fluid (e.g., the secondary circulating thermal control fluid 898) impinges and bounds against the thermal chamber environment media 1301M (e.g., the secondary circulating thermal control fluid flow 1398 is constrained, at least in part, by the thermal chamber environmental media 1301M so as to flow adjacent and along the peripheral wall 1371; noting the thermal control fluid deflector grooves 950 may also direct the flow along the peripheral wall 1371) effecting convective heat transfer therebetween. A primary thermal control interface from the thermal chamber environment media 1301M, of the thermal chamber 1300, against optics (e.g., the entry pupil 1401, 1501, etc.) of the device under test 170 that effects thermal control that sets temperature of the optics of the device under test 170 to a predetermined optic performance testing temperature is substantially conductive as noted above (e.g., through the substantially stationary thermal chamber environmental media 1301M that substantially surrounds the device under test 170). For example, as described above, the thermal chamber environment media 1301M impinges against and defines a substantially static interface surrounding the device under test 170 and substantially across an optic field (e.g., defined, at least in part, by the entry pupil 1401, 1501) of the device under test 170 that substantially wholly effects thermal control that sets a temperature of the device under test 170 to a predetermined optic performance testing temperature. In one aspect, the mounting plate 1201 may form a heatsink such that conduction from the inner wall of the thermal chamber 1300 formed by mounting plate 1201 at least in part provides the thermal control that sets the temperature of the optics of the device under test 170 to a predetermined optic performance testing temperature. In one aspect, the secondary circulating thermal control fluid flow 1398 is disposed so as to form a non-condensing atmosphere 1301C surrounding, so as to envelop outer lens optical surfaces of the device under test 170, within the isolated environment 1301 of the thermal chamber 1300, and which non-condensing atmosphere 1301C surrounds so as to envelop outer optical surfaces of the image analyzer 140 analyzing the optic field of the device under test 170 (see FIGS. 13-15). In one aspect, the secondary circulating thermal control fluid flow 1398 is increased when the shutter is closed and the device under test 170 is heating or cooling so that the forced convection speeds up the heat transfer to the device under test 170 through the thermal chamber environment media 1301M and to intensify the conductive path through the mounting plate 1201. As the device under test 170 reaches thermal equilibrium the secondary circulating thermal control fluid flow 1398 may be decreased to maintain a positive pressure within the thermal chamber 1300 that, at temperatures below the dew point, substantially prevents condensation from the ambient air inside the cell and on the optics of the device under test 170. The secondary circulating thermal control fluid flow 1398 may also substantially prevent condensation on the external optical surface of the image analyzer 140 objective lens.

Figure 17:
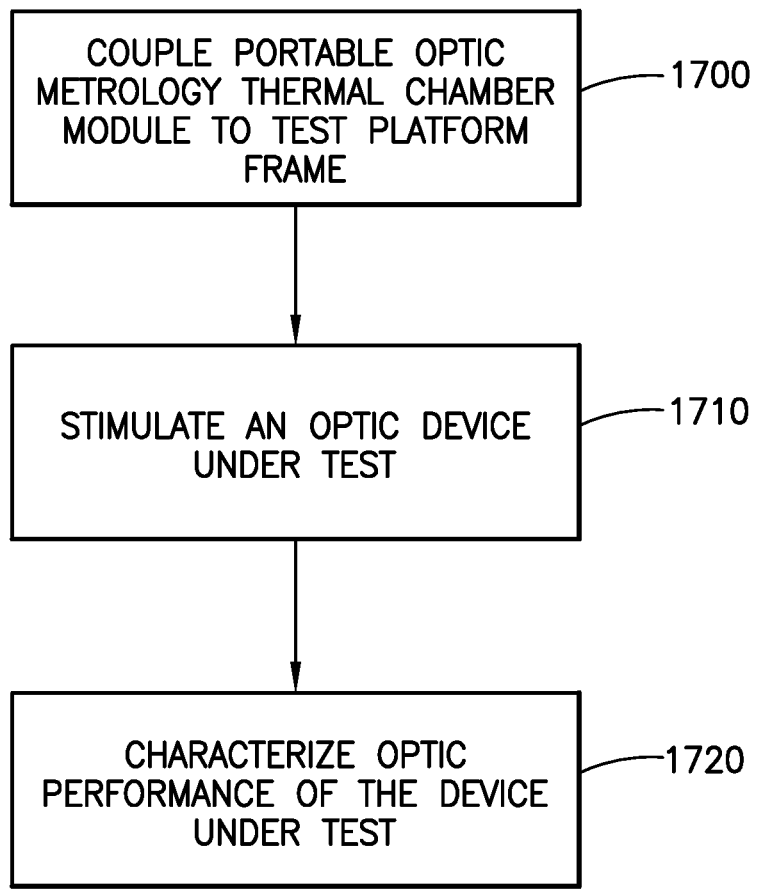
FIG. 17 is a schematic flow diagram of a method in accordance with aspects of the present disclosure.

Referring to FIG. 17 as well as FIGS. 1A, 1B, and 13, and exemplary method of metrological testing of an optic device under test 170 will be described. The method includes coupling the portable optic metrology thermal chamber module 150 to the test platform frame 101 (FIG. 17, Block 1700), where the portable optic metrology thermal chamber module 150 is as described above. In one aspect, coupling the portable optic metrology thermal chamber module 150 to the test platform frame 101 includes coupling the portable optic metrology thermal chamber 150 to one or more thermal control devices (e.g., fluid circulators 839, 849—FIG. 8A) so that thermal control fluid (e.g., one or more of the primary circulating thermal control fluid 899 and the secondary circulating thermal control fluid 898) circulates through the heat exchanger 1370 of the portable optic metrology thermal chamber module 150 so as to set a temperature of the device under test 170 in the thermal chamber 1300. As described above, where the heat exchanger 1370 is the dual circulating fluid heat exchanger and both the primary circulating thermal control fluid 899 and the secondary circulating thermal control fluid 898 circulate through the dual circulating fluid heat exchanger 1370, where the secondary circulating thermal control fluid 898 thermally interfaces with the primary circulating thermal control fluid 899 and the isolated environment 1301 of the thermal chamber 1300 so as to provide a thermal feed from the primary circulating thermal control fluid 899 into the isolated environment 1301 so as to set the temperature of the device under test 170 in the thermal chamber 1300 in the manner described above.

In one aspect, coupling the portable optic metrology chamber module 150 to the test platform frame 101 includes selectably interchanging the portable optic metrology chamber module 150 from a number of different portable optic metrology chamber modules 150A-150*n*, where as described above, the housing 200 defines a predetermined optic metrology characteristic of the portable optic metrology thermal chamber module 150 that corresponds to the device under test 170 held in the thermal chamber 1300. In one aspect, the portable optic metrology thermal chamber module 150 is interchanged with one of the other different interchangeable portable optic metrology thermal chamber modules 150A-150n interchangeably mounted to the metrology system 100 in place of the portable optic metrology thermal chamber module 150 for testing the at least one other different device under test 170 with the metrology system 100. In one aspect, the housing 200 is reconfigured from a first configuration (such as the configuration of thermal chamber module 150) defining the predetermined optic metrology characteristic of the portable optic metrology thermal chamber module, to a second configuration (such as the configuration of thermal chamber module 150A) that forms at least one of the other different portable optic metrology thermal chamber modules 150A-150n with the different predetermined optic characteristic corresponding thereto. In one aspect, a size of the housing 200 is variably selected so that the thermal chamber 1300 defined thereby is matched to a size of the device under test 170 as described above.

The optic device under test 170 is stimulated (FIG. 17, Block 1710) (either manually or through automation as described above) with the stimulus beam 188 from the metrology system stimulus source 102 outside the thermal chamber 1300. The optic performance of device under test 170 is characterized (FIG. 17, Block 1720), where characterizing the optic performance of the device under test 170 includes determining one or more of a modulation transfer function, through-focus modulation transfer function, depth of focus, blur, spot size, astigmatism, effective focal length, distortion, field curvature, chief ray angle, encircled and ensquared energy, axial color, transmission, stray light performance, signal transfer function, and chromatic functions.

In accordance with one or more aspects of the disclosed embodiment a portable optic metrology thermal chamber module comprises:
 a housing defining a thermal chamber, with a thermally isolated environment therein isolated from ambient atmosphere, the thermal chamber being arranged for holding an optic device under test within the isolated environment;
 the housing having an optic stimulus entry aperture configured and disposed with respect to the optic device under test within the thermal chamber, for entry of a stimulus beam, from a metrology system stimulus source outside the thermal chamber, through the optic stimulus entry aperture onto an entry pupil of the optic device under test to an image analyzer; and
 a module mount coupling connected to the housing, the module mount coupling defining a module mounting interface of the portable optic metrology thermal chamber module so as to modularly mount the portable optic metrology thermal chamber module to a support of a metrology system of the metrology system stimulus source, the module mounting interface being configured so as to removably couple the portable optic metrology thermal chamber module as a unit to the support in a predetermined position relative to the metrology system stimulus source, and the housing is sized and shaped so that the portable optic metrology thermal chamber module is portable as a unit for moving to and removing from the predetermined position of the metrology system.

In accordance with one or more aspects of the disclosed embodiment the housing comprises an exterior insulating case and a heat exchanger disposed at least in part within the insulating case, and the heat exchanger defines at least a peripheral wall of the thermal chamber holding the thermally isolated environment.

In accordance with one or more aspects of the disclosed embodiment the heat exchanger is a circulating fluid heat exchanger.

In accordance with one or more aspects of the disclosed embodiment the housing defines a predetermined optic metrology characteristic of the portable optic metrology thermal chamber module that corresponds to the device under test held in the thermal chamber, and the portable optic metrology thermal chamber module is selectably interchangeable from a number of other different portable optic metrology thermal chamber modules, each with a different predetermined optic metrology characteristic that specifically corresponds to at least one other different device under test so as to differentiate the portable optic metrology thermal chamber module from each of the other selectably interchangeable portable optic metrology thermal chamber modules.

In accordance with one or more aspects of the disclosed embodiment the portable optic metrology thermal chamber module is mounted to the metrology system for testing the device under test within the portable optic metrology thermal chamber module, and the portable optic metrology thermal chamber module is interchanged with one of the other different interchangeable portable optic metrology thermal chamber modules interchangeably mounted to the metrology system in place of the portable optic metrology thermal chamber module for testing the at least one other different device under test with the metrology system.

In accordance with one or more aspects of the disclosed embodiment the housing of the portable optic metrology thermal chamber module and of each of the other interchangeable portable optic metrology thermal chamber modules respectively is sized so the thermal chamber of the portable optic metrology thermal chamber module and of each other interchangeable portable optic metrology thermal chamber module matches a different device under test size.

In accordance with one or more aspects of the disclosed embodiment the housing is configured so that the thermal chamber defined thereby has a variably selectable size matched to a size of the device under test.

In accordance with one or more aspects of the disclosed embodiment the housing is configurable from a first configuration defining the predetermined optic metrology characteristic of the portable optic metrology thermal chamber module, to a second configuration that forms at least one of the other different portable optic metrology thermal chamber modules with the different predetermined optic characteristic corresponding thereto.

In accordance with one or more aspects of the disclosed embodiment the housing is configured so that the thermal chamber defined thereby has a variably selectable size matched to a size of the device under test.

In accordance with one or more aspects of the disclosed embodiment the device under test is a lens having a focal plane exterior to an inner wall of the thermal chamber, and the image analyzer registers an image outside the inner wall of the chamber, generated by the lens within the thermal chamber, so as to characterize optic performance of the lens at a predetermined temperature of the lens set by the thermal chamber, where the lens is stimulated by the stimulus beam.

In accordance with one or more aspects of the disclosed embodiment the device under test is an afocal lens, and the image analyzer registers an image outside an inner wall of the thermal chamber, generated by the lens within the thermal chamber, so as to characterize optic performance of the lens at a predetermined temperature of the lens set by the thermal chamber, where the lens is stimulated by the stimulus beam.

In accordance with one or more aspects of the disclosed embodiment the device under test is a camera and the image analyzer is a camera image sensor of the camera inside the thermal chamber, that registers an image generated by the camera, stimulated within the thermal chamber, onto a sensor field of the camera image sensor so as to characterize optic performance of the camera at a predetermined temperature of the camera set by the thermal chamber.

In accordance with one or more aspects of the disclosed embodiment the stimulus beam generated by the metrology system stimulus source onto the entry pupil is a collimated beam, or a diverging beam, or a converging beam.

In accordance with one or more aspects of the disclosed embodiment the stimulus beam generated by the metrology system stimulus source onto the entry pupil is an interferometer beam.

In accordance with one or more aspects of the disclosed embodiment the housing has a registration face with indicia having optically registrable features determinative of position of the registration face, the optically registrable features being registrable with the image analyzer so as to determine positioning of the image analyzer relative to the device under test within the thermal chamber, and effect characterization of optic performance of the device under test at different predetermined temperatures of the device under test set with the thermal chamber.

In accordance with one or more aspects of the disclosed embodiment the optically registrable features of the registration face are illuminated for the image analyzer.

In accordance with one or more aspects of the disclosed embodiment the housing has illumination sources configured included in the registration face and disposed so that the optically registrable features of the indicia are backlit with respect to the image analyzer, or the thermal chamber module further comprises illumination source, connected to the housing and disposed so that the optically registrable features of the indicia are front lit with respect to the image analyzer.

In accordance with one or more aspects of the disclosed embodiment the registration face is located at a predetermined substantially thermally invariant location with respect to the device under test within the thermal chamber for a range of predetermined temperatures of the device under test set with the thermal chamber.

In accordance with one or more aspects of the disclosed embodiment a portable optic metrology thermal chamber module comprising:

a housing defining a thermal chamber, with a thermally isolated environment therein isolated from ambient atmosphere, the thermal chamber being arranged for holding an optic device under test within the isolated environment;

the housing having an optic stimulus entry aperture configured and disposed with respect to the device under test within the thermal chamber, for entry of a stimulus beam, from a metrology system stimulus source outside the thermal chamber, through the entry aperture onto an entry pupil of the device under test to an image analyzer;

wherein the device under test has a predetermined field of view, and a configuration of the optic stimulus entry aperture is arranged so that the device under test within the thermal chamber has an object field exterior of the thermal chamber, viewed through the optic stimulus entry aperture and unconstrained by the optic stimulus entry aperture, as defined by the predetermined field of view of the device under test.

In accordance with one or more aspects of the disclosed embodiment the optic stimulus entry aperture is configured so that the stimulus beam, directed from locations throughout the object field outside the thermal chamber through the optic stimulus entry aperture onto the entry pupil, stimulates corresponding field points throughout a predetermined optic field of the device under test so as to be characterized by the image analyzer.

In accordance with one or more aspects of the disclosed embodiment the device under test is a lens having a focal plane exterior to an inner all of the thermal chamber, and the image analyzer registers stimulation of the corresponding field points on the focal plane, so as to characterize optic performance of the lens at a predetermined temperature of the lens set by the thermal chamber.

In accordance with one or more aspects of the disclosed embodiment the device under test is an afocal lens, and the image analyzer registers stimulation of the corresponding field points of the afocal lens, so as to characterize optic performance of the lens at a predetermined temperature of the lens set by the thermal chamber.

In accordance with one or more aspects of the disclosed embodiment the device under test is a camera and the predetermined optic field is defined by a predetermined sensor field of a camera image sensor of the camera inside the thermal chamber, that registers stimulation of the corresponding field points on the predetermined sensor field so as to characterize optic performance of the camera at a predetermined temperature of the camera set by the thermal chamber.

In accordance with one or more aspects of the disclosed embodiment the stimulus beam generated by the metrology system stimulus source onto the optic stimulus entry aperture is a collimated beam, or a diverging beam, or a converging beam.

In accordance with one or more aspects of the disclosed embodiment the housing comprises an exterior insulating case and a heat exchanger disposed at least in part within the insulating case, and the heat exchanger defines at least a peripheral wall of the thermal chamber holding the thermally isolated environment.

In accordance with one or more aspects of the disclosed embodiment the heat exchanger is a dual circulating fluid heat exchanger with a primary circulating thermal control fluid, and a secondary circulating thermal control fluid thermally interfacing with the primary circulating thermal control fluid and the isolated environment of the thermal chamber so as to provide a thermal feed from the primary circulating thermal control fluid into the isolated environment, and/or at least part of an inner wall of the thermal chamber, so as to set a temperature of the device under test in the thermal chamber.

In accordance with one or more aspects of the disclosed embodiment the secondary circulating thermal control fluid feeds through the peripheral wall into the isolated environment of the thermal chamber and flows along the peripheral wall to exhaust out of the thermal chamber.

In accordance with one or more aspects of the disclosed embodiment the peripheral wall is configured so that the peripheral wall directs secondary circulating thermal control fluid flow, within the thermal chamber from a peripheral wall feed to exhaust from the thermal chamber, against the peripheral wall away from the device under test within the thermal chamber so that a thermal chamber region in front of the entry pupil of the device under test is substantially free of secondary circulating thermal control fluid flow impingement and entrained flows of isolated environment media surrounding and interfacing against the device under test.

In accordance with one or more aspects of the disclosed embodiment the secondary circulating thermal control fluid flow is disposed so as to form a non-condensing atmosphere surrounding so as to envelop outer lens optical surfaces of the device under test within the isolated environment of the thermal chamber, and which non-condensing atmosphere surrounds so as to envelop outer optical surfaces of the image analyzer analyzing the optic field of the device under test.

In accordance with one or more aspects of the disclosed embodiment secondary circulating thermal control fluid flow within the thermal chamber is disposed so that a thermal interface, of the isolated environment, and/or of the at least part of the inner wall of the thermal chamber, against the device under test within the isolated environment, effects thermal control that sets measured temperature of the device under test to a predetermined optic performance characterization temperature substantially via conduction.

In accordance with one or more aspects of the disclosed embodiment primary thermal control of the isolated environment of the thermal chamber is effected via substantially convective heat transfer from a thermal control fluid flow through thermal chamber environment media so that a flowing thermal control fluid impinges and bounds against the thermal chamber environment media, and/or of at least part of an inner wall of the thermal chamber, effecting convective heat transfer therebetween.

In accordance with one or more aspects of the disclosed embodiment a primary thermal control interface from the thermal chamber environment media, and/or of the at least part of an inner wall, of the thermal chamber, against optics of the device under test that effects thermal control that sets temperature of the optics of the device under test to a predetermined optic performance testing temperature is substantially conductive.

In accordance with one or more aspects of the disclosed embodiment the thermal chamber environment media impinges against and defines a substantially static interface surrounding the device under test and substantially across an optic field of the device under test that, in combination with mount interface between the device under test and the at least part of the inner wall, substantially wholly effect thermal control that sets measured temperature of the device under test to a predetermined optic performance testing temperature.

In accordance with one or more aspects of the disclosed embodiment a method of metrological testing of an optic device under test, the method comprising:
coupling a portable optic metrology thermal chamber module to a test platform frame, where the portable optic metrology thermal chamber module includes
a housing defining a thermal chamber, with a thermally isolated environment therein isolated from ambient atmosphere, the thermal chamber being arranged for holding an optic device under test within the isolated environment;
the housing having an optic stimulus entry aperture configured and disposed with respect to the optic device under test within the thermal chamber, for entry of a stimulus beam, from a metrology system stimulus source outside the thermal chamber, through the optic stimulus entry aperture onto an entry pupil of the optic device under test to an image analyzer; and
a module mount coupling connected to the housing, the module mount coupling defining a module mounting interface of the portable optic metrology thermal chamber module so as to modularly mount the portable optic metrology thermal chamber module to a support of a metrology system of the metrology system stimulus source, the module mounting interface being configured so as to removably couple the portable optic metrology thermal chamber module as a unit to the support in a predetermined position relative to the metrology system stimulus source, and the housing is sized and shaped so that the portable optic metrology thermal chamber module is portable as a unit for moving to and removing from the predetermined position of the metrology system;
stimulating the optic device under test with the stimulus beam from the metrology system stimulus source outside the thermal chamber; and
characterizing optic performance of the device under test.

In accordance with one or more aspects of the disclosed embodiment characterizing the optic performance of the device under test comprises determining one or more of a modulation transfer function, through-focus modulation transfer function, depth of focus, blur spot size, astigmatism, effective focal length, distortion, field curvature, chief (principle) ray angle, encircled and ensquared energy, axial color, transmission, stray light performance, signal transfer function, and chromatic functions.

In accordance with one or more aspects of the disclosed embodiment the method further comprises circulating thermal control fluid through a heat exchanger of the portable optic metrology thermal chamber module so as to set a temperature of the device under test in the thermal chamber.

In accordance with one or more aspects of the disclosed embodiment the heat exchanger is a dual circulating fluid heat exchanger and the method further comprises circulating a primary circulating thermal control fluid and a secondary circulating thermal control fluid through the dual circulating fluid heat exchanger, where the secondary circulating thermal control fluid thermally interfaces with the primary circulating thermal control fluid and the isolated environment of the thermal chamber so as to provide a thermal feed from the primary circulating thermal control fluid into the isolated environment so as to set the temperature of the device under test in the thermal chamber.

In accordance with one or more aspects of the disclosed embodiment the secondary circulating thermal control fluid flows through the isolated environment of the thermal chamber disposed so as to form a non-condensing atmosphere surrounding so as to envelop outer lens optical surfaces of the device under test within the isolated environment of the thermal chamber, and flows out of the isolated environment of the thermal chamber so part of non-condensing atmosphere is formed to surround so as to envelop outer optical surfaces of the image analyzer analyzing the optic field of the device under test.

In accordance with one or more aspects of the disclosed embodiment the secondary circulating thermal control fluid flow within the thermal chamber is disposed so that a thermal interface, of the isolated environment, and/or of the at least part of the inner wall of the thermal chamber, against the device under test within the isolated environment, effects thermal control that sets a temperature of the device under test to a predetermined optic performance characterization temperature substantially via conduction.

In accordance with one or more aspects of the disclosed embodiment the method further comprises effecting primary thermal control of the isolated environment of the thermal chamber via substantially convective heat transfer from a thermal control fluid flow through thermal chamber environment media so that a flowing thermal control fluid impinges and bounds against the thermal chamber environment media, and/or of at least part of an inner wall of the thermal chamber, effecting convective heat transfer therebetween.

In accordance with one or more aspects of the disclosed embodiment a primary thermal control interface from the thermal chamber environment media, and/or of the at least part of an inner wall, of the thermal chamber, against optics of the device under test that effects thermal control that sets temperature of the optics of the device under test to a predetermined optic performance testing temperature is substantially conductive.

In accordance with one or more aspects of the disclosed embodiment the thermal chamber environment media impinges against and defines a substantially static interface surrounding the device under test and substantially across an optic field of the device under test that, in combination with mount interface between the device under test and the at least part of the inner wall, substantially wholly effect thermal control that sets measured temperature of the device under test to a predetermined optic performance testing temperature.

In accordance with one or more aspects of the disclosed embodiment the housing defines a predetermined optic metrology characteristic of the portable optic metrology thermal chamber module that corresponds to the device under test held in the thermal chamber, the method comprising selectably interchanging the portable optic metrology thermal chamber module with a number of other different portable optic metrology thermal chamber modules, each with a different predetermined optic metrology characteristic that specifically corresponds to at least one other different device under test so as to differentiate the portable optic metrology thermal chamber module from each of the other selectably interchangeable portable optic metrology thermal chamber modules.

In accordance with one or more aspects of the disclosed embodiment the portable optic metrology thermal chamber module is mounted to the metrology system for testing the device under test within the portable optic metrology thermal chamber module, the method further comprising interchanging the portable optic metrology thermal chamber module with one of the other different interchangeable portable optic metrology thermal chamber modules interchangeably mounted to the metrology system in place of the portable optic metrology thermal chamber module for testing the at least one other different device under test with the metrology system.

In accordance with one or more aspects of the disclosed embodiment the housing of the portable optic metrology thermal chamber module and of each of the other interchangeable portable optic metrology thermal chamber modules respectively is sized so the thermal chamber of the portable optic metrology thermal chamber module and of each other interchangeable portable optic metrology thermal chamber module matches a different device under test size.

In accordance with one or more aspects of the disclosed embodiment the method further comprises variably selecting a size of the housing so that the thermal chamber defined thereby is matched to a size of the device under test.

In accordance with one or more aspects of the disclosed embodiment the method further comprises reconfiguring the housing from a first configuration defining the predetermined optic metrology characteristic of the portable optic metrology thermal chamber module, to a second configuration that forms at least one of the other different portable optic metrology thermal chamber modules with the different predetermined optic characteristic corresponding thereto.

It should be understood that the foregoing description is only illustrative of the aspects of the present disclosure. Various alternatives and modifications can be devised by those skilled in the art without departing from the aspects of the present disclosure. Accordingly, the aspects of the present disclosure are intended to embrace all such alternatives, modifications and variances that fall within the scope of any claims appended hereto. Further, the mere fact that different features are recited in mutually different dependent or independent claims does not indicate that a combination of these features cannot be advantageously used, such a combination remaining within the scope of the aspects of the present disclosure.

What is claimed is:

1. A portable metrology of optics thermal chamber module comprising:
    a housing defining a thermal chamber, with a thermally isolated environment therein isolated from ambient atmosphere, the thermal chamber being arranged for holding an optic device under test, that generates metrology of optics data, within the isolated environment;
    the housing having an optic stimulus entry aperture configured and disposed with respect to the optic device under test within the thermal chamber, for entry of a stimulus beam, from a metrology system stimulus source outside the thermal chamber, through the optic stimulus entry aperture onto an entry pupil of the optic device under test to an image analyzer;
    wherein the optic device under test has a predetermined field of view, and a configuration of the optic stimulus entry aperture is arranged so that the optic device under test within the thermal chamber has an object field exterior of the thermal chamber, viewed through the optic stimulus entry aperture and unconstrained by the optic stimulus entry aperture, as defined by the predetermined field of view of the optic device under test; and
    wherein the optic stimulus entry aperture is configured so that the stimulus beam, directed from locations throughout the object field outside the thermal chamber through the optic stimulus entry aperture onto the entry pupil, stimulates corresponding field points throughout a predetermined optic field of the optic device under test so as to be characterized by the image analyzer.

2. The portable metrology of optics thermal chamber module of claim 1, wherein the optic device under test is a lens having a focal plane exterior to an inner wall of the thermal chamber, and the image analyzer registers stimulation of the corresponding field points on the focal plane, so as to characterize optic performance of the lens at a predetermined temperature of the lens set by the thermal chamber.

3. The portable metrology of optics thermal chamber module of claim 1, wherein the optic device under test is an afocal lens, and the image analyzer registers stimulation of the corresponding field points of the afocal lens, so as to characterize optic performance of the lens at a predetermined temperature of the lens set by the thermal chamber.

4. The portable metrology of optics thermal chamber module of claim 1, wherein the optic device under test is a camera and the predetermined optic field is defined by a predetermined sensor field of a camera image sensor of the camera inside the thermal chamber, that registers stimulation of the corresponding field points on the predetermined sensor field so as to characterize optic performance of the camera at a predetermined temperature of the camera set by the thermal chamber.

5. The portable metrology of optics thermal chamber module of claim 1, wherein the stimulus beam generated by the metrology system stimulus source onto the optic stimulus entry aperture is a collimated beam, or a diverging beam, or a converging beam.

6. The portable metrology of optics thermal chamber module of claim 1, wherein the housing comprises an exterior insulating case and a heat exchanger disposed at least in part within the insulating case, and the heat exchanger defines at least a peripheral wall of the thermal chamber holding the thermally isolated environment.

7. The portable metrology of optics thermal chamber module of claim 6, wherein the heat exchanger is a dual circulating fluid heat exchanger with a primary circulating thermal control fluid, and a secondary circulating thermal control fluid thermally interfacing with the primary circulating thermal control fluid and the isolated environment of the thermal chamber so as to provide a thermal feed from the primary circulating thermal control fluid into the isolated environment, and/or at least part of an inner wall of the thermal chamber, so as to set a temperature of the optic device under test in the thermal chamber.

8. The portable metrology of optics thermal chamber module of claim 7, wherein the secondary circulating thermal control fluid feeds through the peripheral wall into the isolated environment of the thermal chamber and flows along the peripheral wall to exhaust out of the thermal chamber.

9. The portable metrology of optics thermal chamber module of claim 8, wherein the secondary circulating thermal control fluid flow is disposed so as to form a non-condensing atmosphere surrounding so as to envelop outer lens optical surfaces of the optic device under test within the isolated environment of the thermal chamber, and which non-condensing atmosphere surrounds so as to envelop outer optical surfaces of the image analyzer analyzing the optic field of the optic device under test.

10. The portable metrology of optics thermal chamber module of claim 7, wherein the peripheral wall is configured so that the peripheral wall directs secondary circulating thermal control fluid flow, within the thermal chamber from a peripheral wall feed to exhaust from the thermal chamber, against the peripheral wall away from the optic device under test within the thermal chamber so that a thermal chamber region in front of the entry pupil of the optic device under test is substantially free of secondary circulating thermal control fluid flow impingement and entrained flows of isolated environment media surrounding and interfacing against the optic device under test.

11. The portable metrology of optics thermal chamber module of claim 7, wherein secondary circulating thermal control fluid flow within the thermal chamber is disposed so that a thermal interface, of the isolated environment, and/or of the at least part of the inner wall of the thermal chamber, against the optic device under test within the isolated environment, effects thermal control that sets measured temperature of the optic device under test to a predetermined optic performance characterization temperature substantially via conduction.

12. The portable metrology of optics thermal chamber module of claim 1, wherein primary thermal control of the isolated environment of the thermal chamber is effected via substantially convective heat transfer from a thermal control fluid flow through thermal chamber environment media so that a flowing thermal control fluid impinges and bounds against the thermal chamber environment media, and/or of at least part of an inner wall of the thermal chamber, effecting convective heat transfer therebetween.

13. The portable metrology of optics thermal chamber module of claim 12, wherein a primary thermal control interface from the thermal chamber environment media, and/or of the at least part of an inner wall, of the thermal chamber, against optics of the optic device under test that effects thermal control that sets temperature of the optics of the optic device under test to a predetermined optic performance testing temperature is substantially conductive.

14. The portable metrology of optics thermal chamber module of claim 12, wherein the thermal chamber environment media impinges against and defines a substantially static interface surrounding the optic device under test and substantially across an optic field of the optic device under test that, in combination with mount interface between the optic device under test and the at least part of the inner wall, substantially wholly effect thermal control that sets measured temperature of the optic device under test to a predetermined optic performance testing temperature.

\* \* \* \* \*